(12) United States Patent
Thomson et al.

(10) Patent No.: US 11,880,178 B1
(45) Date of Patent: Jan. 23, 2024

(54) SURFACE DATA, ACQUISITION, STORAGE, AND ASSESSMENT SYSTEM

(71) Applicant: Ectoscan Systems, LLC, Cincinnati, OH (US)

(72) Inventors: Paul E. Thomson, Cincinnati, OH (US); Adam R. Gerlach, New Bremen, OH (US)

(*) Notice: Subject to any disclaimer, the term of this patent is extended or adjusted under 35 U.S.C. 154(b) by 858 days.

(21) Appl. No.: 16/929,500

(22) Filed: Jul. 15, 2020

Related U.S. Application Data

(60) Continuation-in-part of application No. 15/417,902, filed on Jan. 27, 2017, now Pat. No. 11,281,176, which is a division of application No. 13/373,456, filed on Nov. 15, 2011, now Pat. No. 9,599,461.

(60) Provisional application No. 62/875,715, filed on Jul. 18, 2019, provisional application No. 61/458,023, filed on Nov. 16, 2010.

(51) Int. Cl.
| | |
|---|---|
| *G05B 19/042* | (2006.01) |
| *G06T 7/73* | (2017.01) |
| *G01B 21/20* | (2006.01) |
| *G01B 11/24* | (2006.01) |

(52) U.S. Cl.
CPC .......... *G05B 19/0426* (2013.01); *G01B 11/24* (2013.01); *G01B 21/20* (2013.01); *G06T 7/75* (2017.01); *G05B 2219/32217* (2013.01); *G06T 2207/30004* (2013.01)

(58) Field of Classification Search
None
See application file for complete search history.

(56) References Cited

U.S. PATENT DOCUMENTS

| | | | |
|---|---|---|---|
| 4,054,824 | A | 10/1977 | Nishioka |
| 4,275,741 | A | 6/1981 | Edrich |
| 4,445,516 | A | 5/1984 | Wollnik et al. |
| 4,530,367 | A | 7/1985 | Desjardins et al. |
| 4,755,952 | A | 7/1988 | Johns |
| 4,986,664 | A | 1/1991 | Iovo |
| 5,311,109 | A | 5/1994 | Ozawa |
| 5,325,449 | A | 6/1994 | Burt et al. |
| 5,428,444 | A | 6/1995 | Haddock et al. |
| 5,941,833 | A | 8/1999 | Lipman |
| 6,057,925 | A | 5/2000 | Anthon |
| 6,484,047 | B1 | 11/2002 | Vilsmeier |
| 7,226,426 | B2 | 6/2007 | Thomson |

(Continued)

FOREIGN PATENT DOCUMENTS

| | | |
|---|---|---|
| CN | 105750694 | 7/2016 |
| JP | H10111300 | 4/1998 |

(Continued)

OTHER PUBLICATIONS

Del Bimbo et al., "Retrieval by Content Similarity of 3D Models Using Spin Images" Annales Des Telecommunications, Dec. 2005, vol. 60, Issue 11-12, pp. 1360-1378.

(Continued)

*Primary Examiner* — Leon Flores
(74) *Attorney, Agent, or Firm* — Mark F. Smith; Smith Brandenburg Ltd

(57) ABSTRACT

A surface data acquisition, storage, and assessment system for detecting and quantifying similarities or differences between scanned surface data before and after the surface has been acted upon by a surface altering element.

18 Claims, 36 Drawing Sheets

(56) References Cited

U.S. PATENT DOCUMENTS

| | | |
|---|---|---|
| 7,734,077 B2 | 6/2010 | Hirsch et al. |
| 7,957,583 B2 | 6/2011 | Boca et al. |
| 7,968,845 B1 | 6/2011 | Wagner |
| 8,035,637 B2 | 10/2011 | Kriveshko |
| 2002/0087274 A1 | 7/2002 | Alexander et al. |
| 2002/0093115 A1 | 7/2002 | Jang et al. |
| 2003/0013951 A1 | 1/2003 | Stefanescu et al. |
| 2003/0091226 A1 | 5/2003 | Cahill et al. |
| 2004/0019269 A1 | 1/2004 | Schaefer et al. |
| 2005/0041843 A1 | 2/2005 | Sawyer |
| 2005/0245839 A1 | 11/2005 | Stivoric |
| 2005/0238589 A1 | 12/2005 | Houle et al. |
| 2006/0206027 A1 | 9/2006 | Malone |
| 2008/0253612 A1 | 10/2008 | Regler et al. |
| 2008/0260202 A1 | 10/2008 | Roth |
| 2008/0262869 A1 | 10/2008 | Bronn |
| 2008/0285831 A1 | 11/2008 | Kirchberg et al. |
| 2009/0279672 A1 | 11/2009 | Reiner |
| 2011/0082667 A1 | 4/2011 | Ibarz et al. |
| 2011/0150342 A1 | 6/2011 | Frankenl |
| 2011/0205354 A1 | 8/2011 | Enomoto et al. |
| 2015/0010128 A1 | 1/2015 | Drouin et al. |
| 2016/0029006 A1* | 1/2016 | Zoken .............. H04N 13/221 348/50 |

FOREIGN PATENT DOCUMENTS

| | | |
|---|---|---|
| WO | WO 02/095382 | 11/2002 |
| WO | WO 2012/051394 | 4/2012 |

OTHER PUBLICATIONS

Huber, Automatic 3D Modelling Using Range Images Obtained from Unknown Viewpoints; IEEE Proceedings, 3rd International Conf. on 3D Imaging and Modeling, 2001, pp. 153-160.

Jurgen Assfalg et al., Content-Based Retrieval of 3D Objects Using Spin Image Signatures, Apr. 2007, pp. 589-599, vol. 9, No. 3, IEEE Transactions on Multimedia.

H. Quynh Dinh et al., "Multi-Resolution Spin-Images" 2006, Proceedings of the 2006 IEEE Computer Society Conference on Computer Vision and Pattern Recognition.

Berthold K. Horn, "Closed-Form Solution of Absolute Orientation Using Unit Quaternions" vol. 4, p. 629- , Apr. 1987, Optical Society of America.

Andrew Edie Johnson, "Spin-Images; A Representation for 3D Surface Matching" Aug. 13, 1997, Carnegie Mellon University.

International Search Report and Written Opinion for related application No. PCT/US11/01980 dated Apr. 4, 2012.

Furrow, Danies, "Scanning Thermal Optical Measurement Platform For Ulcer Detection In High Risk Diabetic Patients," Rensselare Polytechnic Institute, Troy NY, Aug. 2008.

* cited by examiner

TRAINING SECTION

FUZZY

TRIANGULAR POLYGONAL MESH WITH VERTEX SURFACE NORMALS

SPIN-IMAGE GENERATION

SPIN-IMAGE SIGNATURES (a) POSITIVE CROWNS, (b) NEGATIVE CROWNS, and (c) SECTORS

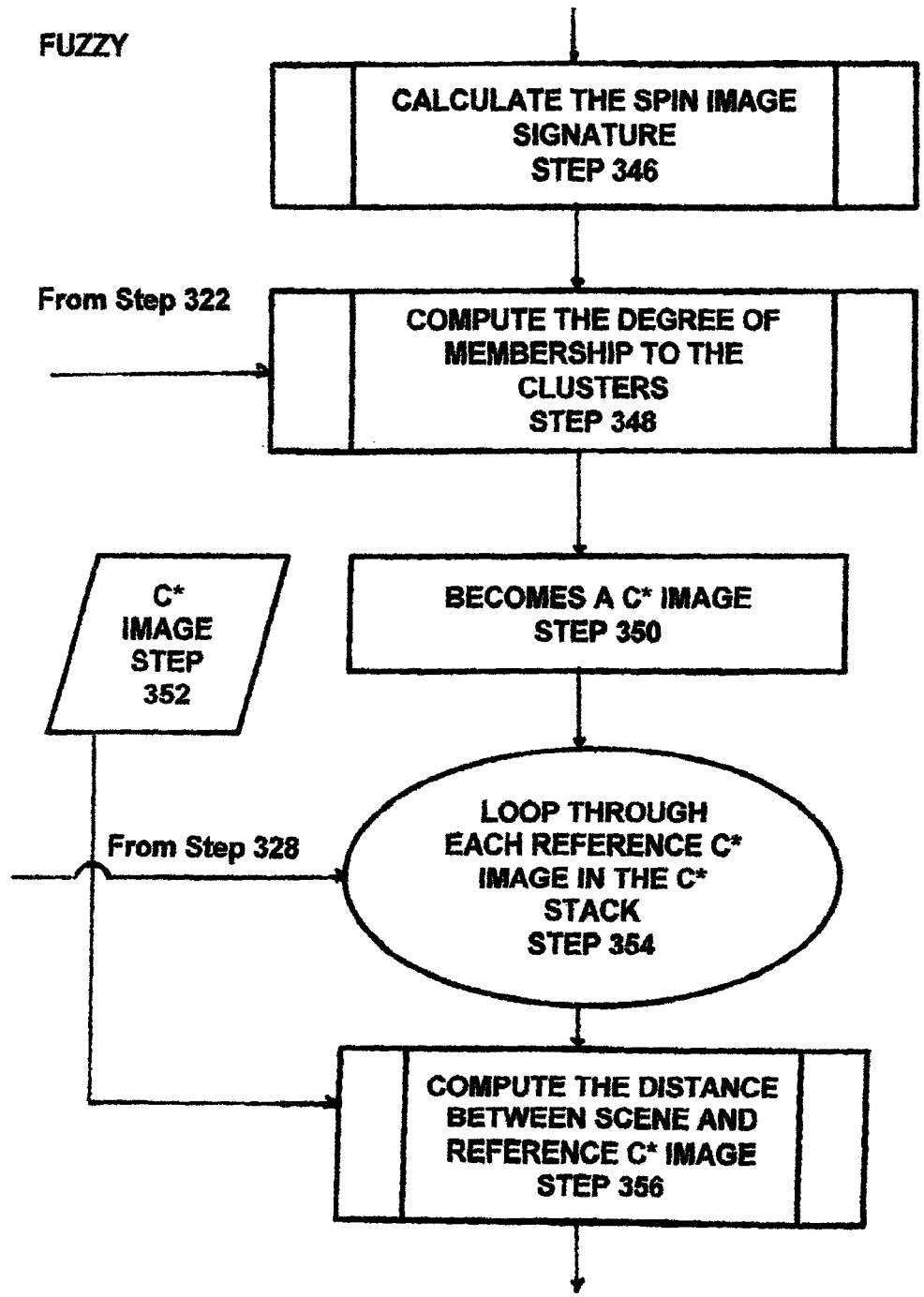

GROUPING

Undermined Wound Edges Sucked Up By Negative Pressure
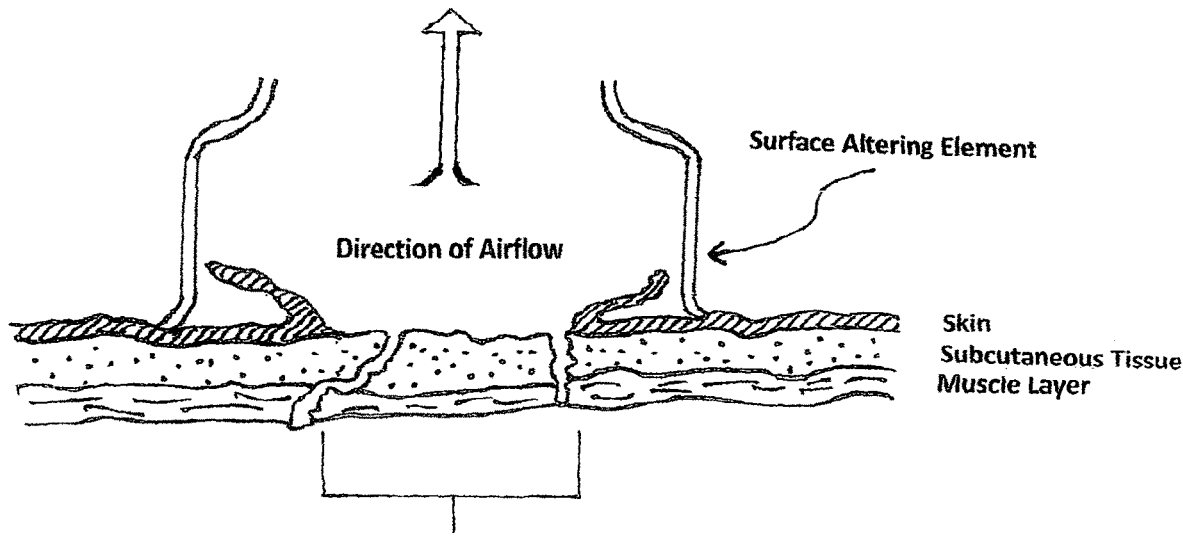
FIG 27
FIG 28
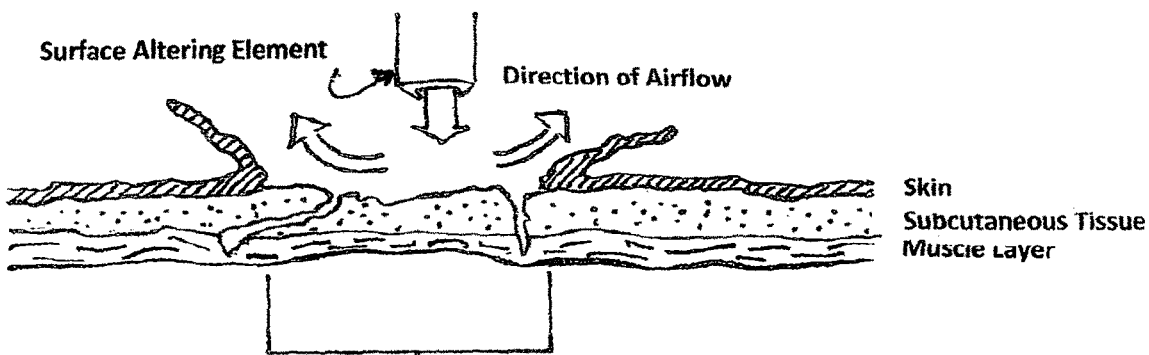
Undermined Wound Edges Pushed Up By Force of Air/Gas

SURFACE DATA, ACQUISITION, STORAGE, AND ASSESSMENT SYSTEM

CROSS-REFERENCE TO RELATED APPLICATION

The present invention claims benefit of U.S. Provisional Patent Application No. 62/875,715 filed Jul. 18, 2019 and is also a Continuation-In-Part of U.S. patent application Ser. No. 15/417,902 filed Jan. 27, 2017 which is a Divisional Patent Application of U.S. Utility Patent No. 9,599,461 issued Mar. 21, 2017 entitled: Surface Data Acquisition, Storage, And Assessment System that relates to and claims benefit to U.S. Provisional Patent Application No. 61/458,023, filed Nov. 16, 2010, entitled: Spin-Image Pose For Computer Modeling.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records. The copyright owner, however, otherwise reserves all copyright rights whatsoever.

BACKGROUND OF THE INVENTION

The subject invention is a surface data acquisition, storage, and assessment system and more particularly a surface data acquisition, storage, and assessment system for detecting and quantifying similarities or differences between stored data and data collected from a scan.

There are many disparate fields in which human senses are used as measuring tools. These fields are often specialized, technical, or industrial, and yet workers in these areas still acquire and gauge data using one or more of their biological senses. For example, the farmer looks at and feels or squeezes produce to determine its ripeness, or a butcher views and presses on a cut of meat to determine its freshness. A geologist tries to identify a type of rock or soil by looking at its colors and by running his or her hands over it, feeling for surface roughness and grain size. During a delicate surgery, a pathologist receives a sample of tissue that must be identified rapidly using only what can be seen through a microscope. An art critic tries to authenticate a painting by looking at the brushstrokes and by feeling the surface texture. In the modern world of technology, even robotic devices depend on viewing and touching an object for identification, such as a robotic arm reaching into a box of assorted parts to identify and properly pick up a part for placement into a machine assembly. In each of these cases, the worker (human or machine) is using his/her/its senses to evaluate the external appearance or surface features of the object to detect and measure surface data, such as color, temperature, contour, shape, surface roughness or smoothness, and the like. Clearly, given the technical nature and great importance of many of these fields, a need exists for a system that can rapidly, accurately, precisely, and objectively acquire and measure surface data and automatically compare these data to a standard, should such a standard exist. If such a standard does not exist, then the creation of such a surface assessing system would greatly aid in its creation.

One process that can be utilized to acquire and measure surface data and compare these data to a standard is by pose estimation, particularly when the scan requires acquiring data of a three-dimensional ("3D") object. Pose estimation is a process that determines the position and orientation of known objects in 3D scenes relative to a remote observer. Humans perform pose estimation on a regular basis. Anytime somebody picks up a pencil or parallel parks an automobile they are using pose estimation to determine how to orient their hand properly to pick up the pencil or to initiate a trajectory that provides the best opportunity for parking successfully. In these two cases, the pose is determined using visual sensing, i.e. stereo vision and tactile feedback, but pose can be also derived from audio, radar, and other measurements that provide relative 3D position. Accordingly, pose estimation plays a significant role in a human's ability to interact with its environment, whether that environment is static or dynamic.

Pose estimation has been used in some computer vision applications for robotic or autonomous systems, where the system attempts to perform operations that are natural to humans. These applications include, but are not limited to, object identification, object tracking, path planning, and obstacle avoidance. Potential applications using pose estimation can be as simple as an industrial robotic system identifying a particular part from a bin of many different parts for picking up and loading into a machine, or as complex as autonomous aircraft flying in formation while navigating a terrain, or a spacecraft performing autonomous rendezvous and docking with a non-cooperative spacecraft by identifying docking features, developing an interception plan, and executing the plan. These applications however all require real-time pose estimation. Further, such systems for object pose estimation typically require that various landmarks or features (such as points, lines, corners, edges, shapes, and other geometrical shapes) must be identified and selected. A pose can then be made and registration performed using such identified references. Accordingly, such a system requires an object to have pre-identified features. Further, such methods often have difficulty with objects having same features but with different dimensions. Care must be taken in selecting such features as some objects may have the identified features but different non-identified features which could result in error.

Clearly, pose estimation can be applicable for certain robotic or autonomous systems, it also has other applications such as surface alignment. For example, surface alignment takes 3D surface measurements of multiple instances of the same object with different poses relative to the observer and applies a rigid transformation to the measurements so that each instance has the same pose relative to the observer. Surface alignment allows for automatic comparison such as defect detection in high production factory settings if one of the instances serves as a "truth" model. It also allows for the generation of complete 3D surface measurements of an object by stitching multiple 3D surface measurements from varying viewpoints. Varying viewpoints are required to generate a complete 3D surface measurement, because some regions of the surface are always occluded by others. With pose estimation, surface alignment can be performed with no knowledge of the relative pose of each surface as long as some overlap exists between the individual 3D surface measurements.

Systems have been developed for use in assessing medical conditions using various imaging systems. Systems for use in analyzing skin and joints have used baseline images for comparing with a current scan of the skin or joint. Such comparisons usually operate by the physician observing the scans. Other systems have been developed to automatically make comparisons of scanned images, the patients joint or body part being scanned are required to be immobilized using a specialized mold or jig in order to ensure proper alignment of the images for registering points on the images for making proper comparisons. Such immobilization is difficult for certain body regions and makes scanning problematic if such scans are being done at different locations. Further, the patients may require different methods for immobilization making the process more complex, time consuming, and expensive. While it may be possible to automatically make comparisons of scanned images of a patient, such systems require precise positioning of the patients joint or scanned area which again is time relatively complex, consuming and expensive. Further, such systems often require that the scanner making the scan must be consistently aligned with and/or consistently positioned relative to the surface being scanned. Other systems have been developed that require the physician to make artificial references on the surface of the patient being scanned for registering to allow for the proper alignment of the images.

Many pose estimation algorithms exist in literature, and systems have now been developed for aligning (registering) 3D images with other 3D images of the same or substantially similar objects, but it has now been found that the spin-image pose estimation algorithm provides the most accurate results while being robust to sensor noise and placing no surface restrictions on the object of interest other than it must be pose distinct (i.e. unlike a sphere). It also places no restrictions on the measurement technology other than it must generate a 3D surface mesh. Although the spin-image algorithm is accurate, like other robust pose estimation algorithms, the algorithm is computationally complex and the time required to compute a pose estimate is relatively long. Unfortunately, the relatively long computational time makes it inadequate for the many engineering applications that require a robust real-time pose estimation algorithm.

The fundamental principal behind a spin-image algorithm is to provide an efficient method for representing and matching individual points of an object's surface. It should be understood that by comparing and matching spin-images one is actually comparing and matching surface points. This representation is called a spin-image. By matching the spin-images of surface points in an observed scene (scanned image) to the spin-images of surface point of the "truth" model (reference image), surface point correspondences can be established. It should be understood that the truth model can be a scan, CAD model, mathematically defined surface, and the like. This matching procedure requires that each scene spin-image be compared to all reference spin-images by determining the linear correlation between the spin-images called the similarity measure. This is one of the most time-consuming portions of the algorithm and until now makes the spin-image pose estimation algorithm impractical for many applications. For an example, a typical spin-image is a 16×16 pixel image. Therefore, the spin-image is represented by an array of 256 numbers or "counts" at each of the 256 squares forming a grid over the image. To check for matches of spin-images, the 256 numbers in the spin-image for each point in the scene image must be compared to the 256 numbers in each reference spin-image. If the 3D scene image consists of a million points, and the reference spin-image also contains a million points, therefore there are a million of these 256 comparisons that must be made (256 million comparisons to check if the spin-image for one point in the scene spin-image matches the spin-image for one of the points in the reference spin-image). If multiple scene image points are to be compared to the full set of reference spin-image points, then the number of comparisons must be multiplied by the number of scene spin-image points to be matched. Therefore, spin-images with a larger number of grid squares (such as 32×32) results in even more computations to compare spin-images. Unfortunately, as a result of such a large number of comparisons that must be made, this method of using spin-image comparisons cannot be used for real-time pose estimation and is therefore not practicable for many applications.

Analyzing and understanding the surfaces of various materials and objects is very important in a variety of industrial, scientific, agricultural, commercial, and medical settings. Because of this, a number of methods and technologies have been developed to visualize and to measure many aspects of surfaces. For example, photographs may document the color of a surface, reflectometers may measure the reflectance of a surface, galvanometers may measure the electrical conductance of a surface, pyrometers may measure the temperature of a surface, and 3D scanners may measure the contours or the undulations of a surface. In most of these cases, the measurement technology is passive, and deliberately used in such a fashion so as not to alter the surface in any way. Thus, the information obtained from the use of the technology accurately conveys the nature of the unaltered surface.

However, there exists many circumstances in which it may be beneficial to alter the surface either before, during, or after the surface visualization or measurement is made. For example, it may be beneficial to remove a biofilm from an ancient textile prior to contour scanning of the fabric weave or before carbon-14 dating of the surface materials. Likewise, removal of a layer of old varnish may be desirable before measuring the true color or the true gloss of a painting. Thus, circumstances exist in which the removal of a superficial (or a deep) layer of the surface may be desirable before, during, or after surface visualization or surface measurement. In other situations, the opposite may be true: it may be desirable to add a material to the superficial (or to the deep) layer of the surface before, during, or after surface visualization or surface measurement. For example, in order to bring out the latent properties of the neural network of the skin, one might apply ice or heat to the skin to see if the thermal changes are registered by the subject. In another setting, a cream or an ointment might be applied to the skin to enhance or to activate certain inherent features of the skin. For instance, a capsaicin cream or a camphor cream might be applied to the skin to see if changes in skin temperature or skin redness could be detected; conversely, a menthol cream might be applied to the skin to detect cooling thermal changes or increased paleness in the skin. Perhaps the skin could be numbed with a lidocaine cream prior to the application of a noxious stimulus to see if subject registers the discomfort. Or ninhydrin could be applied to detect and measure insensible sweating. Prior to photographing or scanning greyscale or monotone surfaces, it may be useful to coat the surface with a powdery substance, such as coating fossils with ammonium chloride before photographing them or 3D scanning them. It may even be desirable to totally immerse the surface in a substance (solid, liquid, or gas) before, during, or after surface visualization or surface measurement, such as immersing a fossil in xylene before taking a picture. In yet another circumstance, it may not be desirable to add or to remove anything from the surface; rather, in these situations it may be desirable to simply alter the existing surface before, during, or after the surface visualization or surface measurement. One might imagine applying a cooling stimulus to a viscous yet slowly flowing material before attempting a 3D contour scan of the surface. In another instance, one might alter the surface material via application of an electrical current across the surface, to detect areas of the surface that are conducting or resistive or perhaps to alter the crystal structure of the surface. One might chemically alter the surface to measure some property of the surface. In another instance, altering the surface by mechanically changing its native structure may be desired. For example, if a surface were comprised of multiple layers, and especially if those layers were rather loosely bonded to each other, then it may be desirable to lift up or to press down one or more of those layers before, during, or after surface visualization or surface measurement is made. One could then assess not only the apparent surface of the object but also its deeper or hidden layers. A very important embodiment of this last surface concept exists in the assessment of wounds and ulcers.

Chronic, slow-healing, or non-healing wounds and ulcers are a major problem in medicine. In the United States alone, chronic wounds affect approximately 6.5 million people and cost more than $25 billion per year to treat. Many of these wounds and ulcers are caused by diabetes, poor circulation, immobility, and obesity, and since the prevalence of each of these conditions is increasing, we can expect a concomitant increase in the numbers of chronic wounds as well.

Medical practitioners face a number of challenges in the examination of chronic wounds and ulcers. In order to determine the extent of the wound and whether or not it is healing, doctors and nurses have to measure the area and the depth of the wound. Traditionally, such measurements are made with rulers, wound probes (essentially a wooden applicator or a cotton swab-like device), and transparent wound tracings. More recently, photographs and even 3D scans have been developed to help automate these measurements. While these techniques are useful for assessing and for measuring the visible areas of the wound, they cannot easily detect, assess, or measure the regions under the edges of the wound. This is vitally important, since the edges of many chronic wounds and ulcers are underlain by infected, dying, devitalized, or avascular tissue that is not healing and which will keep the wound from healing unless detected and treated by the medical practitioner. Finding and assessing this infected or necrotic tissue can be very difficult for the doctor, as such tissue underlies the visible tissue at the surface of the wound and thus is not readily detected by the conventional wound assessment technologies. In many cases, this underlying diseased tissue gradually dissolves, undermining the wound margins and leaving the wound edges actually overhanging the visible wound bed. In other cases, infection or lack of blood flow can destroy the tissue or can separate the fascial planes of the tissue near the wound, creating a tunnel or sinus tract extending from the wound base or from the wound margins (see FIG. 26). Again, such wound tunnels are not easily detected by any of the conventional wound assessment techniques. To make matters worse, the tissue overlying the undermined tissue often sticks to the floor of the undermining, and the walls of the tissue tunnels often stick together. To find these areas of wound edge undermining and wound tunneling, doctors traditionally use a wound probe to gently push against the visible walls, edges, and floor of the wound to see if the tissue planes separate, thus indicating tissue weakening as one would expect with wound undermining or tunneling. If the wound probe can be pushed under a section of the wound margin, then the practitioner assumes that that section of the wound edge has been undermined; the distance to which the probe can be pushed under the edge before the doctor feels resistance to further probe advancement is then assumed to represent the length or the extent to which that section of the wound edge has been undermined. Frequently, the physician or the nurse will push the probe against the walls of the wound in a circumferential fashion, noting, for example, that there seems to be undermining at various points along the wound margin. These underminings are then denoted in a "clock time"-type fashion, such as "there are underminings at the 1 o'clock, the 3 o'clock, and the 7 o'clock positions around the wound. At each "clock time" position, the doctor would note the length to which he was able to insert the probe at that point, such that the depth of the undermining might be 1 centimeter (cm) at the 1 o'clock position, and 2 cm. at the 3 o'clock position, and so on. Similarly, the probe might be employed to gently push against the wound bed to look for tunneling, and the same kinds of notations made.

Clearly, these techniques are not ideal. Firstly, they are quite time-consuming for both the patient and for the physician. Secondly, they are inaccurate and imprecise, as they rely on the practitioner's "feel" as he or she pushes the probe into the tissue to the point where the examiner judges there to be resistance to further probe advancement. Thirdly, these techniques are painful for the patient with a sensitive wound. Finally, inserting anything into a wound invites contamination with whatever microbes or foreign material might be present on the probe's surface. Hence, a need exists for technology that can detect, assess, and measure wound edge undermining and wound tunneling. More broadly, a need exists for methods and for technology that can move beyond the current passive surface data retrieval methods by employing active alterations of the surface and/or the subsurface before, during, and/or after surface visualization or surface measurement.

In view of the foregoing, it is apparent that a need exists for a surface data acquisition, storage, and assessment system for detecting and quantifying similarities or differences between collected data obtained from the object of interest and stored data and which can operate in a relative short amount of time and preferably in relative real time. Further, a need exists for a system that allows objects to be scanned without the need for the object to be immobilized with a specialized mode or jig when scanned or the scanner to be in the same position relative to the object for each scan, thus placing no restrictions of how the object being scanned is positioned relative to the scanner.

SUMMARY OF THE INVENTION

The subject invention is a surface data acquisition, storage, and assessment system for detecting and quantifying similarities or differences between collected data obtained from a scanned object and stored data. In a preferred embodiment of the invention the system comprises one or more sensing components for scanning and measuring various surface features of an object. Such features include the color, temperature, texture, size, shape, spatial dimensions, contour, curvature, softness, roughness, shininess/gloss, infrared signature, electrical vectors/flux, magnetic field strength/vector/flux, dynamic rebound, spatial phase characteristics, measurements derived from spatial phase characteristics, flexibility, and other such features. The system further comprises a data analysis software module having software and/or firmware capable of comparing data retrieved from the object scanned to a database or other representation comprising data from other similar or dissimilar objects or from a previous scan of the object.

In a preferred embodiment of the invention the system and method operates by describing a 3D surface with a collection of 2D images (spin-images). The system operates such that the spin-images are represented by a substantial reduction of numbers (256 pixels are generally represented by less than 10 numbers) thus allowing for substantially quicker pose estimations. When two spin-images are compared a similarity measure (score) is generated that indicates their similarity such that the higher the score the more similar are the images. Unlike traditional methods that treat all matches equally, the subject process examines all matches based on the similarity measure and groups them using the score. The process uses the match with the highest score, creates a group and then estimates a pose. If the pose error is less than the error threshold, the process ends and the pose is estimated. If the pose error is greater than the error threshold, the process uses the match with the next highest similarity measure and repeats the process until it obtains a pose error that is less than the threshold. This process significantly increases the speed of the process such that real time comparisons can be made.

In another preferred embodiment of the invention the data analysis software module operates to detect and quantify the similarities or differences between collected data taken of the scanned object and stored (reference) data.

In another preferred embodiment of the invention the data analysis software module operates to determine the identity of the scanned object by comparing the data from scanned object to various stored (reference) data.

In another preferred embodiment of the invention the data analysis software module operates to determine differences and similarities between data obtained from two or more scans of the object in real time.

In a preferred embodiment of the invention the data analysis software module comprises computing hardware such as one or more apparatus consisting of central processing units (CPU's), graphics processing units (GPU's), digital signal processors (DSP's), microprocessors, field programmable gate arrays (FPGA's), very large scale integration (VLSI) systems, complex programmable logic devices (CPLD's), or systems on a chip (SOC's), and/or other such data processing devices including cell processors, biological processors, and quantum computing.

In another preferred embodiment of the invention the data analysis software module is capable of comparing the data retrieved from the scanned object to a database or other representation comprising data from other similar or dissimilar objects (reference data).

In another preferred embodiment of the invention, the data analysis software module is capable of detecting and quantifying the similarities or differences between collected data from the scanned object (scanned data) and stored data (reference data).

In another preferred embodiment of the invention, the data analysis software module operates to determine the identity of the scanned object by comparing the data from the scanned object (scanned data) to various stored data (reference data).

In a preferred embodiment of the invention the data analysis software module performs a method of representing the local topography of the object as a 2D histogram that is invariant to rigid transformations and creates model spin-images for the generation of plausible scanned model point correspondence for use to generate pose estimates.

In a preferred embodiment of the invention, the surface data acquisition, storage, and assessment system operates to scan a mechanical object.

In a preferred embodiment of the invention, the surface data acquisition, storage, and assessment system operates to scan a biological object.

In a preferred embodiment of the invention, the surface data acquisition, storage, and assessment system operates to scan a medical condition.

In a preferred embodiment of the invention, the surface data acquisition, storage, and assessment system operates to scan an artifact.

In a preferred embodiment of the invention, the surface data acquisition, storage, and assessment system operates to scan a geographical object.

In a preferred embodiment of the invention, the surface data acquisition, storage, and assessment system operates to scan an agricultural object.

In a preferred embodiment of the invention, the surface data acquisition, storage, and assessment system operates in conjunction with robotic manufacturing systems.

In a preferred embodiment of the invention, the surface data acquisition, storage, and assessment system operates in conjunction with robotic surgical systems.

The subject invention are methods and apparatus for surface alteration for enhancement of surface visualization, scanning, and analysis. In a preferred embodiment of the invention the apparatus comprises a scanning/visualizing element; a surface altering element; and an analysis element. The scanning/visualizing element operates to scan a surface of an object to obtain information and data of the surface. Wherein the altering element operates to alter or change the surface of the object and wherein the scanning/visualizing element operates to obtain information and data of the surface after the altering element alters or changes the surface. The analysis element operates to compare the information and data collected before the altering element alters or changes the surface with the information and data collected after the altering element alters or changes the surface.

In a preferred embodiment of the invention the analysis element operates to make a predictive analysis based on the changes in the surface of the object.

A preferred embodiment of the invention is a method comprising the steps of using a scanning/visualizing element to obtain information and data of a surface of an object. Using an altering element to alter or change the surface of the object. Using the scanning/visualizing element to obtain information and data of the surface of the object after altering or changing the surface of the object. Comparing the information and data before the altering or changing of the surface of the object with the information and data after the altering or changing of the surface.

In a preferred embodiment of the invention after comparing the information and data before the altering or changing of the surface with the information and data after the altering or changing of the surface, create a prediction analysis based on the comparison.

A preferred embodiment of the invention is a method comprising the steps of using a scanning/visualizing element to obtain information and data of a surface of an object. Using the scanning/visualizing element to obtain information and data of the surface of the object after the surface has been altered or changed. Comparing the information and data before the surface has been altered or changed with the information and data after the surface has been altered or changed.

In a preferred embodiment of the invention the method further comprises the step of making a prediction analysis based on the comparison.

A preferred embodiment of the invention is a method comprising the steps of using a scanning/visualizing element to obtain information and data of a surface of a plurality of objects over a period of time. Using an analysis element to compare the information and data to identify any changes in the surface of the plurality of objects. Comparing the information and data before the altering or changing of the surface of the object with the information and data after the altering or changing of the surface to make a predictive analysis.

Other advantages, objects, and embodiments of the invention will be apparent from the following description, the accompanying drawings and the appended claims.

BRIEF DESCRIPTION OF THE DRAWINGS

To provide a more complete understanding of the present invention and further features and advantages thereof, reference is now made to the following description taken in conjunction with the accompanying drawings, in which:

FIG. 14a-14f is a schematic representation of the process performed by the spin-image module of the system software for using information (data) obtained by the scanning component from a scan of an object taken at a particular point in time (a time different from the reference scan) whereby the system software operates to identify common points in the scans such that the scans can be overlapped onto one another such that a point along the surface of the object as shown on one image is identified as being the same point on the surface of the object as shown on the second image;

FIG. 27 is a schematic cross-section of an example of a deep wound showing a surface altering element comprising a device that touches the tissue and then creates a negative pressure, or suction, that then acts to lift up the undermined edges of the wound, thus exposing the true wound base;

FIG. 28 is a schematic cross-section of an example of a deep wound showing a surface altering element comprising a device that blows a positive pressure of air, gas, or liquid at the wound, that then acts to lift up the undermined edges of the wound, thus exposing the true wound base;

FIG. 28 is a schematic diagram of a preferred embodiment showing the elements of the present invention.

DETAILED DESCRIPTION OF THE INVENTION

Figure 1:
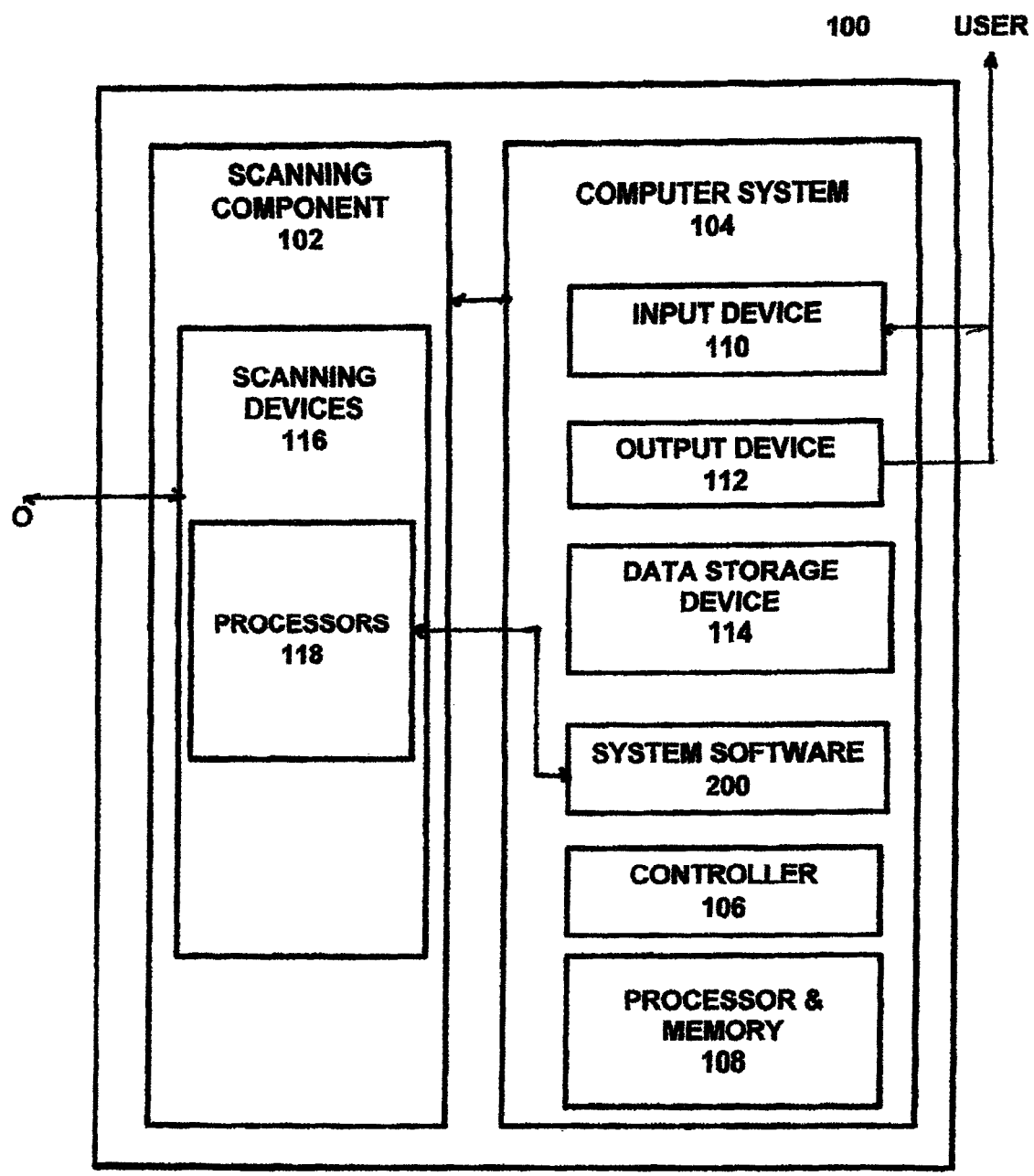
FIG. 1 is a schematic representation of a preferred embodiment of the a surface data acquisition, storage, and assessment system for detecting and quantifying similarities or differences between collected data obtained from the scanned object and stored data (reference data) showing a scanning component having one or more scanning devices and a computer system having at least one data storage device and system software.

Referring to FIG. 1, the surface data acquisition, storage, and assessment system 100 comprises a scanning component 102 and a computer system 104 for implementing and operating the system software 200 that performs the method of the subject invention. The computer system 104 includes a controller 106, a processor and a memory 108. It should be understood that the processor and memory 108 operates to perform the specific data analysis function as described herein and can comprise various computing hardware such as central processing units (CPU's), graphics processing units (GPU's), digital signal processors (DSP's), microprocessors, field programmable gate arrays (FPGA's), very large scale integration (VLSI) systems, complex programmable logic devices (CPLD's), or systems on a chip (SOC's), and/or other such data processing devices including cell processors, biological processors, and quantum computing devices. The computer system 104 further comprises other devices, such as a suitable input device, like a keypad, touch screen, or any other suitable input device 110 that can accept information; one or more suitable output devices 112, such as a computer display, printer, image-forming or display device, and the like; and a data storage device 114 such as any of the usual devices used for the storage of data, such as computer hard drives, floppy discs, binary codes, optical bits, mechanical scribes, magnetic tapes, compact discs, digital audio tapes, analog tapes, vinyl discs, and any device or devices capable of storing data. It should be understood that the computer system 104 can include any combination of the above components, or any number of different components, peripherals, and other devices. Preferably, the computer system 104 operates under the control of an operating system, such as the WINDOWS operating system developed by Microsoft Corporation or the MACINTOSH operating system developed by Apple Computer Corporation. It should be understood, however, that other operating systems could be utilized to implement the system software 200 of the surface data acquisition, storage, and assessment system 100 of the present invention.

Figure 2:
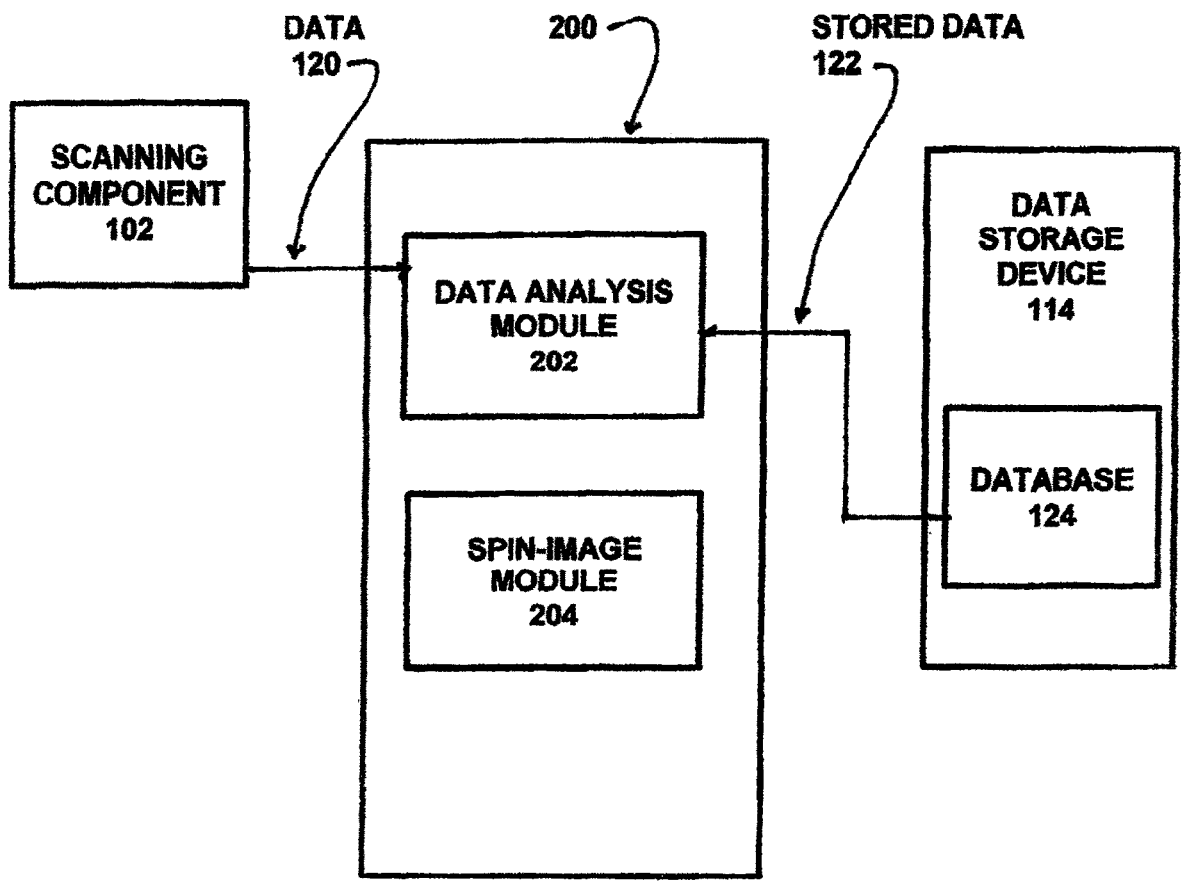
FIG. 2 is a schematic representation illustrating the general methodology of a preferred embodiment of the system software of FIG. 1 showing a data analysis module and a spin-image module.

Preferably, as shown in FIG. 2, the scanning component 102 includes one or more scanning devices 116 that operate to scan and/or measure various features of an object O. Such features include, but are not limited to color, temperature, texture, size, shape, spatial dimensions, contour, curvature, softness, roughness, shininess/gloss, infrared signature, electrical vectors/flux, magnetic field strength/vector/flux, dynamic rebound, flexibility, special phase characteristics, measurements derived from spatial phase characteristics, and other like features. The scanning devices 116 preferably comprise conventional scanning devices that have the capability to capture electromagnetic radiation from any part of the electromagnetic spectrum, and include, but not limited to visible light cameras, infrared cameras or detectors, ultraviolet cameras or detectors, x-ray or high-energy detectors, radio wave detectors, microwave detectors, structured light detectors, glossmeters, colorimeters, radiation dosimeters or reflectometers. The scanning devices 116 may also include microphones or other sound capturing devices, mechanical devices such as calipers or sensing wires or probes, laser distance or contour measuring devices, strain gauges or the like. It should be apparent to one skilled in the art that the scanning component 102 can comprise any scanning device 116 capable of detecting and/or measuring surface data of an object or any device capable of detecting or measuring data transmitted through the surface of an object. The scanning component 102 further includes one or more processors 118 which are coupled to the system software 200 of the computer system 104 such as by electrical wires or other electrically conducting fibers or circuits, optical fibers, or any other wired or wireless data connection capable of transmitting data, sound waves, or images, including Internet connections, local area networks (LAN) connections, wide area networks (WAN) connections, which operate together to direct the operation of the scanning devices 116.

Referring to FIGS. 1 and 2, the computer system software 200 is shown having a data analysis software (and/or firmware) module 202 which operates, as described below, to compare collected data 120 retrieved from the scanned object O to reference data 122 stored in database 124 within the data storage device 114 which can include a representation comprising data from other similar or dissimilar objects. In a preferred embodiment, the data analysis software module 202 operates to determine the identity of the scanned object O by comparing the collected data 120 to various stored reference data 122. It should now be apparent to one skilled in the art that data analysis software module 202 can include various information mechanisms capable of performing the wide range of data analysis enabled by the usual range of available computer programs. It should also now be apparent to those skilled in the art that the surface data acquisition, storage, and assessment system 100 may comprise a variety of scanners or detectors and databases and may be used for various purposes as will be described more fully herein.

Referring to FIGS. 1 and 2, the operating components of the surface data acquisition, storage, and assessment system 100 and the system software 200 is shown whereby the computer system 104 is in communication with the scanning component 102 such that instructions can be inputted into the system 100 using the suitable input device 110 to cause the system software 200 to direct the operation of one or more of the scanning devices 116. Preferably, the system software 200 is also an interactive, menu and event driven system using conventional type of prompt, dialog, and entry windows to guide a user to enter information and instructions to provide an interactive communications interface between the system 100 and the users. As used herein, the term "software" refers to any form of programmed machine-readable language or instructions (e.g., object code) that, when loaded or otherwise installed, provides operating instructions to a machine capable of reading those instructions, such as a computer. The system software 200 of the present invention preferably can be stored or reside on, as well as be loaded or installed from, one or more floppy disks, CD ROM disks, hard disks or any other form of suitable non-volatile electronic storage media or can be run from a remote location such as a "cloud" or Internet site. The system software 200 can also be installed by downloading or other form of remote transmission, such as by using Local or Wide Area Network (LAN or WAN)-based, Internet-based, web-based or other remote downloading or transmission methods.

Illustrative Examples Of Use

Figure 3:
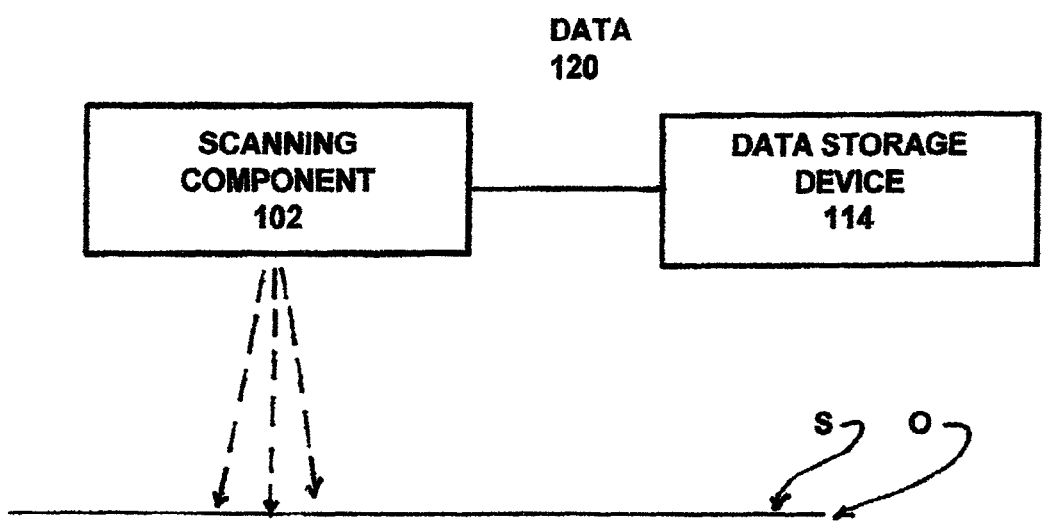
FIG. 3 is a schematic representation illustrating the general methodology showing the scanning component obtaining a scan of the surface of an object and storing the scanned information in the data storage device.

An illustrative example of a preferred embodiment of the surface data acquisition, storage, and assessment system 100 of the subject invention is shown in FIG. 3 wherein the scanning component 102 is a visible light camera capable of detecting shape or form, and a color-detecting device, such as a colorimeter. The system 100 as used herein operates to scan the surface S of an object O. In one illustrative example the object is a painting which is scanned to quantify the painter's brushstrokes and use of color. These collected data 120 are then transmitted to data storage device 114 for future processing by the system software 200 and/or transmitted to the data analysis module 202 of the system software 200. For one illustrated example, database 124 includes for example stored reference data 122 of the brushstrokes and color palettes of all known painters. It should now be apparent to one skilled in the art that the database 124 can also comprise stored reference data 122 containing a library of standard elements, such as for example artistic elements of length or shape of brushstroke, implement used to apply pigment, medium, subject matter, and so on. In the illustrated example, after the collected data 120 is obtained, the data analysis module 202 of the system software 200 causes the data analysis module 202 to operate and use the collected scanned data 120 to make a determination such as the likely identity of the painter who painted the painting.

It should be now be apparent to one skilled in the art that the system 100 could be used for similar operations such as, but not limited to, identifying and/or grading coins (via the coins' colors, luster, shininess, and physical form), to authenticate other artwork, such as sculpture, via surface data collection on carving, color, and/or materials used, for object recognition, surface analysis, medical analysis, manufacturing analysis, product review, and other similar uses that can benefit from comparing a scanned object with a set of reference data.

In other preferred embodiments, the system 100 is used by earth scientists to identify and/or analyze rocks, minerals, soils, and other materials. Here, the scanning component 102 is a three-dimensional scanning device 116, such as structured light or laser, that detects and measures the object's clast or particle sizes and ratios; and/or a color detector (such as a color camera) to detect and measure the object's color; and/or an ultraviolet light detector to detect and measure the object's ultraviolet reflections, absorptions, or emissions; and/or a thermo detector (such as a thermo camera or laser) to measure temperature at various locations along an object. The collected scanned data 120 is then transmitted to the data storage device 114 for use by the data analysis module 202 of the system software 200. In a preferred embodiment the database 124 includes stored reference data 122 such as the various characteristics of rocks, minerals, and soils, thus allowing comparisons to be made between the collected scanned data 120 and that of known samples stored in the database 124, allowing the data analysis module 202 to operate to make a determination/ identification of the object. It should now be apparent to one skilled in the art that the stored reference data 122 can be a library of standard geological elements, such as clast size, luster, color, cleavage, other crystallographic indices, chemical composition, and so on.

Figure 4:
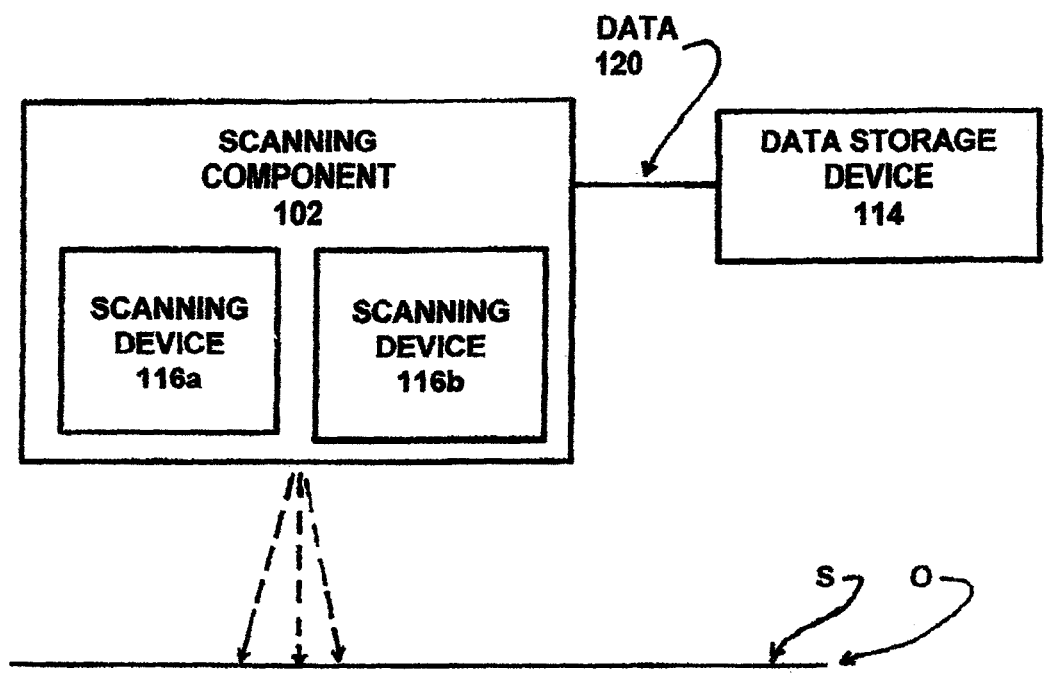
FIG. 4 is a schematic representation illustrating the general methodology of the scanning component having at least one scanning device performing a scan of the surface of an object and storing the scanned information (data) in the data storage device.

In another illustrative example as shown in FIG. 4, the surface acquisition, storage, and assessment system 100 is used by paleontologists. In this illustrative example, the scanning component 102 comprises multiple scanning devices 116 such as a three-dimensional surface scanning device 116a and a color—detecting device 116b, which cooperate together to scan the surface of objects 0, such as a fossil. The data analysis module 202 can then operate to determine various aspects of the object, such as species definition and/or the identity of the object by comparing collected scanned data 120 with stored reference data 122, such as that of known specimens. It should now be apparent to one skilled in the art that by these means, users, such as scientists, can create a mathematical definition of species, based on their surface scanned data, such as the width, length, or height or color of various specimens. It should also now be apparent to one skilled in the art that both living and fossilized biological specimens could be analyzed by these means.

It should now be understood that the above examples are illustrative of the numerous applications of the surface data acquisition, storage, and assessment system 100 and many other applications can now be readily realized by those skilled in the art. For example, the scanning component 102 can comprise one or more various scanning devices 116 such as a three-dimensional scanning device, such as a laser; and a color-detecting device, such as a color camera; and a thermo imaging system, such as a thermo camera or laser. The database 124 can include various stored reference data 122 such as shapes, contours, translations, orientations, scale, colors, and temperatures of various parts of objects. The system 100 can then be used in various applications to identify, locate, pick up, and place such parts into an assembly, compare objects, compare various aspects of an object with desired manufacturing or operating ranges, perform inspections, perform studies, and various other applications that should now be apparent to one skilled in the art. Accordingly, for example, a scan of an object, such as in a manufacturing operation or a testing operation, an object can be scanned and the various parameters comprising the collected data can be compared with reference data and analyzed for defects, such as hot spots, dimensions, colors, etc. that are outside allowable tolerances.

Data Analysis Software

The data analysis module 202 of the system software 200 operates by utilizing fuzzy logic and weighted parameters to determine and make recommendations or provide the necessary instructions, for various applications such as described above. For an illustrative example of the fuzzy logic of the system software 200, one weighted parameter could include size or dimensions of an object, such as for a medical condition like a mole or rash which is used herein as an illustrative example, it could be decided that larger the object the worse the prognosis. For example, it could be decided that: 1 mm diameter=5% chance of malignancy, 2 mm=10% chance, 3 mm=30% chance, 4 mm=70% chance, and 5 mm=90% chance. For shape, an all smooth border=5% chance, 10% of total border is irregular=10% chance, 25% of border is irregular=30% chance, 50% irregular=70% chance, 75% irregular=90% chance, and 100% irregular=99% chance of malignancy. Another weighted parameter could be color, whereby all uniformly same as patient's uninvolved skin color=5% chance of malignancy, any nonuniformity of color, but no red or blue=10% chance, any red color=30% chance, any blue color=80% chance, and variegation (mixed reds and blues)=throughout and another weighted parameter could be temperature whereby reference skin temperature=5% chance of malignancy, any area of mole with temperature>0.2 degree F. above reference temperature=30% chance, temperature>0.4 degrees=50% chance, >0.6 degrees=80% chance, >0.8 degrees=90% chance, and >1.0 degrees=95% chance of malignancy. It should now be apparent to one skilled in the art that such determination can be placed into fuzzy sets based on the known parameters as stored reference data 122 in the database 124 of the data storage device 114. The data analysis module 202 then operates to compute and display a recommendation based on the collected scanned data 120 in accordance with the weighted parameters and the sets of stored reference data 122.

In another illustrative example, moles using the scanning component of the subject invention have been scanned for measurement of size, shape, color and temperature. It should be noted that for this example weighted parameters could include the larger the size, the more irregular the border, the redder, bluer, or more non-uniform the color, and the warmer (relative to the skin reference temperature), the greater the suspicion that the mole is malignant, i.e., a melanoma. The system software 200 operates that for each case "yes/no" cutoffs are created for each of the above weighted parameters ("yes" is considered suspicious for malignancy, "no" is considered not as suspicious). Further, for this example weighted parameters can be determined such that: for size, greater than 4 mm. diameter is considered to be suspicious; for shape, any border irregularity (means border is not a smooth, continuous curve) is considered to be suspicious; for color, any red, blue, or variegated color is considered to be suspicious; and for temperature, any temperature greater than reference temperature is considered to be suspicious, according such determinations result in one of the following 16 outcomes (+ is considered to be suspicious, − is considered to be not suspicious outcome of scan for that parameter):

| Scenario | Size | Shape | Color | Temp. |
|---|---|---|---|---|
| 1 | − | − | − | − |
| 2 | + | − | − | − |
| 3 | − | + | − | − |
| 4 | − | − | + | − |
| 5 | − | − | − | + |
| 6 | + | + | − | − |
| 7 | + | − | + | − |
| 8 | + | − | − | + |
| 9 | − | + | + | − |
| 10 | − | + | − | + |
| 11 | − | − | + | + |
| 12 | + | + | + | − |
| 13 | + | − | + | + |
| 14 | + | + | − | + |
| 15 | − | + | + | + |
| 16 | + | + | + | + |

In general, outcomes 1 through 3 would result with the data analysis module operating to determine and display a recommendation, such as on the output device of the computer system, to "not biopsy", while outcomes 4 through 16 would result in the data analysis module operating to determine and display the recommendation "biopsy or remove." Accordingly, unlike systems that only compares an image of a scanned mole to stored reference images of actual moles, the subject invention operates to compare measurements of scanned mole to a set of fixed parameters that may be weighted and calculates a recommendation based on such fixed parameters.

To further understand the operation of the data analysis module and the fuzzy logic utilized, the following exemplary illustration is provided. In a preferred embodiment of the invention, the surface acquisition, storage, and assessment system 100 operates, such as shown in FIG. 4, whereby the scanning component 102 includes scanning devices 116a and 116b effective for collecting the following scanned collected data 120 and saves the scanned collected data 120 into the data storage device 114:

Diameter—Measured as the largest distance between two points on the border of the mole.

Shape— A normalized measure of the regularity of the mole boarder. 0 indicates a smooth mole boarder like a circle, while 1 indicates a mole boarder that is highly irregular or rough.

Redness— A normalized measure of the average red color content of the mole. 1 indicates Red, while 0 indicates the presence of no red color content.

Blueness— A normalized measure of the average blue color content of the mole. 1 indicates Blue, while 0 indicates the presence of no blue color content.

Variegation— A normalized measure of the color consistency of the mole. 0 indicates a consistent color profile for the whole mole, while 1 indicates high variation in the color content about the surface of the mole.

Temperature—Measured as the average temperature of the mole relative to the normal skin temperature.

The data analysis module 202 of the surface acquisition, storage, and assessment system 100 used the scanned collected data 120 that has been weighted with stored reference data 122 and generates a display of a recommendation showing the type of intervention that should be applied as well as a confidence factor in accordance with the weighted parameters to be included in that recommendation. In this example, the possible interventions are to "Do Nothing," "Biopsy," or "Exsize."

In another exemplary illustration the surface data acquisition, storage, and assessment system 100 is used for surface analysis or manufacturing analysis (for example for bridge evaluation to quantify the danger associated with present cracks). The system 100 operates such that the scanning component 102 having various scanning devices 116 functions by scanning surface cracks and cooperates with the data analysis module 202 that uses collected data 120 with stored reference data 122 functions to determine:

Length— A normalized measure of the total length of all cracks present in a given image. This is normalized by the maximum dimension of that particular object being imaged. 0 indicates no crack, while 1 indicates a crack spanning the object.

Depth— A normalized measure of the maximum depth of all the cracks present in a given image. This is normalized by the dimension of that particular object being imaged in the direction of the crack depth propagation. 0 indicates no crack, while 1 indicates a crack penetrating through the object.

Branching— A normalized measure of the number of cracks stemming from other cracks. 0 indicates no branches, while 1 indicates a significant number of branches.

The data is then used by the data analysis module 202 to generate an output that is a normalized measure of the potential risk of failure due to cracking where "0" indicates no risk, while "1" indicates extremely high likelihood of failure. In a preferred embodiment, the data analysis module 202 further operates to create recommendations on the action that should be taken in view of the scans and the weighted parameters with regards to repairing or replace the affected structure. For this illustrative example, the scanned collected data 120 can be compared with stored reference data 122 in the database 124, and using fuzzy logic as described above analyzed to determine the safety of the structure, such as the bridge. In this illustrative example the output of the system 100 is a decision in the type of action that should be applied: "do nothing," "repair," or "replace."

It should be readily apparent to one skilled in the art that the system of present invention can be configured to operate in conjunction with various devices and apparatus, and for use in many applications. Further, it should be understood that the weighted parameters are given weights based on the significance of the parameter in relation to object and condition being assessed. Table 1 provides a listing of additional applications of the invention. It should be understood however that the various apparatus and applications contained herein is for illustrative purposes and it should be understood that the systems and methods of the subject invention are not limited to the provided examples and listings.

TABLE 1

Various Applications of the Invention.

| Object of Interest | Scanning device 116 | Application/Utility of Invention |
|---|---|---|
| Metals/concrete/roads microfractures/failure | 3D/x-ray imager/color/thermal | Detect |
| Surfaces that form via curing/surface curing/drying/ solidifying/annealing | 3D imager/color/thermal | Detect/measure smoothness/defects |
| Tires wear | 3D imager/thermal/ dynamic rebound | Detect cracks/ leaks/abnl. |
| Tools/gears cracks/defects/failure | 3D/x-ray imager/thermal/color | Detect |
| Cutting implements sharpness/cracks | 3D/x-ray imager/thermal/color | Detect/measure |
| Growing objects, e.g. biological/crystals | 3D imager/color/thermal | Measure rate of growth |
| Cosmetics | 3D imager/color/thermal | Measure coverage/blending |
| Electrical circuits | 3D imager/thermal/ magnetic | Detect circuit defects/shorts |
| Welds/solders/brazes defects | 3D/x-ray imager/ thermal/color | Detect weld/solder/ braze |
| Foodstuffs | 3D imager/color/thermal | Detect spoilage/ ripeness |
| Animals disease | 3D imager/color/thermal | Veterinary detection of |
| Gemstones gemstones | 3D/x-ray imager/ color/thermal | Identify/authenticate |
| Cell/tissue cultures | 3D imager/color/thermal | Identify cultured material |
| Pathological specimens | 3D/x-ray imager/ color/thermal | Identify/classify specimen |
| Normal biological tissue | 3D/x-ray imager/ color/thermal | Screening for normalcy |
| Fabrics/textiles defects | 3D scanning/ color/thermal | Detect/measure fabric |
| Sanitary surfaces contaminants/germs | 3D scanning/ color/thermal | Detect |

It should also be understood that the system is not limited to fuzzy logic systems but that other logic systems such as Bayesian logic, artificial neural networks, and other like systems can also be used.

In another preferred embodiment of the invention the surface data acquisition, storage, and assessment system 100 of the subject invention operates by performing two or more scans of an object and comparing the scan images to determine changes in the object that occurred during the period between the scans. In another preferred embodiment, the subject invention operates by performing at least one scan of an object and a scan of a model or another object and determines changes between the two.

Spin-Image Matching

One difficulty in comparing images from two or more scans taken over a period of time using conventional computer processing is the need to ensure that common points on the two images are properly aligned. One method for properly aligning scans is by use of a process utilizing spin-images. Spin-images are generated to provide a simple representation that can be used to compare the spin-images from different points on two representations of an object to see whether they have similar spin-images. If they do, this implies the representations correspond to the same surface point. Spin-image matching is the process of determining the similarity of a scene spin-image to those in a spin-image stack (database) created from a reference model or image of that object. Due to noise, lighting, and other effects, spin-images from different instances of an object will never be exactly the same. Therefore, a meaningful way of comparing two images is required. Further, in for many applications, comparing images must be done in real-time, thus, comparing images must be done in a manner to allow for real-time comparisons. In addition, such comparisons must be made at various locations that do not permit the use of expensive, room-sized specialized computer systems.

Figure 7:
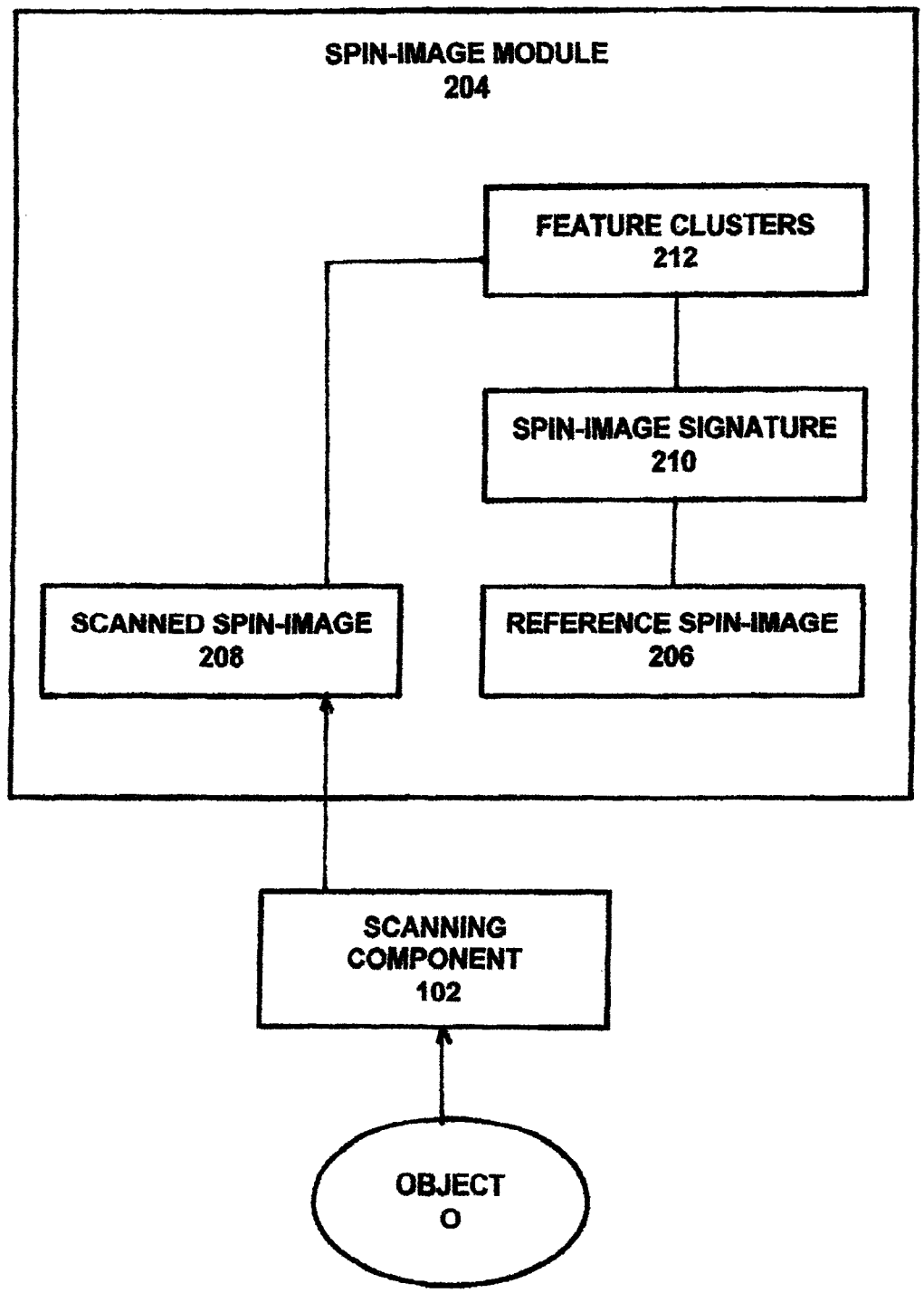
FIG. 7 is a schematic representation illustrating the general methodology of the spin-image module of the system software.

Data Analysis Software Module (Superimposing Scan Images):

Referring to FIGS. 2 and 7, in a preferred embodiment of the invention, the system software 200 preferably comprises a spin-image module 204 for providing an efficient method of representing and matching individual points of an object's surface S necessary for comparing two or more scene (scanned) images. In order to parallelize the matching portion of the spin-image module 204 enough to approach real-time performance needed for many applications, while not requiring room sized, power hungry computer systems, the processor and memory 108 of the computer system 104 preferably is a graphics processing unit (GPU) for a parallel implementation of the matching portion of the spin-image module 204. In a preferred embodiment of the invention the GPU has a massively parallel, many-core computing architecture that provides teraflop computing power in a scalable, portable, power efficient, and affordable platform. One illustrative example of such a GPU is sold by Nvidia Corporation of Santa Clare, California.

In another preferred embodiment of the invention the spin-image module 204 operates such that the matching operation restricts reference spin-images 206 (obtained from previous scans of an object) by comparing only those most likely to match the scene spin-image 208 (obtained from a scan of an object that is being compared to reference spin-images). The spin-image module 204 operates by using a spin-image signature 210 (reduced-order representation of a spin-image) to identify feature clusters 212 in the set of reference spin-images 206. The spin-image module 204 further operates to find the degrees of membership of a scene (scanned) spin-image 208 to the clusters 212 of the set of reference spin-images 206. The reference spin-images 206 are then filtered by comparing the reference spin-images 206 and determining the degrees of membership similar to that of the scene (scanned) spin-image of interest 208. A similarity measure is than determined and grouped in accordance with the similarity measure and checked to ensure that the two images are geometrically consistent and then a pose is estimated. As used here the following definitions apply:

c'-Image: is a reduced order representation of a spin-image described by the degree of membership of that spin-image to each fuzzy cluster.

Cluster Center: indicates the centroid of a fuzzy cluster.

Data Clustering: data clustering is the process of dividing data elements into clusters so that items in the same class are as similar as possible, and items in different classes are as dissimilar as possible.

Degree of Membership (DOM): DOM values indicate the strength of the association between a data element and a particular fuzzy cluster. Sum of DOM's for each fuzzy cluster must equal 1.

Fuzzy Clustering: in hard clustering, data is divided into distinct clusters, where each data element belongs to exactly one cluster. In fuzzy clustering, data elements can belong to more than one cluster, and associated with each element is a set of membership levels.

Group: A group is a set of geometrically consistent surface point correspondences between two instances of an object. A group must have at least 3 geometrically consistent surface point correspondences in order for the relative object pose to be calculated.

Similarity Measure: The similarity measure is a variable used as a comparison between two sets of data, such as the similarity between two spin-images. It is a single number. Typically the higher the similarity measure the more similar the data sets are to each other.

Figure 11:
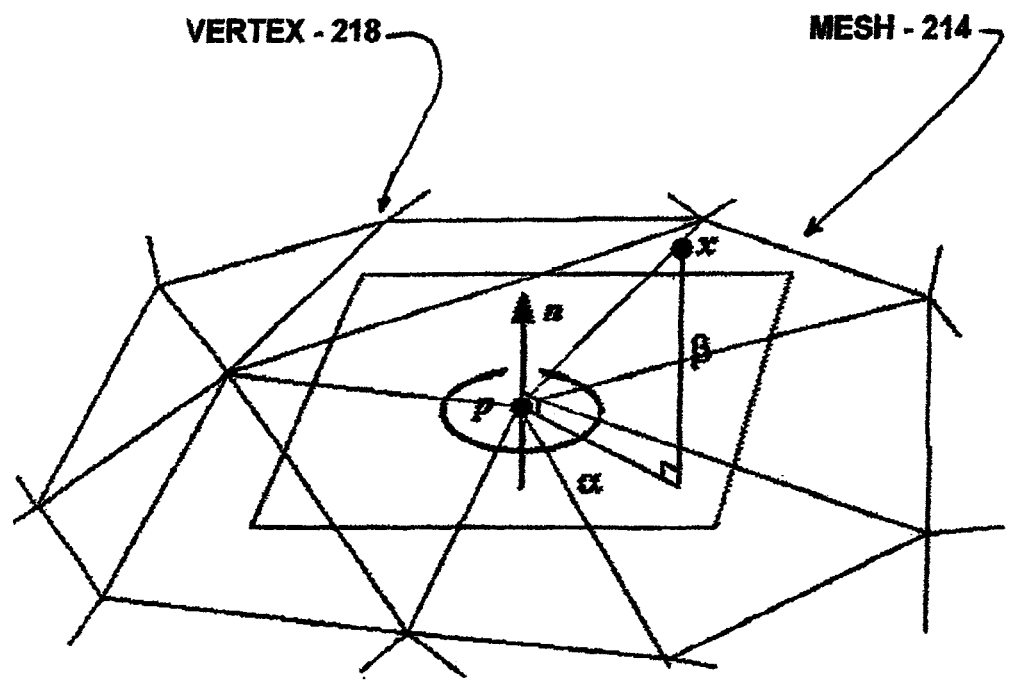
FIG. 11 is an exemplary schematic illustration showing spin-image coordinates.

Spin-Image: A spin-image is a local 2D representation of a 2.5D or 3D surface. A spin-image is constructed using an object-centered coordinate system which makes this representation independent of its pose relative to an observer (FIG. 11). By generating spin-images for all points on an object's surface a database or stack can be formed that consists of multiple spin-images which represent the whole surface of an object of interest. By using a 2D representation, established techniques for 2D image correlation can be used. It should be understood even though "image" is explicit in its name and image processing techniques are used for comparing spin-images, spin-images are technically 2D histograms, not "images".

Spin-Image Signature: A spin-image signature is a reduced order representation of a spin-image comprised of the sum of the values in the spin-image belonging to independent positive crowns, negative crowns, and sectors. In practice, however, a spin-image signature can also be a vector comprising of various statistical data from a spin-image (mean, median, std., entropy, etc.) or a property of the object at the point represented by the spin-image (Gaussian curvature, mean curvature, eigenvalues of the covariance matrix, etc.).

Stack: A stack is a collection of multiple instances of a variable belonging to a single object of interest. Each instance belongs to differing spatial or temporal locations on the object of interest (i.e. a mug). A Spin-Image Stack would then be a collection of each spin image computed at all points on the mug's surface. If the object of interest was non-rigid like a car when its doors open and close, time dependent spin-images would be included based on dynamic model of the door opening and closing.

In a preferred embodiment of the invention the spin-image module operates to estimate the most accurate pose (pose estimate) within a user-determined error threshold as quickly as possible using the scanned surface data. The spin-image module operates to compare a single scene (scanned) spin-image to all reference spin-images to determine surface point correspondences. The spin-image module then performs a grouping procedure for generating numerous geometrically consistent surface point correspondence between the scene and reference surface data. The spin-image module further performs a validation procedure such that the final pose estimate selected results in a pose estimation error within the specified threshold as quickly as possible.

In a preferred embodiment of the invention the grouping procedure performed by the spin-image module uses similarity measures calculated when matching spin-images to ensure that groups are generated utilizing only the spin-images with the highest similarity measures. Once a grouping is found that results in a pose estimate within the desired threshold, the procedure ends.

Figure 8A:
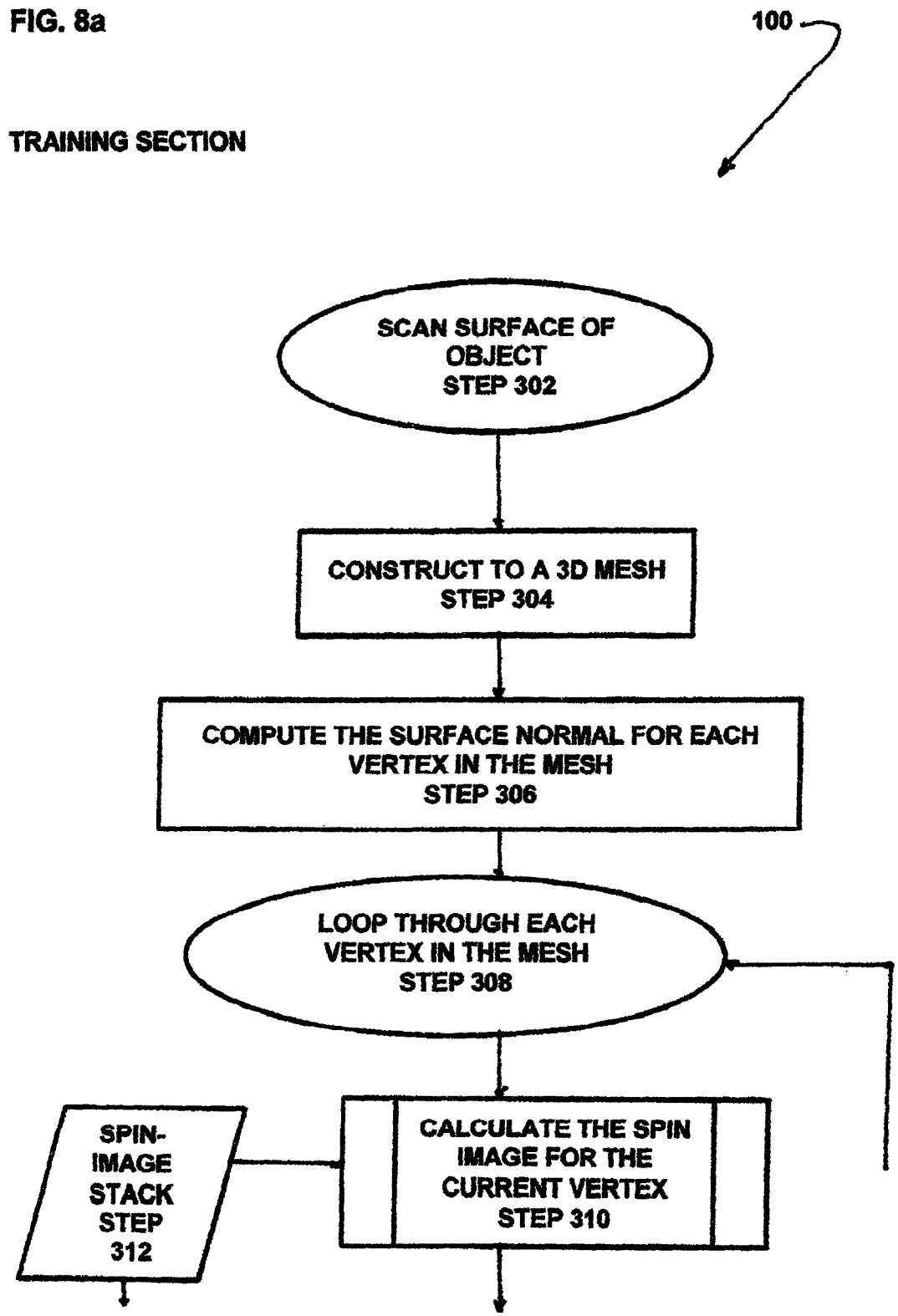
FIG. 8a-8c is a schematic representation of the process performed by the spin-image module of the system software for training the system software using information (data) obtained by the scanning component from a scan (or CAD drawing, mathematically defined surface, and the like) of an object (reference scan) taken at a particular point in time.
Figure 8B:
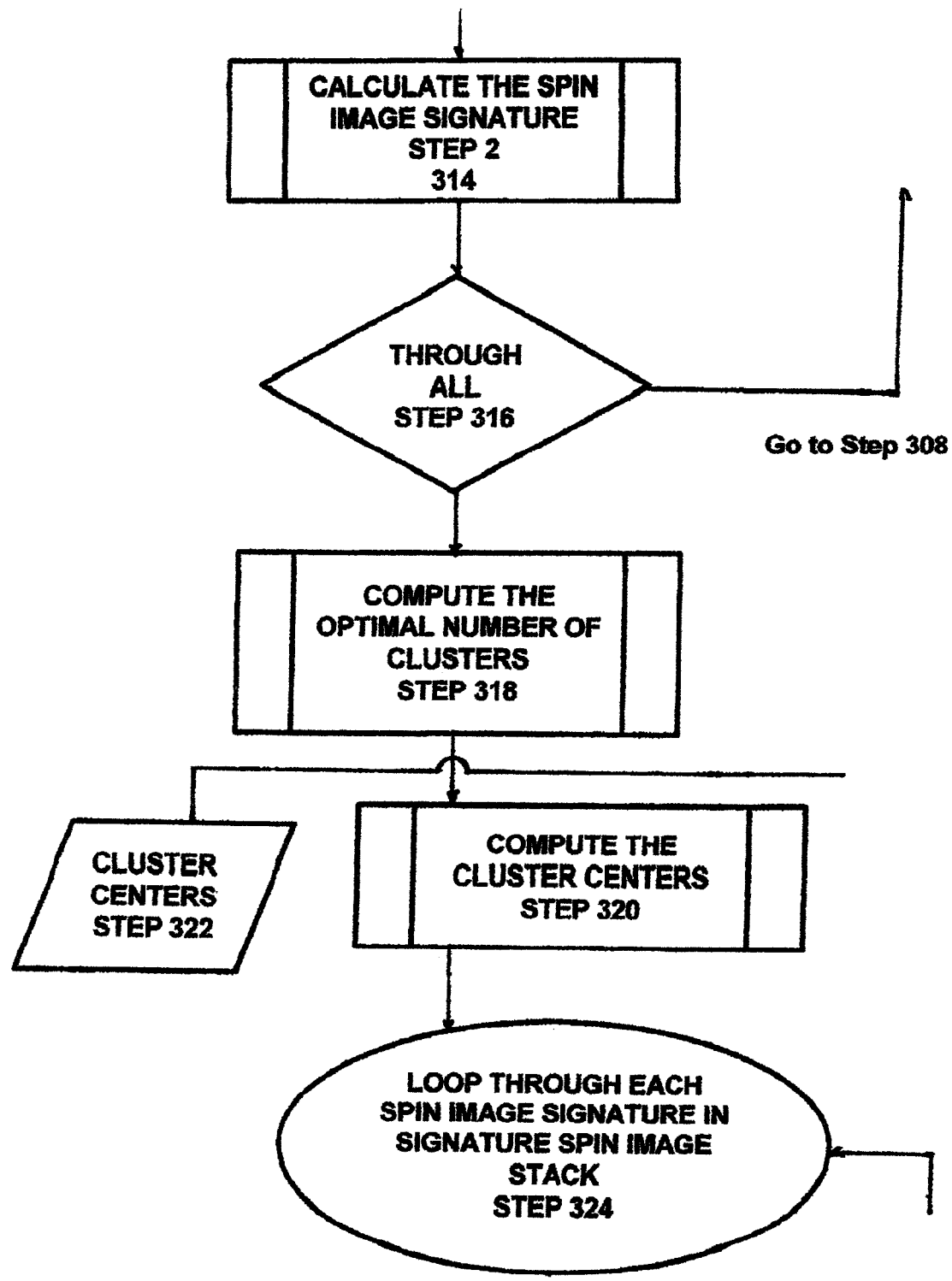
Figure 8C:
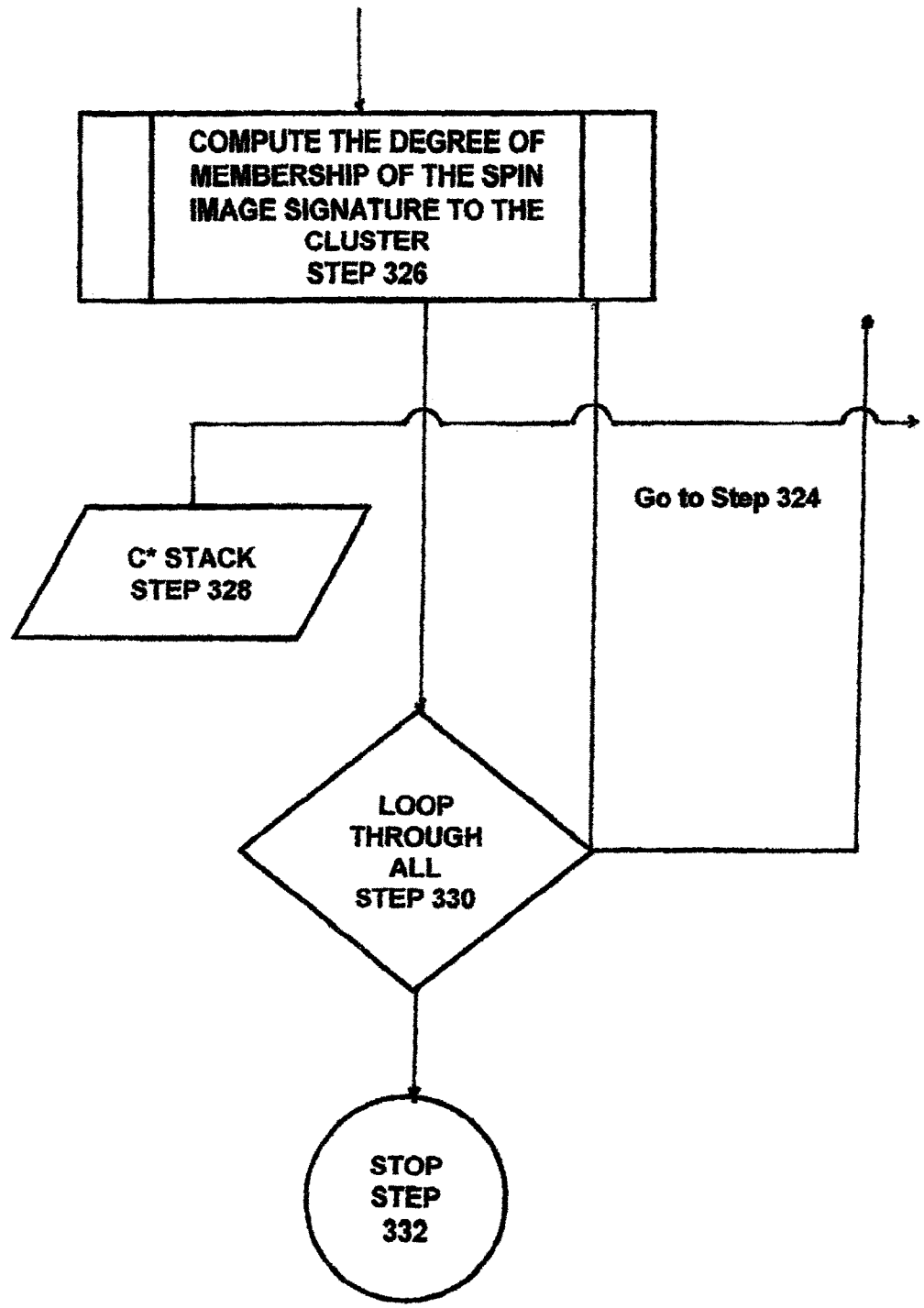
Figure 9:
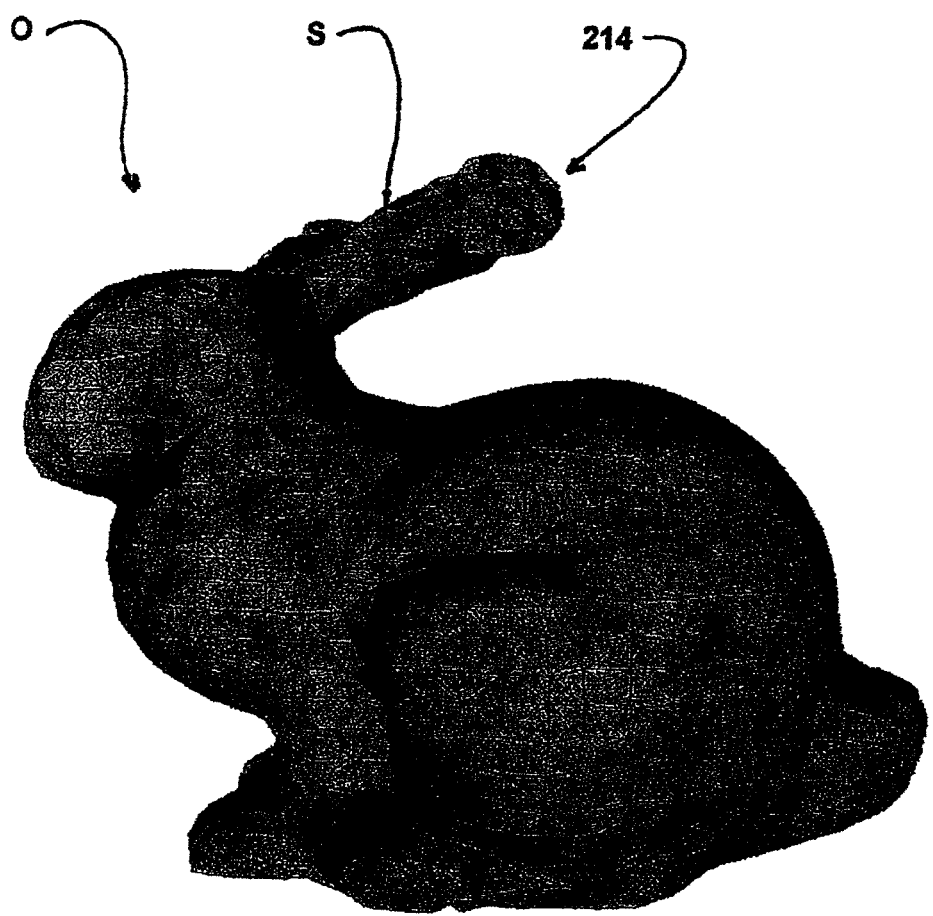
FIG. 9 is an exemplary schematic illustration showing a triangular polygonal mesh created using the information obtained from a scan of an object.

Referring to FIGS. 8a-8c, the general methodology of the process performed by the spin-image module is shown. The spin-image module operates by scanning the surface of an object (step 302) and constructing a 3D mesh of an image of the scanned 3D surface (step 304). The mesh serves as a reference for the surface and is used to train the spin-image module. An exemplary illustration of a 3D mesh 214 is shown in FIG. 9. It should be understood that the process present is robust to any type of 3D imaging technology as long as the output of that technology can be represented as a 3D polygonal mesh. The process is also robust to any type of 3D polygonal mesh representation, whether that be by 3-, 4-, or n-sided polygons. The only limitation imposed on the input mesh is that it must represent a pose distinct object (i.e. not generally a sphere) FIG. 9 shows a 3-sided polygonal mesh 214 for referencing the surface S of an object O.

Figure 10:
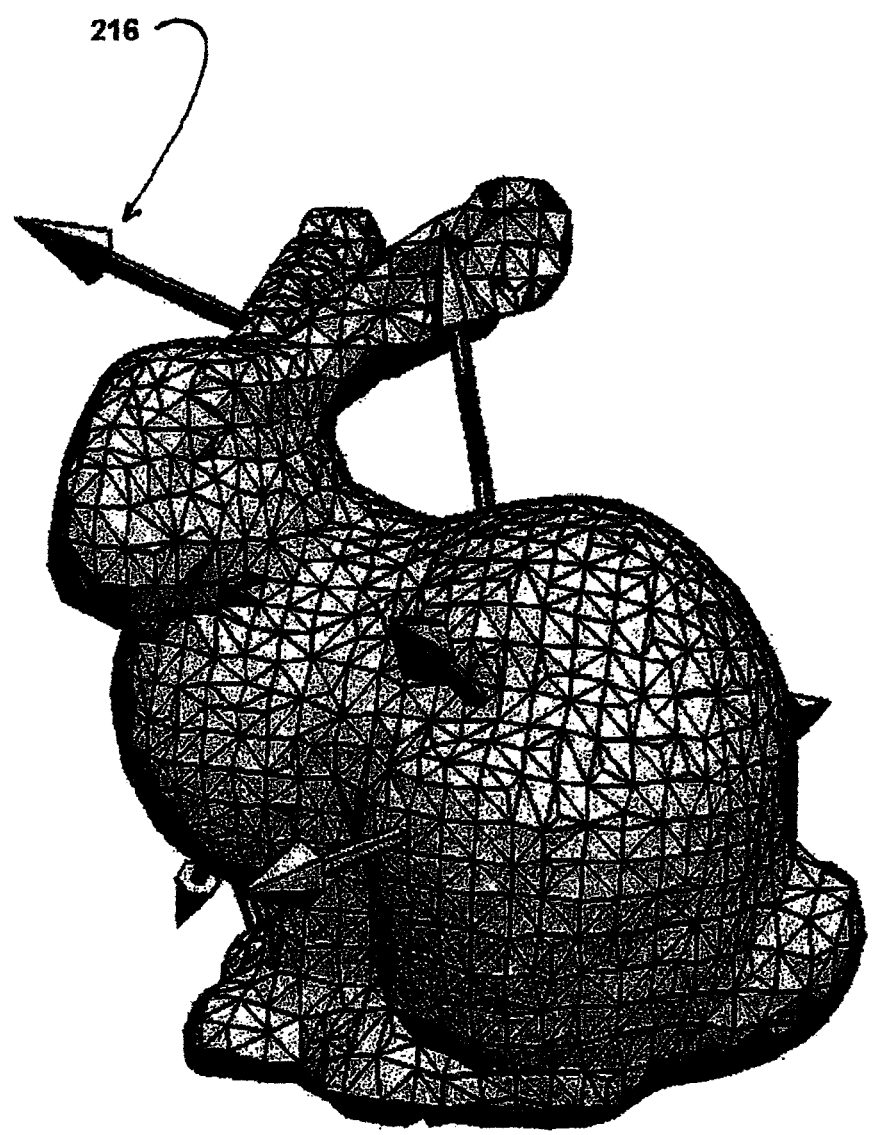
FIG. 10 is an exemplary schematic illustration showing the polygonal mesh of FIG. 9 further showing representative vertex surface normals.

The spin-image module then operates to compute a surface normal 216 for each vertex 218 in the mesh 214 (step 306). FIG. 10 is an exemplary illustration showing the surface normals 216 for each vertex 218 in the mesh 214. The vertex of a mesh is actual point measurements and is graphically defined such as shown in FIG. 11. The representation used to identify individual surface points on an object, called the spin-image, uses an object-centric coordinate system (FIG. 11) defined by each vertices' associate surface normal. Surface normals can be defined in various ways, one way to compute a surface normal from a mesh is by finding eigenvalue corresponding to the smallest eigenvalue of a covariance matrix defined by a surface point and its neighboring surface points. However, preferably the surface normal for each vertex in the mesh is implicitly encoded in the mesh. A common standard in representing meshes is to order the vertices that define a face in counterclockwise fashion. The surface normal for each face is then defined as the cross product of two of the edges in the face. This allows for vertex surface normals to easily be computed as the average surface normal for each face in the mesh that shares that particular vertex (FIG. 10).

The spin-image module 204 then operates to loop through each vertex 218 in the mesh 214 (step 308). The spin-image process performed by the spin-image module 204 works on the principle that a 3D surface can be represented by a series of 2D images that represent the local topography of a surface at a specified location on the surface. By looping through each vertex in the mesh, that vertex and its associated surface normal calculated in step 306 are used to define an oriented point, a concatenation of the 3D location of the vertex and its surface normal. The vertex and it's normal then defines the origin and orientation of a new coordinate system used to define each spin-image respectively. It should be understood that Instead of using a loop, this process could be performed in parallel.

Figure 12:
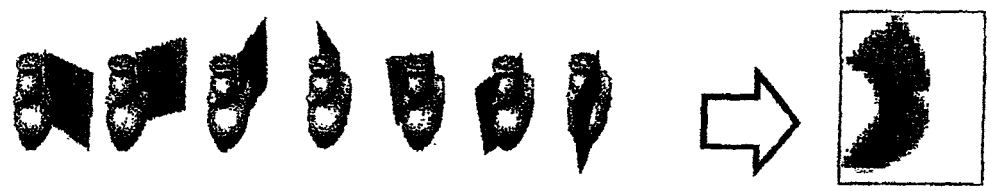
FIG. 12 is an exemplary schematic illustration showing the general methodology of spin-image generation.

The spin-image module 204 then operates to calculate the spin-image for the current vertex (step 310). For the current mesh vertex in the loop, the spin-image for that point used to represent its local topography is defined as a 2D histogram, which can be thought of as a discretization of the other vertices in the mesh relative to the coordinate system defined by the oriented point. As shown in FIG. 11, the coordinate system defined by the oriented point can be thought of as the distance in space from the vertex parallel to the vertex's surface normal (13), and the distance in space from the vertex perpendicular to the vertex's surface normal (a) as shown. It can also be thought of as a finite plane rotating about the vertex's normal. As it rotates it accumulates all the other mesh vertices it comes in contact with at the point of contact as illustrated in FIG. 12.

Figure 13:
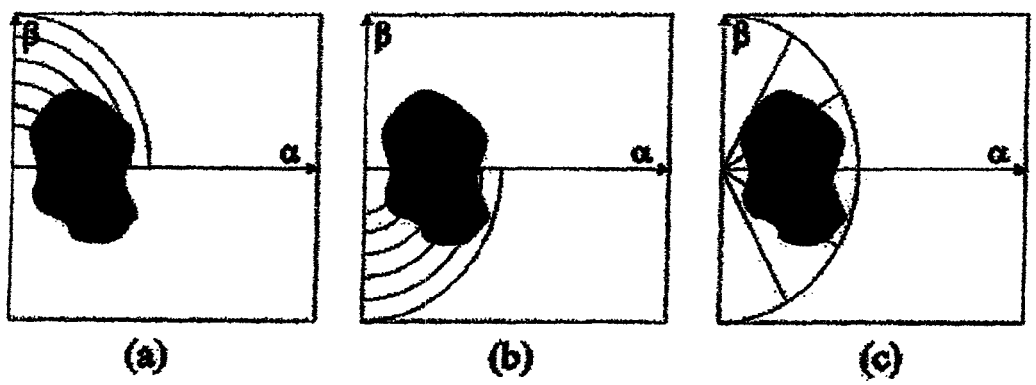
FIG. 13 is an exemplary schematic illustration showing spin-image signatures with positive crowns, negative crowns, and sectors.
Figure 14A:
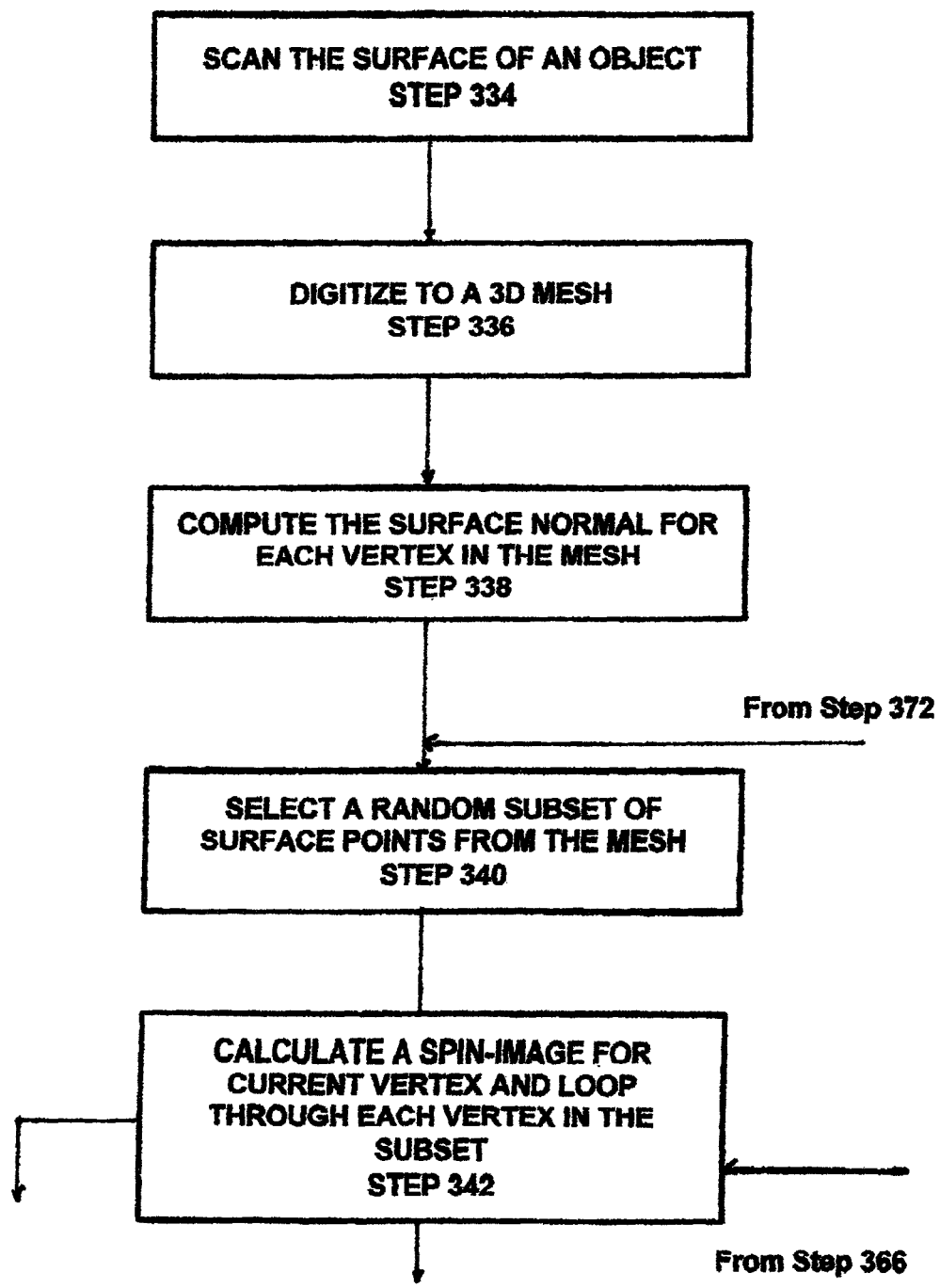
Figure 14C:
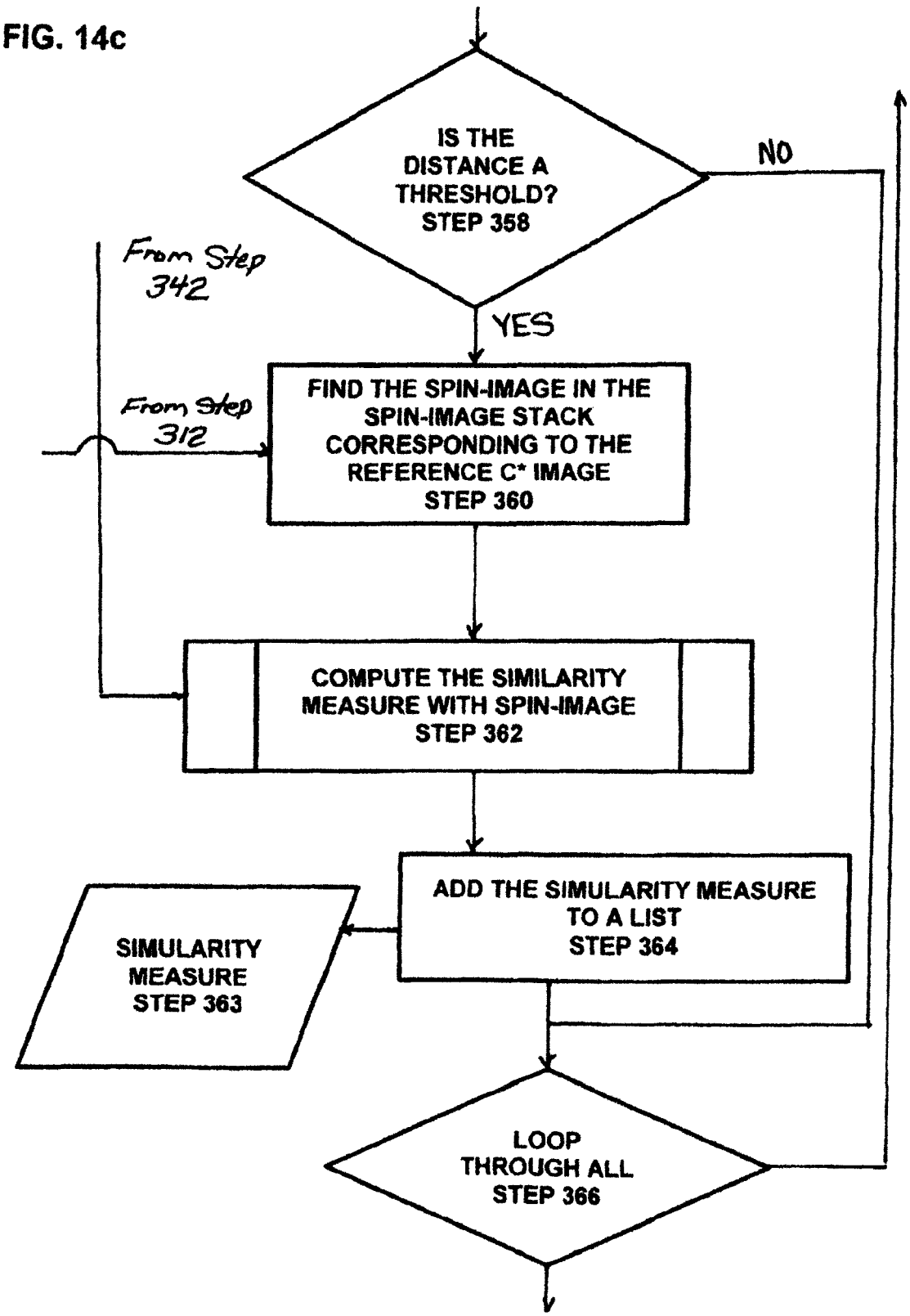
Figure 14D:
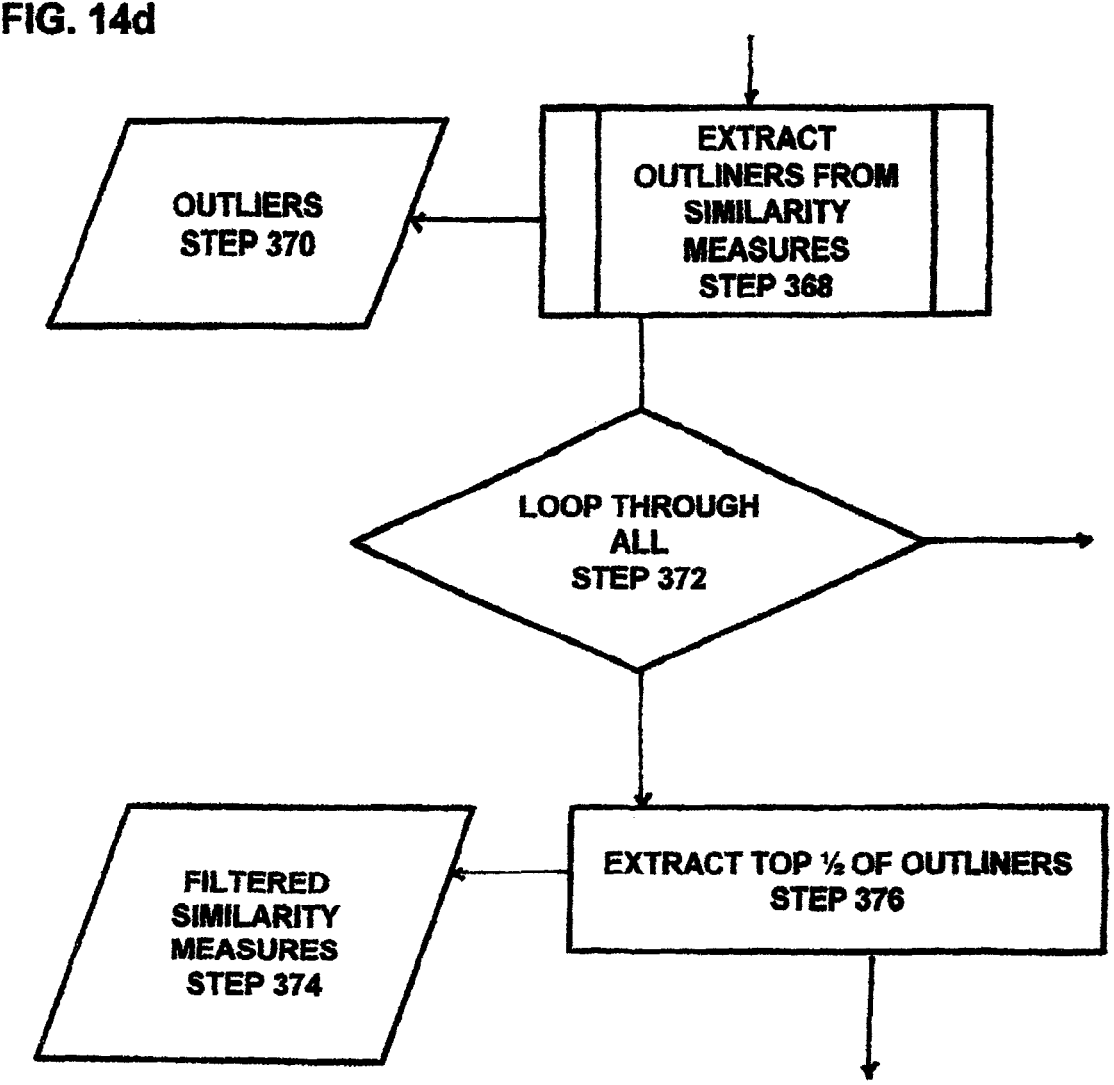
Figure 14E:
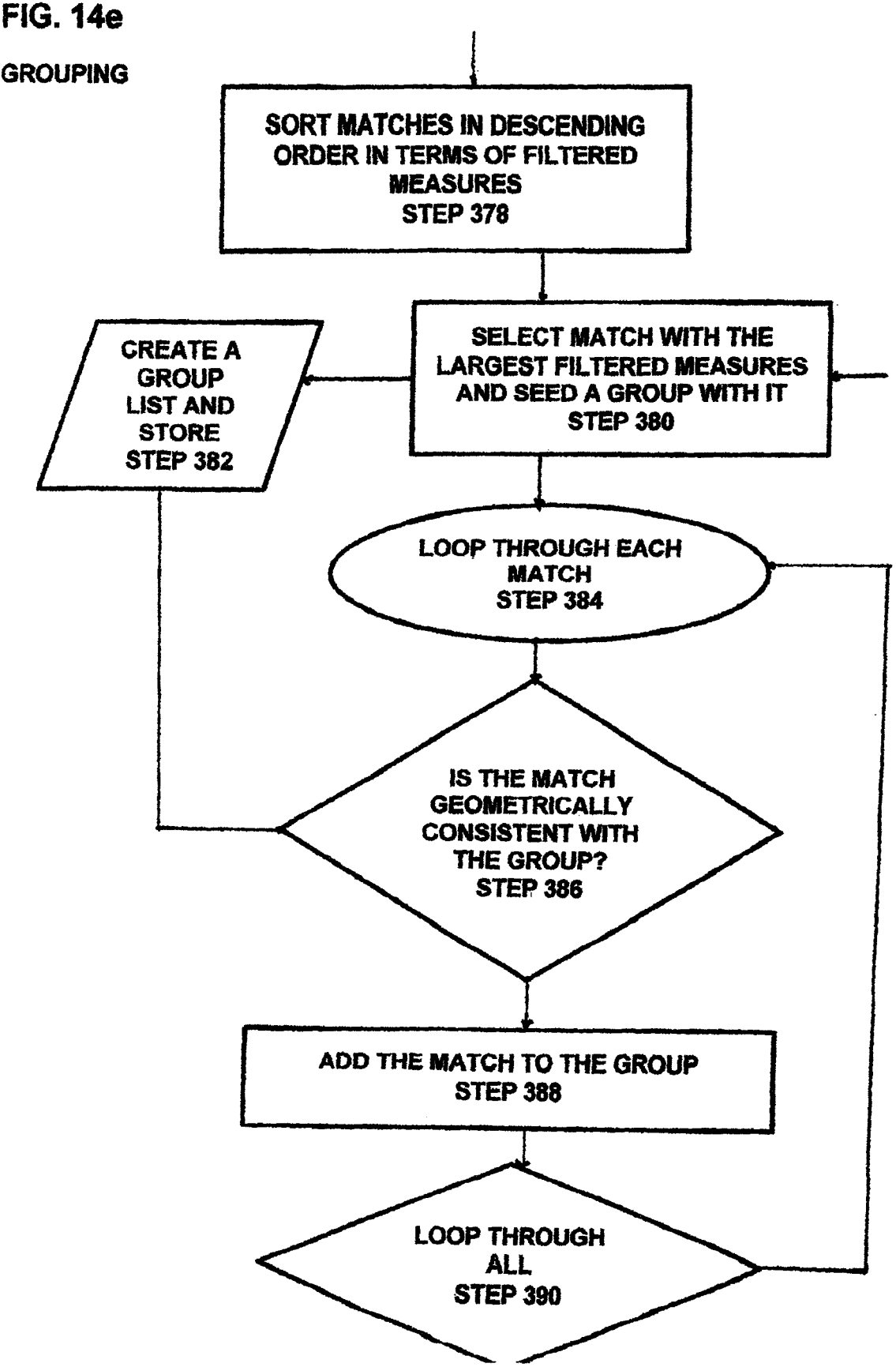
Figure 14F:
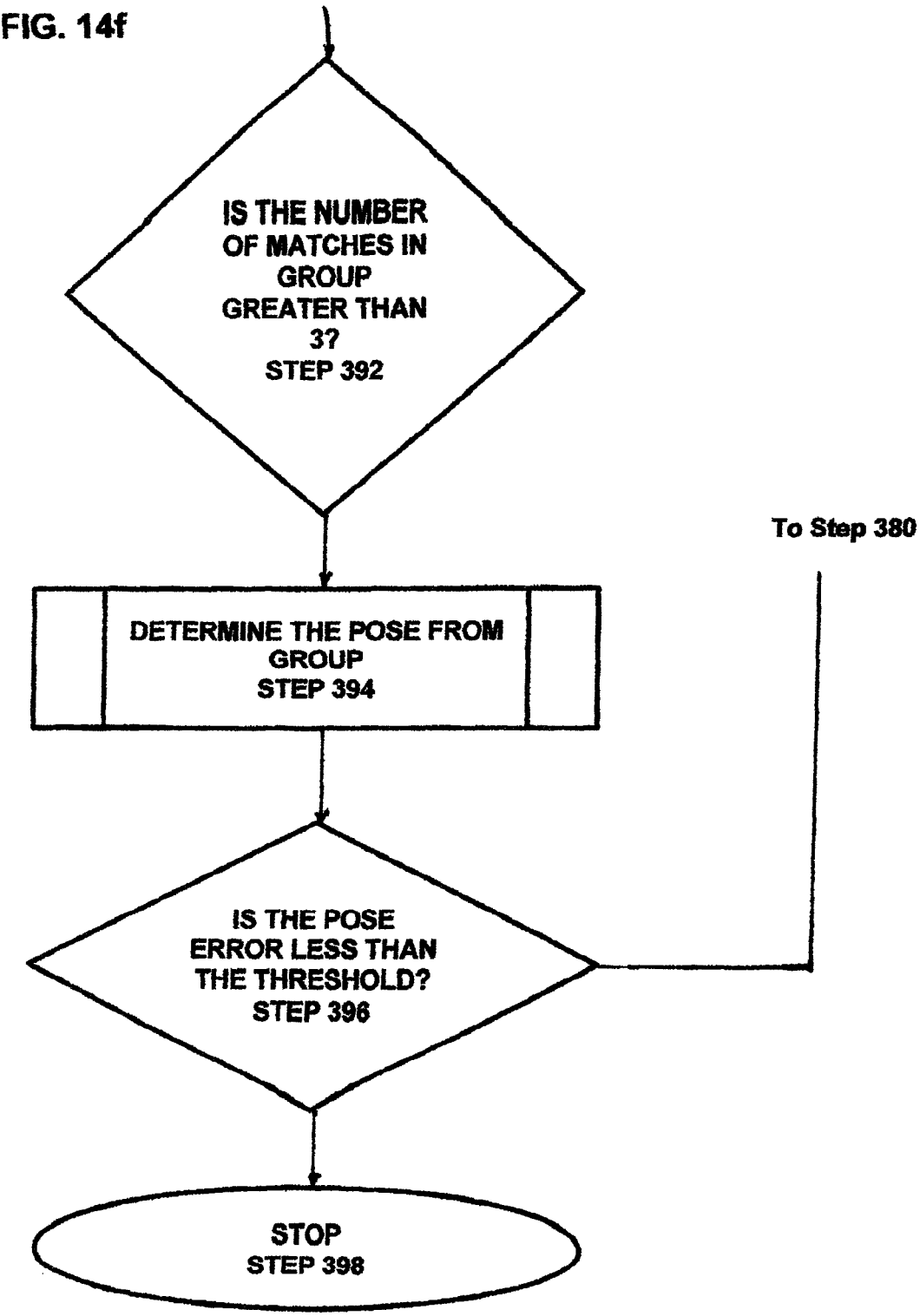

As used herein, a spin-image stack refers to the database 124 stored in the data storage device 114 and contains all the spin-images for each vertex of the reference mesh. When the spin-image module 204 operates to generate a new spin-image for the reference mesh it is appended to the spin-image stack and stored (step 312). A spin-image signature is calculated for the spin-image that has already been calculated for the current mesh vertex in the loop and a reduced order representation of the spin-image using spin-image signatures or other properties of the spin-image is determined (step 314). Referring to FIG. 13, a spin-image signature is computed as the sum of each element of the spin-image in each of the independent regions defined by (+) positive crowns, (−) negative crowns, and sectors. The number of crowns and sectors can be set based on the desired order of the reduced order representation. A decreasing number of crowns and sectors reduces the descriptiveness of the representation. Other properties of the spin-image can be used instead of crowns and sectors that can provide a reduced-order representation suitable for use in this process. They include mean, standard deviation, entropy, number of rows with all zeros, number of columns with all zeros, mean row values, mean column values, row standard deviations, column standard deviations. Also, surface properties of the current mesh vertex in the loop not encoded in the spin-image may also be used, such as temperature, curvature, color, etc. Each spin-image signature is referenced to the spin-image it was derived from. When the spin-image module 204 operates to generate a new spin-image signature for the reference mesh it is appended to the spin-image signature stack and stored. The process continues to loop through all and continue to the next vertex in the reference mesh and continue from the start of the loop (step 316).

The spin image module 204 continues to operate and computes the optimal number of clusters using fuzzy clustering such that a reduced order representation of the spin-image is made that is easy to compute, easy to compare and significantly provides order reductions to allow for rapid or real-time comparison (step 318). The degrees of membership of each spin-image signature to the natural clusters that exist in the spin-image signature stack can be used as a new reduced order representation. Before the degrees of membership can be computed, the optimal number of natural clusters in the spin-image signature stack are determined by using the validity index or similar method to find the number of clusters that minimizes the under- and over-partitioning of the spin-image signature stack. With the optimal number of cluster centers determined, the centers of the clusters in the spin-image signature stack can be determined from conventional fuzzy c-means clustering process (step 320). While it is preferred that fuzzy c-means clustering is used, it should be understood that any clustering process can be used as long as the clustering process results in fuzzy instead of crisp membership. The cluster centers are then stored in the data storage device 114 (step 322).

The spin-image module then operates to loop through each spin-image signature in the spin-image signature stack (step 324). The degree of membership of each spin-image signature in the stack needs to be determined relative to the cluster centers in the spin-image signature stack. By looping through each spin-image signature in the stack, a c*-image (defined as the degree of membership of the signature to the stack) can be generated. It should be understood that instead of a loop, this process could be performed in parallel.

The spin image module further operates to compute the degree of membership of the spin-image signature to the clusters (step 326). The degree of membership of the currently selected spin-image signature in the signature stack is computed for each cluster in the signature stack. These degree of memberships concatenated into a vector, define a c*-image. A c*-image provides a nonlinear mapping from a spin-image that enables, rapid comparison that results in significant speed-ups in estimating pose which is calculated as the rigid transformation T that minimizes the error Et between scene surface points S and reference points r as in the following equation:

$$E_T = \Sigma \|s_i - T(r_i)\|^2$$

Each c*-image is referenced to the spin-image signature and therefore the spin-image that it was derived from. A c*-stack within the data storage device 114 is created to contain all the c*-images for each vertex of the reference mesh. So, each time a new c*-image is generated for the reference mesh it is appended to the c*-stack and stored (step 328). The spin-image module continues to the next spin-image signature in the signature stack and continues from the start of the loop (step 330). Once the spin-image stack and c*-image stack has been generated and stored for the reference mesh training is complete and the process stops (step 332). With this data, the following process can be used to rapidly identify matching surface points between captured 3D meshes and the reference mesh. This allows the relative pose between the two meshes to be determined.

Referring to FIGS. 14a-14f, after the spin-image module has completed the training process using an image of a scanned object (reference object), the spin-image module can continue to operate to compare by scanning an object (or a portion of an object) believed to be the same object as the reference object (object scanned for the training process). The spin-image module operates to identify whether or not the scanned object (or a portion thereof which is the new scan of an object) is the same as the reference object (or portion of the reference object); determines the relative pose (position and orientation) of the scanned object; and aligns the scanned object with the reference object to allow for automatic comparison.

As shown, in a preferred embodiment of the process of the subject invention, a scan of an object to be compared ("scanned object") is performed (step 334) using the appropriate scanning device and the spin-image module operates to create a 3D mesh of the surface of the object (step 336). The spin-image module then operates to compute the surface normal for each vertex in the mesh (step 338) and operates to randomly select a fixed number of vertices from the mesh (step 340). It should be understood that the number of vertices selected can be a hard number fixed prior to performing the process or it can be dynamically adjusted based on the process's confidence as to whether an instance of the reference object is present in the scene (scanned) image or not as a function of the total number of vertices in the mesh (for example, 10% of vertices in the mesh). Increasing the number of vertices decreases the speed at which the process is performed while increasing the probability of reaching a correct solution. For an illustrated example, consider a structured environment where the likelihood that an instance of the reference object will be present in the mesh of the scanned object is high, such as when the objects are machines (or machine parts), or a body part of an individual, the number of randomly selected vertices can be low. In contrast, for an unstructured environment such as in an unknown building looking for hazardous material containers, the system operates as an autonomous system and identifies the pose of the object of interest. It then uses that pose information as it moves about the environment by "intelligently" selecting random points near the objects previous location prior to the intelligent system moving. This allows the process to use fewer randomly selected vertices. The number of randomly selected vertices can then continue to reduce as the system confidence in its understanding of the environment increases.

The spin-image module operates to loop through each vertex in the subset (step 342) and for each randomly selected vertex operates to: calculate the spin-image for the current vertex and generates the spin-image signature (step 346). The degree of membership to the clusters using cluster centers and the degree of membership of the current spin-image signature to the cluster centers are calculated (step 348) using the following equation:

$$\mu_{ki} = \frac{1}{\sum_j \left(\frac{\|c_k - x_i\|}{\|c_j - x_i\|}\right)^2}$$

thereby generating a c*-image (step 350) for the currently selected random scanned mesh vertex which are stored in the data storage device as a c*-image (step 352).

The spin-image module then operates to loop through each reference c*-image in the c*-stack, and compares the current scanned c*-image with that of each reference c*-image in the c*-stack (The c*-stack computed in step 328 and the current scene (scanned) c*-image computed in step 350) (step 354). The module than operates to calculate a metric that measures the distance between the current scene (scanned) c*-image and the current reference c*-image (step 356). This can be any distance measure such as $L^1$, $L^2, \ldots, L^n$ norm, or a special normalized metric that takes advantages of the properties of cluster degrees of membership. In particularly the property that the sum of the degrees of membership for all clusters always equals 1. One such metric is the normalized sum square error developed using the following equation:

$$I_j = \frac{1}{2}\sum_i (r_j^*(i) - s^*(i))^2$$

This distance then serves as a measure of the similarity between the reference and scene (scanned) c*-image.

The spin-image module operates to calculate the distance between the reference c*-image and the scene (scanned) c*-image to determine whether or not it passes some predetermined threshold criteria (step 358). For the distance measures, any distance below the threshold would pass the test and be considered as possibly being matching c*-images. All other would be considered as not matching c*-images. Setting this threshold is simplified when using a normalized distance metric such as determined by equation:

$$I_j = \frac{1}{2}\sum_i (r_j^*(i) - s^*(i))^2$$

It has been found that by setting the threshold, the process can balance its ability to discriminate between c*-images (resulting in faster pose estimation) and being robust to sensor noise and cluttered unstructured environments. If the distance is within the threshold, then continue, otherwise return to step 354, using the next reference c*-image in the c*-stack.

If the distance is within the threshold, the spin-image module operates to find the spin-image in the spin-image stack corresponding to the reference c*-image (step 360). Because the reference c*-image from the c*-image stack and the scene (scanned) c*-image are similar, there is a high likelihood that the reference spin-images and the scene (scanned) spin-images from which the c*-images were derived are similar. Because each c*-image in the c*-stack references the spin-image it was derived from in the spin-image stack, this reference can be used to retrieve the spin-image in the spin-image stack corresponding to the reference c*-image. The similarity measure with the spin-images is computed (step 362) using the reference spin-image and the scene (scanned) spin-image, and added to the similarity measure list (step 364). This can be as simple as $L^1$, $L^2$, . . . $L^n$ norms, or more sophisticated like the similarity measure computed using equations where P and Q are spin-images, $p_i$ and $q_i$, are the $i^{th}$ element of P and Q respectively, $\eta$ is the number of overlapping elements in P and Q, and $\lambda$ is a property of the spin-image stack:

$$R(P, Q) = \frac{\eta \sum p_i q_i - \sum p_i \sum q_i}{\sqrt{\left(\eta^2 \sum p_i^2 - (\sum p_i)^2\right)\left(\eta^2 \sum q_i^2 - (\sum q_i)^2\right)}}$$

$$C(P, Q) = a\tanh(R(P, Q))^2 - \frac{\lambda}{\eta - 3}$$

When a scene (scanned) and reference spin-image are found to be similar, it implies that there is high likelihood that the vertices in the mesh used to compute the spin-images are the same points on the surface of the object. The similarity measure for the scene (scanned) spin-image compared to the current reference spin-image in the spin-image stack is then appended to a list used to store the similarity measure for the scene (scanned) spin-image to all the reference spin-images in the spin-image stack (step 364). The process then continues to the next reference spin-image in the spin-image stack and continues from the start of the loop (step 366).

In order to match spin-image in a manner that is robust to sensor noise and scene clutter in unstructured environments, the process operates to extract similarity measures from the similarity measure vector that indicate significantly higher similarity when compared to the vector as a whole (step

368). Preferably, this is done by extracting all extreme outliers from the vector. The outliers have significantly higher probability of indicating the correct match for the scanned and reference spin-images. It should be understood that other filtering operations could also be used such as taking the upper x % of similarity measures in the vector. This serves as a filtering method used to filter the most likely matches for the currently selected random scene vertex. Outliners of similarity measures of all scene (scanned) spin-images to the spin-image stack are stored in the data storage device (step 370). Each outlier references what scanned and reference surface points were used to generate the spin-images used in the similarity measure calculation. This process then loops to the next randomly selected scene vertex and continues from the start of the loop (step 372).

After the process of step 372 is complete the process continues by extracting likely matches from outliners variable and serves as a filter for all the outliers computed for all the randomly selected scene vertices and stores the filtered outliners of similarity measures in the data storage device (step 374). Previously the matches were filtered based on the matches for an individual scene vertex. For this step, the matches are filtered based on the matches for all randomly selected scene vertices. Preferably, the top outliners are set as the matches in the outliers variable that are greater than some percentage of the greatest similarity measure in the outliers variable. This percentage is typically set to 50% (step 376).

The spin-image module continues performing the process by sorting filtered measures in descending order in terms of the similarity measure (step 378). The matches stored in the similarity measure are sorted in descending order based on the similarity measure between the scene (scanned) spin-images and the reference spin-images. Once sorted, the first match in the list then represents that match that has the highest probability of being a correct match. The match with the largest similarity measure in the filtered measures variable is selected and a group is seeded with it (step 380). By taking the match with the largest similarity measure in the filtered measures variable the process starts to create a group of surface point correspondences in order to compute the pose of the scanned object relative to the reference. Using the match with the highest similarity measure ensures that the match with the highest probability of being correct is used in the group. This increases the probability of finding a valid grouping that results in a correct pose estimate in the least amount of time. As used herein a group is a list of matched reference and scene vertices used to compute relative pose. The process continues by creating and storing the group list (step 382) in the data storage device. The process continues by looping through each match in the sorted filtered measures variable computed in step 378 (step 384). As shown the current match is checked to determine if it is geometrically consistent with all the matches already in the group (step 386). Because symmetries may exist or there may be similar regions that exist on the scanned object, the list of filtered measures may have a single scene (scanned) spin-image matching with multiple reference spin-images with high similarity measures. If the match is geometrically consistent with the group then add it to the group (step 388). The process continues to the next match in the stored filtered measures variable and goes to the beginning of the loop (step 386).

The spin-image module continues performing the process and checks the number of geometrically consistent surface point matches are present in the group. Mathematically, 3 matches must be present in the group in order to compute pose, however it should now be understood that the larger the group the better indication that the group will result in an accurate pose estimate. If there is less than 3 in the group, then the group's seed match is removed from the filtered measures variable, the group is cleared, and the process returns to step 380 (step 392). Otherwise, the process continues. It should be understood that the number can be any value greater than or equal to 3.

Once a group of geometrically consistent surface point matches is identified, the relative pose of the scanned object to the reference (or visa versa if desired) object can be computed as the transformation the minimized the error between the locations of the surface points in the group as shown in the following equation (step 390).

$$E_T = \Sigma \|s_i - T(r_i)\|^2$$

It should be understood that a rapid method is required to determine if, based on the matched surface points, the resulting pose is valid. This can be performed by checking the L2 norm between each surface point location and the angle between the surface normals for each surface point. For example: Set a threshold that all matches points must be aligned within 1 mm and 3 degrees. By tightening or relaxing the thresholds, the process can balance between speed and accuracy. The spin-image module operates to determine if the error is less than the threshold then continue, otherwise remove the group's match from the filtered measures variable, clear the group, and return to step 380 (step 396). The process can then be stopped, or it can be refined using a standard iterative closest point method that utilizes not just the location of the surface points but their normals as well (step 394).

Accordingly, it should now be apparent that the system operates such that the spin-images generated and used for matching is defined by significantly fewer numbers thereby allowing for faster spin-image comparisons and thereby faster pose estimation. The system also operates by calculating degrees of membership of a spin-image in feature clusters and calculates a similarity measure. The system then filters the reference spin-images by comparing the reference spin-images by their degrees of membership and uses a similarity measure above a user-set threshold. The spin-images are then filtered based on similarity measures and a group is constructed placing them in order of having the highest similarity measure. A pose estimate is then made. If the pose error produced by the pose estimate is less than a user-defined error threshold, the pose is complete, if not the system proceeds using the next point match to seed a group.

Data Analysis Software Module (Comparing 3D Images)

It should now be apparent to one skilled in the art that the above-described system and process provide an efficient method of representing and matching individual points of an object's surface S necessary for aligning two or more scanned images. Once the images are properly aligned (superimposed one over another) using a global alignment method such as by the process described above, the system operates to compare the images.

Once the spin-image module 204 of the system software 200 has properly aligned the images of two or more scans of an object, the data analysis software 202 operates to determine point-by-point differences between the 3D surfaces of the object represented by the images. However, even with the surfaces of the images aligned, the point measurements for each surface may not be in the exact location because of the technique used to generate the surface representation, or due to actual differences between the two surfaces. For an exemplary illustration an image may be a surface represented by a 3D mesh generated from a 3D CAD model of a mechanical part to be manufactured. A second image may be a surface represented by a 3D mesh resulting from scanning a mechanical part after manufacturing. Any differences between the two images would be the result in errors introduced during the manufacturing procedure of the part. For another exemplary illustration a first image may be a 3D mesh from a scan of a sprocket that was manufactured within manufacturing tolerances. A second image may be a 3D mesh from a scan of the same sprocket having a burr on the edge of its spline. Accordingly, a method is needed to accurately determine the "same" surface points located on both images so that point by point measurements can be made. It should be understood that the images do not need to be the result of a 3D scan, it may also be a mathematical model of a surface, or even a surface drawing such as a 3D CAD drawing as long as the 3D surface is represented by point clouds or 3D meshes. It should also be understood that the method present is not limited to 3D images, 2D images and higher dimensions are possible.

Once the "same" surface points are located, differences in any available surface data can be computed. For example: surface displacement, color differences, thermal differences, etc. (It should be understood that all measured surface data can be compared.

Various methods have been developed for providing point-by-point comparisons between 3D surfaces that solely rely on the point measurements available in the 3D meshes used to represent the surface. One such method for $$D_H(A, B) = \max \left\{ \sup_{a \in A} \inf_{b \in B} D(a, b), \sup_{b \in B} \inf_{a \in A} D(a, b) \right\}$$

comparing two 3D surface and measuring the differences between them is the Hausdorff distance ($D_H$) or metric. The Hausdorff distance is described by the above equation, where A and B are the point sets for two 3D scans, where sup represents supremum, and where inf represents infimum.

In the case of measuring the differences between two 3D surface (surface A and surface B), this metric basically finds the closest point in surface B for each point in A and the closest point in surface A for each point in B. The maximum distance for each point is then the Hausdorff distance. This is an effective metric for determining the distance between surfaces when only point data is known, but when the surfaces are represented by 3D meshes, points and surface normals are both known and the surface normals can be used to perform more accurate point by point difference measurements between the two surfaces.

Figure 15:
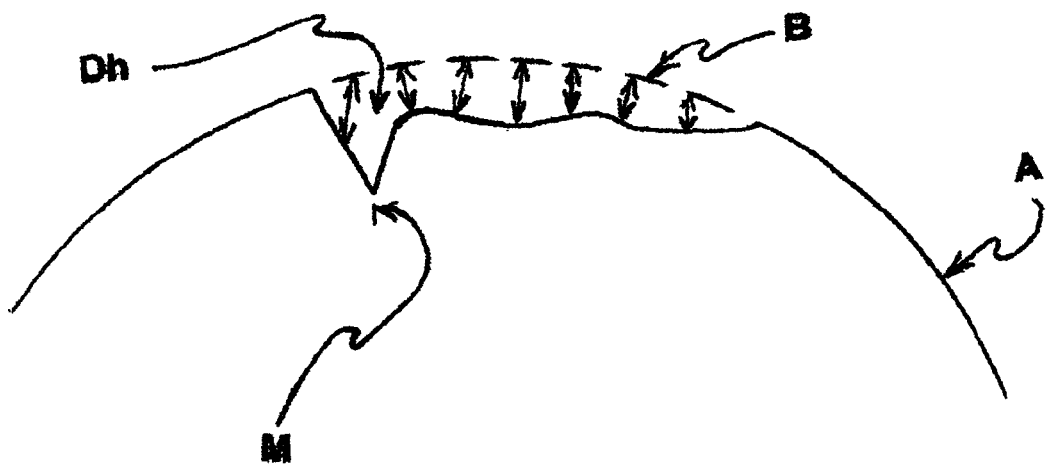
FIG. 15 is a schematic representation of surfaces illustrating the Hausdorff distance locating the distance between points on the surfaces.

Referring to FIG. 15, an illustrative example of how the Hausdorff distance ($D_H$) locates the "same" surface points between surface A and surface B. As shown this metric under estimates the distance between each surface point on A and B because it effectively identifies the "closest" points in A and B as the "same" surface points. Because of this, the true maximum distance located at M is never measured.

Figure 16:
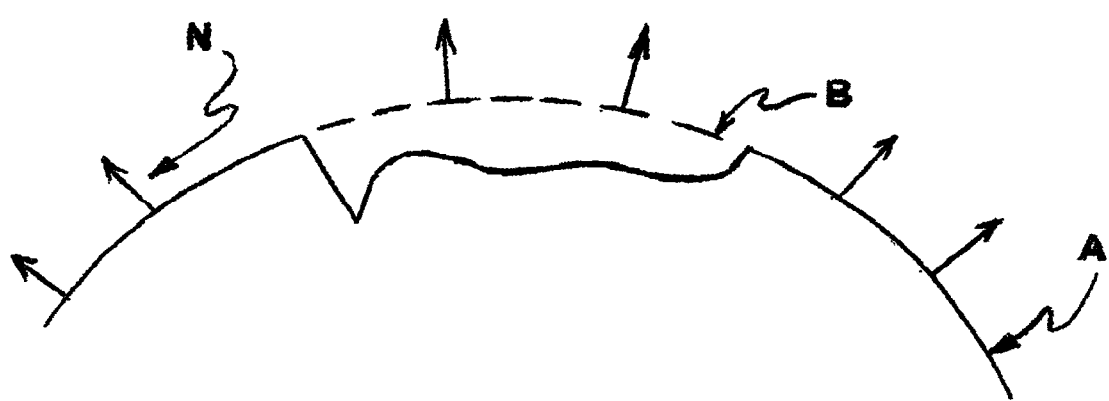
FIG. 16 is a schematic representation of the surfaces of FIG. 15 showing surfaces with surface normal along one surface.

The data analysis module 202 operates by identifying the "same" point on surface B as the point of intersection between surface B's surface normal at said point and surface A this metric is called the normal oriented distance (Dn) (FIG. 16 shows surface A, surface B, and surface B's surface normals N). It should be understood that the intersection can be along the positive or negative direction of the surface normal. This allows for locating "same" points when surface A is either above (along the positive normal direction) or below (along the negative normal direction) surface B.

Unlike previously developed systems, this method performed by the data analysis software 202 allows the "same" point on surface A to not only be vertices in the surface mesh but also any of the continuum of points located on the faces of the mesh used to interpolate between actual surface measurements represented by vertices. This process results in a more accurate measurement by being able to treat surface A as a continuous surface, resulting in a more accurate identification of "same" points between the two surfaces, thus not underestimating the measurements between the two surfaces such as occurs using previous developed systems.

Figure 17:
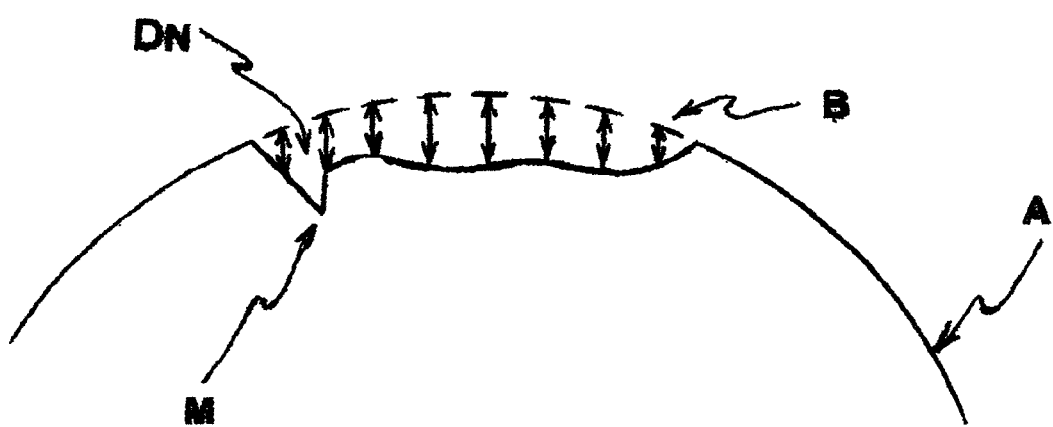
FIG. 17 is a schematic illustration of surfaces of FIG. 15 showing normal oriented distance locating the same surface points between the two surfaces using the process of the subject invention.

Referring to FIG. 17, an illustrative example showing the process whereby the normal oriented distance ($D_N$) locates the same surface points between surface A and surface B. The metric provides a true distance measurement at the maximum distance located at M which is unlike previously developed methods. It should now be understood that:

$$D_N(A,B) \neq D_N(B,A)$$

where the first argument of $D_N$ is the surface that has normals used to compare the two surfaces. If either surface A or surface B serves as a truth for which the differences should be measured about, then the normals for the truth surface are used for identifying "same" points and measuring the differences between the two surfaces. If neither of the surfaces serves as a truth surface, then $D_N(A,B)$ and $D_N(B,A)$ can be combined in a similar fashion to the measures in the Hausdorff distance. It should now be apparent to one skilled in the art that the comparison can be made about any surface vector. The surface normal provides a general solution applicable to all surfaces, however scenarios where knowledge may be available as to how a surface has changed over time. For an example, mathematical growth models for biological life forms or models of material expansion/contraction based on environmental conditions (i.e. temperature and pressure). These models could then be used to compare two surfaces with extreme accuracy and precision.

In a preferred embodiment, a single surface is provided and the process operates to compare the single surface to a truth for that surface that is not available. For an illustrative example, consider when a patient goes to a physician for medical treatment for a surface wound. The physician scans the wound. However, the physician is unable to measure a depth profile of the wound or wound volume, because a scan is not available of that patient before developing the wound, until now systems have not been developed that can make such measurements.

Figure 18:
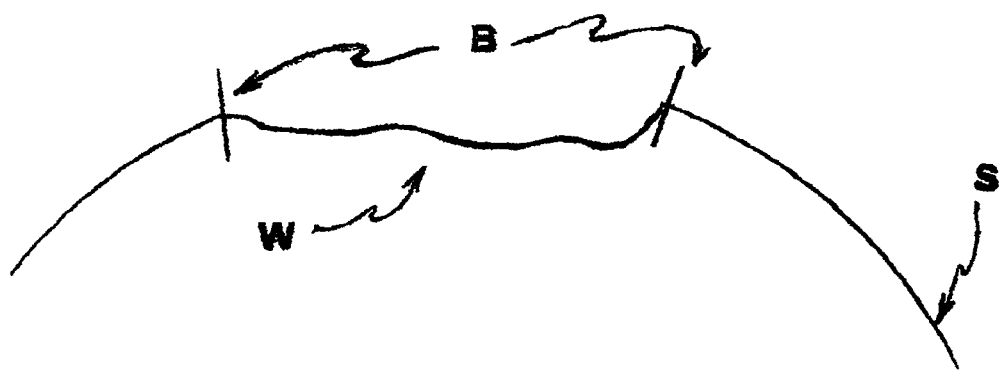
FIG. 18 is a schematic illustration showing a surface with an area of interest and a boundary.

The system utilized by the subject invention operates to perform such measurements by estimating a truth surface from the available surface. It should be understood that the process utilized by the subject invention can be applied to any scanned surface with a defect or anomaly where a comparison to an unavailable truth surface is desired. In a preferred embodiment, the data analysis software 202 operates by identifying the boundary of the area of interest (in the instant example the wound) (step 220) and determines if the area of interest is inside or outside of that boundary (step 222). The area of interest of the surface is then labeled (step 224). This boundary identification can be performed by a human in the loop or by an automated process that inspects properties of the surface such a curvature, texture, color, temperature, and gradients of each of the proceeding to determine the boundary. Any measurable surface data and measurements derived from the measurable surface data (i.e. gradients) can aid in the automated process for identifying the wound boundary. FIG. 18 shows a surface S with an area of interest, such as a wound W and a boundary B. It should be understood that although the illustrations used in this example are 2D, this method applies to higher dimensional surfaces as well.

Figure 19:
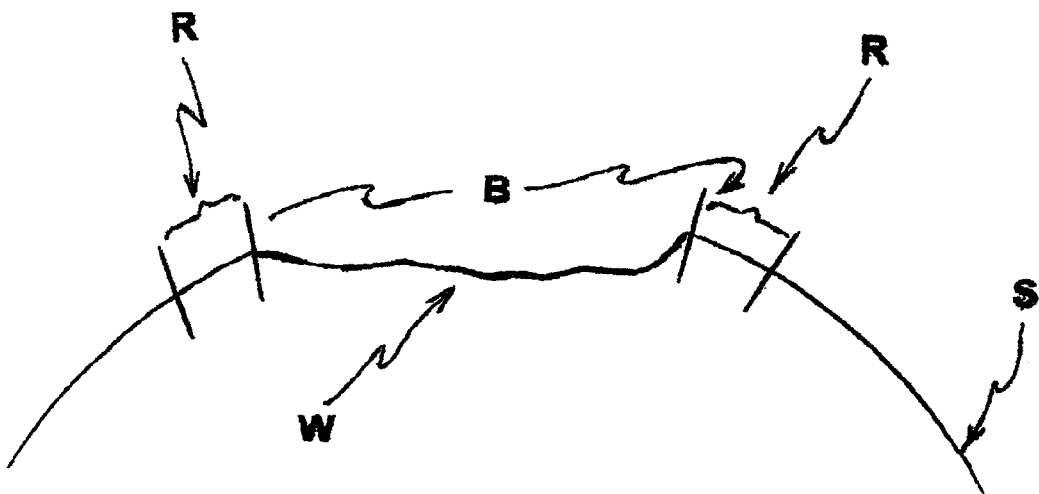
FIG. 19 is a schematic illustration showing boundary regions around an area of interest, the area of interest, and the boundary around the area of interest.
Figure 20:
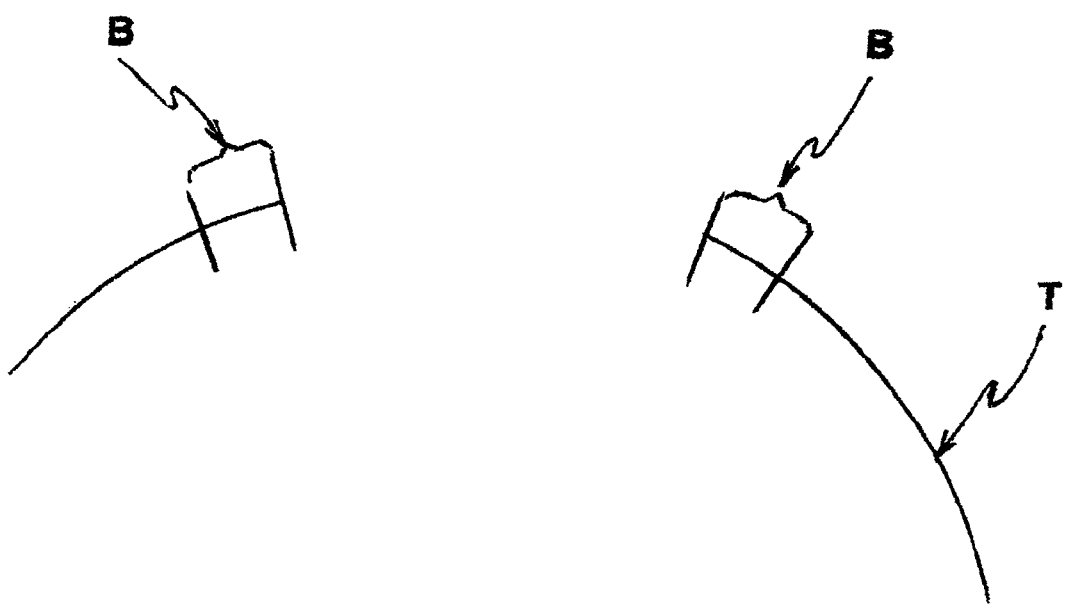
FIG. 20 is a schematic illustration showing a copied portion of a surface in another surface which can be used to approximate a surface region to fill where the area of interest was located.
Figure 21:
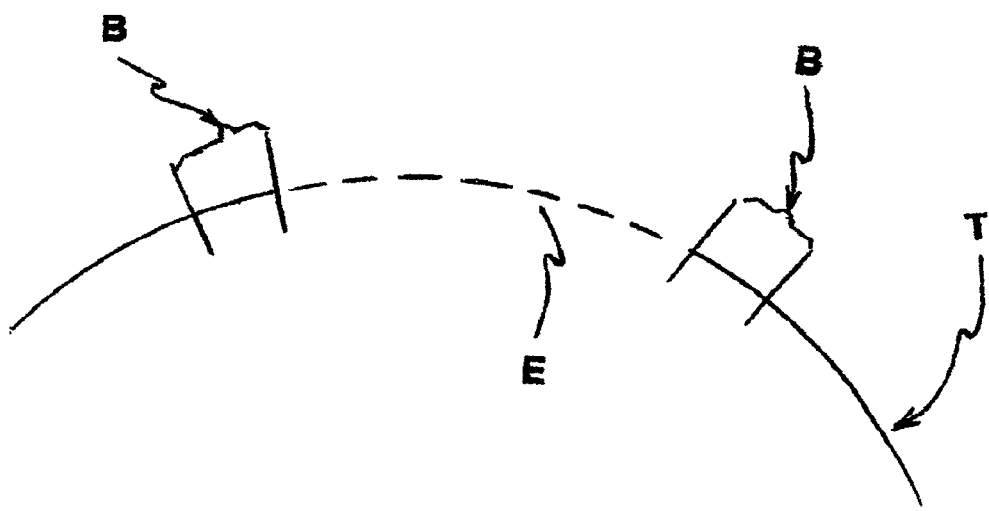
FIG. 21 is a schematic illustration showing a completed truth surface with an extrapolated surface region.
Figure 22:
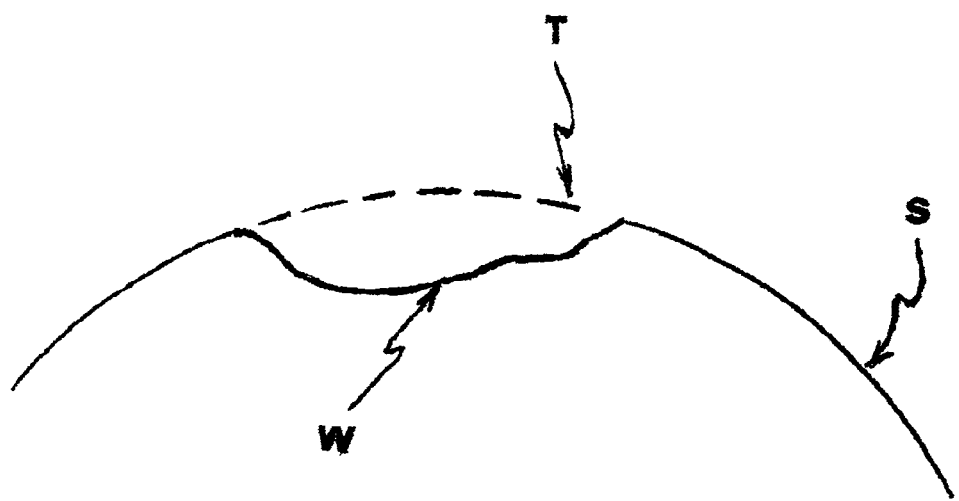
FIG. 22 is a schematic illustration showing the truth surface and another surface aligned and overlaid

Once the wound boundary is determined, a wound boundary region is then found (step 226). The wound boundary region is a region on surface S outside the surface of interest W (in this example the wound). The size of this boundary region can either be a fixed distance from the boundary B or its distance can be dynamically set based on the features of the area of interest W, boundary B, or surface S. FIG. 19 shows the boundary regions R for surface S with the area of interest (wound) W and boundary B. The portion of surface S not labeled, including the boundary region, can then be copied from surface S to a new truth surface T. FIG. 20 shows the copied portion of surface S in surface T. The boundary region B in surface T can then be used to approximate a surface region to fill where the surface of interest (wound) had previously been (step 228). Many different interpolation or approximation techniques can use the boundary region B to perform this task. One such technique is Radial Basis Functions (RBFs) which can use the boundary region B and the surface normals of B to fit a surface that can smoothly fill the region contained within the boundary region B. This extrapolated surface E can then be discretized, turned into a 3D mesh, and merged with the rest of surface T. FIG. 21 shows an illustration of the completed truth surface T with the extrapolated surface region E. By nature of how the truth surface T was created, surface T and surface S are already aligned by design. They can then each be overlaid as in FIG. 22 and comparisons can be made using the normal oriented distance ($D_N$) described above, or by other comparison methods (step 230). This enables accurate volume, cross sectional area, and depth measurements that was previous impossible.

It should now be obvious to one skilled in the art that this method for generating a truth surface also enables multiple surfaces to be compared relative to a truth surface created from one of the surfaces to be compared. This truth surface can then serve as a reference for all future comparisons.

Figure 5:
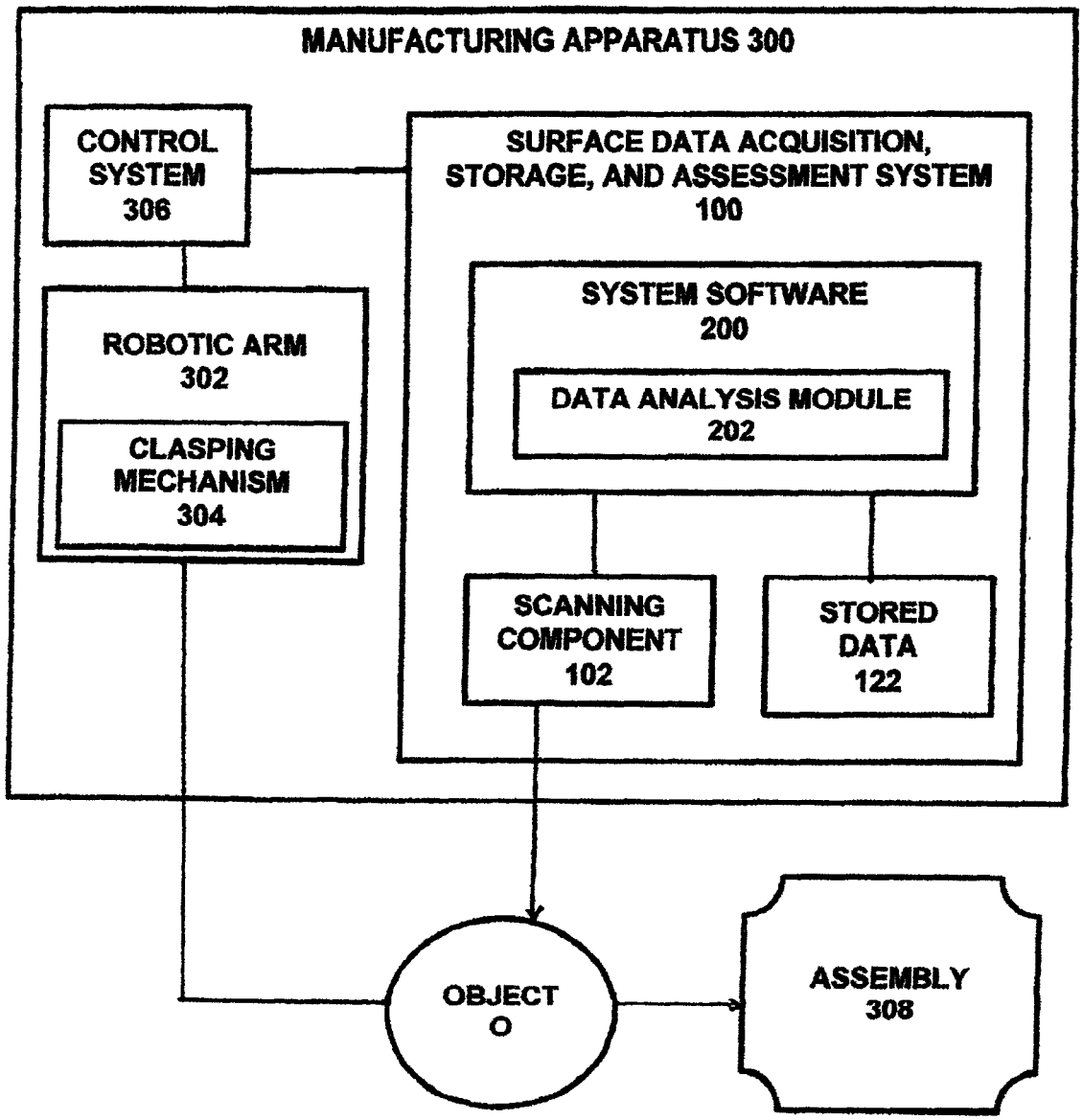
FIG. 5 is a schematic representation illustrating the general methodology of a manufacturing apparatus for performing a desired operation coupled to the surface data acquisition, storage, and assessment system of the subject application.

In another illustrated example of the process described above, is shown in FIG. 5, whereby a manufacturing apparatus 300, such as a robotic apparatus, for automatically performing a mechanical operation is in communication with or comprises the surface data acquisition, storage, and assessment system 100 of the subject application. In an illustrative example, an object O, such as an individual part (for example a screw, sprocket or other object) is to be installed in the manufacturing apparatus 300. A robotic arm 302 is shown having a clasping mechanism 304 effective for clasping the object O and placing it properly into the assembly 308. The scanning component 102 of the surface data acquisition, storage, and assessment system 100 operates to scan the object O and the data analysis module 202 of the system software 200 operates as described above to compare the collected scanned data 120 (scene image) with stored reference data 122 (reference image) to determine the alignment of the object O. The system software 200 then operates to communicate with the control system 306 of the manufacturing apparatus 300 providing instructional information to adjust the object into proper alignment such as for placement of the object into an assembly 308. The control system 306 and the data analysis module 202 function together such that that the robotic arm 302 and the clasping mechanism 304 properly performs the desired operation. It should be apparent that the surface data acquisition, storage, and assessment system 100 allows objects, such as parts, to be identified and the orientation of the object (as described below) to be analyzed so that the robotic operation can automatically be adjusted if necessary without the need to pause operations of the assembly.

Figure 6:
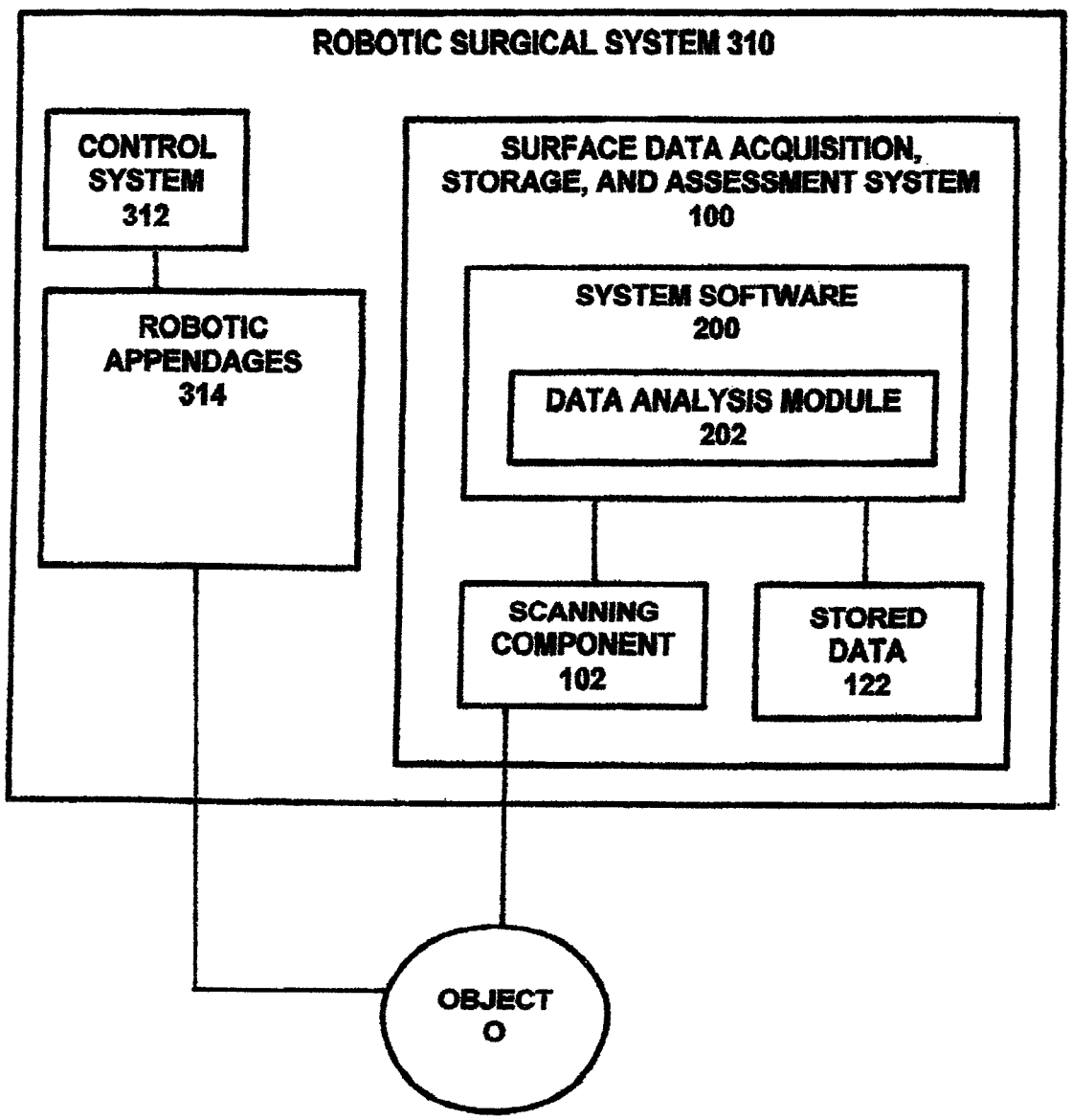
FIG. 6 is a schematic representation illustrating the general methodology of a robotic surgical system for performing a medical operation coupled to the surface data acquisition, storage, and assessment system of the subject application.

In another illustrative example is shown in FIG. 6, a robotic surgical system 310 comprises or is in communication with the surface data acquisition, storage, and assessment system 100 of the subject invention and includes a control system 312 for controlling one or more robotic appendages 314 that operate to perform a medical treatment operation such as surgery. The data analysis module 202 cooperates with the control system 312 of the robotic surgical system 310. The data analysis component 202 operates as described to compare reference stored image or data 122 of an object O, such as a part of a patient, with subsequent scene (scanned) images or data 120 and using the comparisons operates to calculate adjustments which are communicated to the control system 312 which directs the necessary adjustments to one or more of the robotic appendages 314. In another illustrative example, the system 100 operates such that the display device provides a notification for alerting a surgeon when the surgeon is in close proximity to biological landmarks or critical body parts, like the facial nerve for example. The data analysis component 202 operates as described to compare reference stored image or data 122 of and object O, such as a part of a patient, with subsequent scene (scanned) images or data 120. The reference stored image or data can be derived from CT, MRI, or other penetrative scanning technologies. Aligning surface scans performed during surgery then provides a reference to internal measurement available in the reference stored image. This enables the system to notify the surgeon whether they are in proximity to internal or external body parts of interest.

Data Analysis Software Module (Displays)

Figure 23:
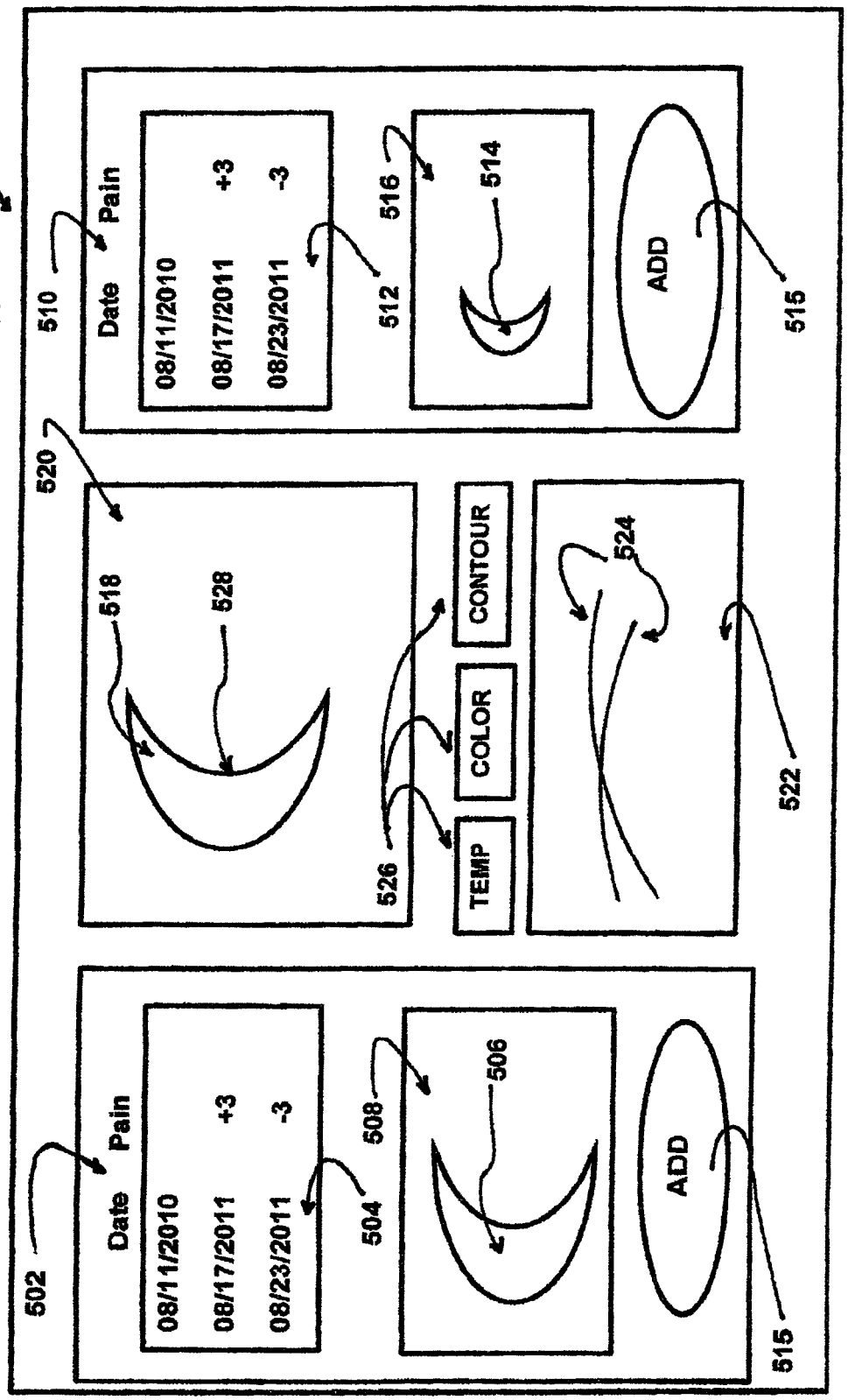
FIG. 23 is an exemplary illustration of a representative display generated by the system software showing a first scene (scanned) image being displayed by the surface data acquisition, storage, and assessment system and showing how an operator can navigate to various features of the system using various displayed fields.

Referring to FIGS. 23-28 a representative display page 500 generated by the system software 200 for displaying on an output device 112 is shown. Preferably, the display page 500 comprises a first image field 502 having a listing 504 that identifies previously scene (scanned) images whereby the user can select one of the identified listed scene (scanned) images which when selected the system software 200 operates to generate and display a first specific image 506 in a first display field 508. Referring to FIG. 23, a second image field 510 having a listing 512 that identifies previously scene (scanned) images (taken after the scan used to generate the first specific image 506) is shown whereby the user can select a second specific image 514 to be displayed and directs the system software 200 to operate and generate and display the second specific image 514 in a second display field 516. Once an image 506, 514 has been selected and displayed in the associated display field the system software operates by allowing the user, such as by utilizing a cursor, input keys, or other methods known in the art, to select an image 506, 514, such as by using the appropriate add field 515, and direct the system software to operate and allow the user to enlarge, rotate and/or translate in space the selected image 506, 514. The selected image is generated and displayed as a new image 518 in a third image field 520. It should now be apparent that the system software allows the user to view the object represented by the new image 518 at different angles and orientations. For an illustrated example, in a preferred embodiment a user can change the view to display an image allowing one to look down into the image (such as to "look inside" a cavity for example inside a wound along the skin of a patient). As shown a portion of the object can be displayed as the new image 518 or the object can be shown is a different orientation that that such as shown in the first image field 502 or in the second image field 510. Further, as shown the new image 518 can show an enlarged view of the object or a portion of the object.

The display page 500 is further provided with a measurement field 522. Preferably, as shown, the measurement field 522 is provided with a listing or a graphic illustration (as shown) of measurement parameters 524, such as contour, color, temperature, that when selected, by using the appropriate parameter field 526, operates to direct the system software 200 to generate and display the various images 506, 514, 518 such that they indicate the parameter selected. For example, the image generated can be a 3D image of the object that can show swelling or wound size, or a thermal image of the object, or the color of the object (which in the case of tissue can show redness). It should be understood that the user can switch back and forth between various images showing different parameters.

In a preferred embodiment of the invention the display page 500 as shown the user by selecting the add fields 515 for both images operates to allow the user to compare the first specific scene (scanned) image 506 with the second specific scene (scanned) image 514. By selecting the add fields 515 the system software 200 operates to superimpose the second specific scene (scanned) image 514, such as described above, as a transparent scan on top of the first specific scene (scanned) image 506 creating a comparison image as the new image 518 thereby allowing the user to see the actual differences between the two scans (images). In a preferred embodiment of the invention, the system software 200 operates such that the display page 500 can receive inputs, such as by way of a cursor, mouse, display pen, or other conventional means for allowing user allows the user to "click" on a selected point 528 on one of the scene images 506, 514, 528 which directs the system software 200 to display the requested measurement (contour (depth), temperature, color) for the selected point taken from each image, thereby allowing the user to see measurement changes at different points or locations from scan to scan. Preferably, as shown, the system software 200 operates to generate a graph or other representation 524 of the changes. For an example, for tissue wounds, changes such as wound depth, can be plotted showing whether the wound is getting deeper or shallower relative to an initial scan over time.

Figure 24:
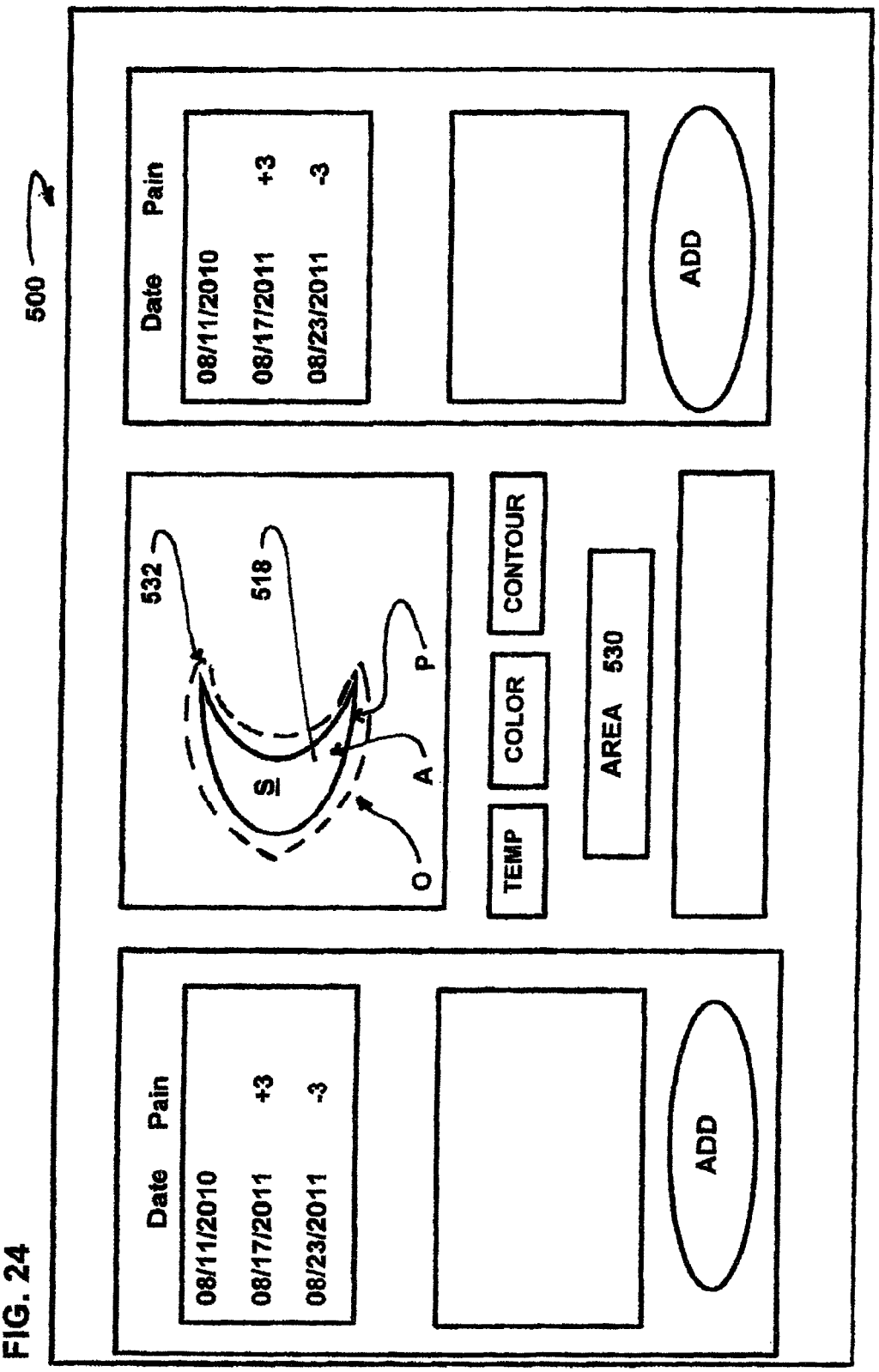
FIG. 24 is another exemplary illustration of a representative display generated by the system software showing a scene (scanned) image for allowing a user to draw a selected periphery around an area on the screen and the system software thereby generating and displaying the area within the selected periphery as well as displaying differences of areas that were selected for all other selected scans that can be used to determine if the areas are increasing or decreasing in size.

Referring to FIG. 24, another embodiment of the display page 500 is shown further comprising an area field 530. For example, in a preferred embodiment obtaining the surface area of a tissue wound may be desirable. The user by selecting the area field 530 directs the system software 200 to operate conventionally to allow the user to draw a boundary 532 around an image 518 or a portion of an image on the display such as by use of the user's finger, display pen, mouse, cursor or other such means. For an exemplary illustration, a user can identify the periphery P of the area of interest A along the surface S of the object O (tissue) and draws a boundary 532 around the periphery P. The system software 200 then operates to calculate the surface area within the periphery P and saves the calculated surface area in the data storage device 114 displays the calculated surface area. It should be understood that the subject invention is not limited to the various fields shown but fields may be subtracted or other fields added within the scope of the invention. Further, the particular arrangement of the display can be modified.

Figure 25:
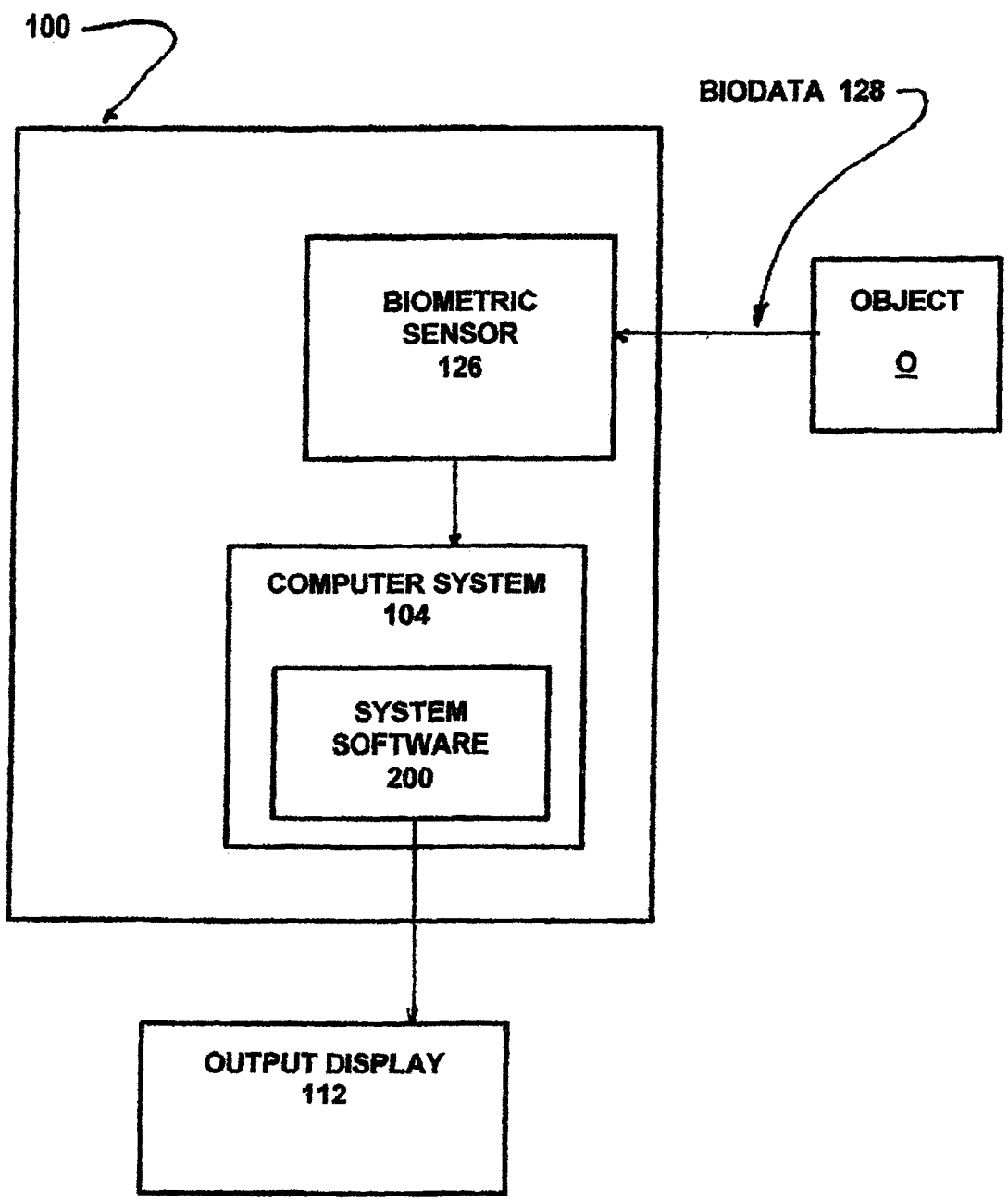
FIG. 25 is a schematic representation illustrating the general methodology of a preferred embodiment of the surface data acquisition, storage, and assessment system of FIG. 1 having a biometric sensor for identifying a user and automatically displaying an output that directly relates to the user.
Figure 26:
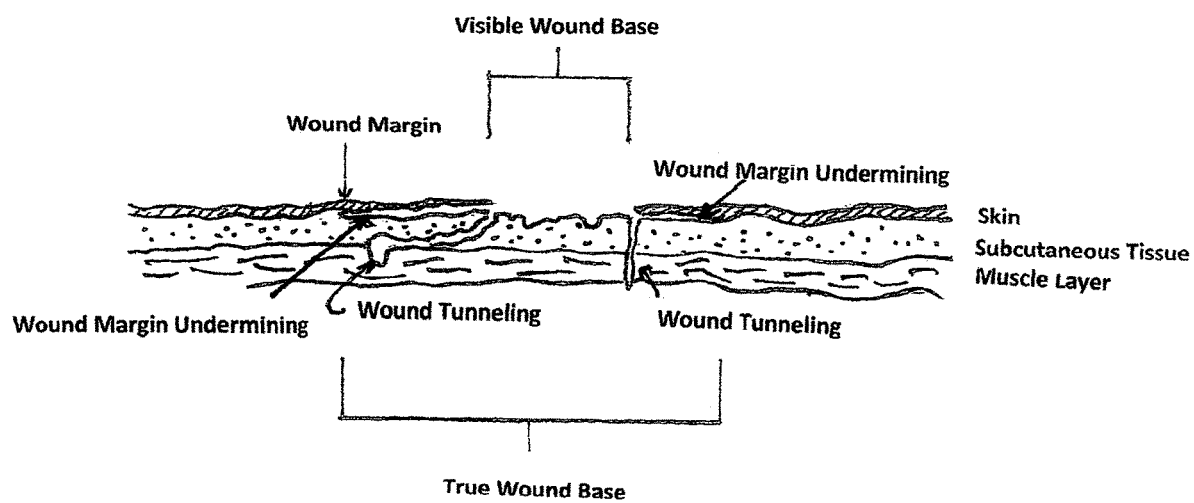
FIG. 26 is a schematic cross-section of a typical deep wound, showing wound tunneling and wound undermining (Note that the visible wound base is much smaller than the true wound base, which is hidden by the undermined wound edges)

In another embodiment of the invention, as shown in FIG. 25, the surface data acquisition, storage, and assessment system 100 further comprises a biometric sensor 126 that is coupled to the computer system 104. In a preferred embodiment of the invention the system software 200 operates such that input from the biometric sensor directs the software 200 to display certain requested data of an object O on the output device 112. As used herein the biometric sensor 126 is configured for analyzing biological attributes of a body and generating biodata 128 for authentication purposes. Biodata 128 includes data related to fingerprints, eye retinas and irises, voice patterns, facial patterns and hand measurements. In a preferred embodiment, the biometric sensor 126 is a fingerprint scanner that samples at least a portion of a fingertip or other body part of a patient thereby providing biodata 128 (e.g. fingerprints, thumbprints, palm prints, footprints). One exemplary illustration of the biometric sensor 126 is shown configured to transfer biodata 128 to the computer system 102. A user initiates the system whereby the system software 200 operates to request the user to use the biometric sensor 126 to transfer biodata 128 to the computer system 102. If the user authorization is confirmed, the system software 200 operates to transfer user information to be displayed on the output device 112. In a preferred embodiment the user information includes the user's medical history. In another preferred embodiment the information includes the last scans taken of the user for a particular condition or an object at a particular time. In another preferred embodiment, the system operates that more than one user is required to authorize use of the system. For example, in the medical field the system may require the treating physician as well as the patient to use the biometric sensor. It should now be apparent to one skilled in the art that the use of the biosensor allows increased security of the system as well reducing the amount of time to obtain data histories (such as for example medical files or past scans), and ensuring to a greater extent that the proper information is retrieved.

The surface data acquisition, storage, and assessment system of the subject invention operates to detect and quantify similarities or differences between collected data obtained from an object of interest and stored reference data and which can operate in a relative short amount of time and preferably in relative real time. The system operates utilizing a method or process that decreases the time required for calculating a pose estimate such as by the use of a spin-image algorithm, thus increasing its performance thereby making it more practical for many applications that require real-time operations. In a preferred embodiment of the invention the system comprises one or more sensing components for scanning and measuring various surface features of an object, including one or more of the following: color, temperature, texture, size, shape, spatial dimensions, contour, curvature, softness, roughness, shininess/gloss, infrared signature, electrical vectors/flux, magnetic field strength/vector/flux, dynamic rebound, flexibility, spatial phase characteristics, measurements derived from spatial phase characteristics, and other such features. Preferably the system comprises a data analysis component having software and/or firmware capable of comparing data retrieved from the object scanned to a reference database or other representation comprising data from other similar or dissimilar objects or from a previous scan of the object. In another preferred embodiment of the invention the data analysis component comprises system software that operates to determine the identity of the scanned object by comparing the data from scanned object to various stored data. In a preferred embodiment, the surface data acquisition, storage, and assessment system of the subject invention further operates to determine differences between data obtained from two or more scans of the object.

In another preferred embodiment of the invention the data analysis component comprises software and/or firmware capable of comparing the data retrieved from the scanned object to a database or other representation comprising data from other similar or dissimilar objects and is capable of detecting and quantifying the similarities or differences between collected data from the scanned object and stored data. It should now be apparent to one skilled in the art that such a system permits the identification of a scanned object by comparing the data from the scanned object to various reference stored data. The system software performs the method of representing the local topography of the object as a 2D histogram that is invariant to rigid transformations and creates model spin-images for the generation of plausible scanned-model point correspondence for use to generate pose estimates. Thus, it should now be apparent that two or more scans, such as scans showing dimensions, color, temperature, and the like, can be placed in overlapping position using pose estimation allowing an image that shows changes to such parameters. This can be done in real time (less than about 1 minute). It should also now be apparent to one skilled in the art that the subject invention can operate to scan numerous objects including, but not limited to mechanical objects, biological objects or medical conditions, artifacts, geographical objects, agricultural objects, or used in conjunction with robotic manufacturing systems, robotic surgical systems, aircraft systems, and marine applications.

Surface Alteration

Figure 29:
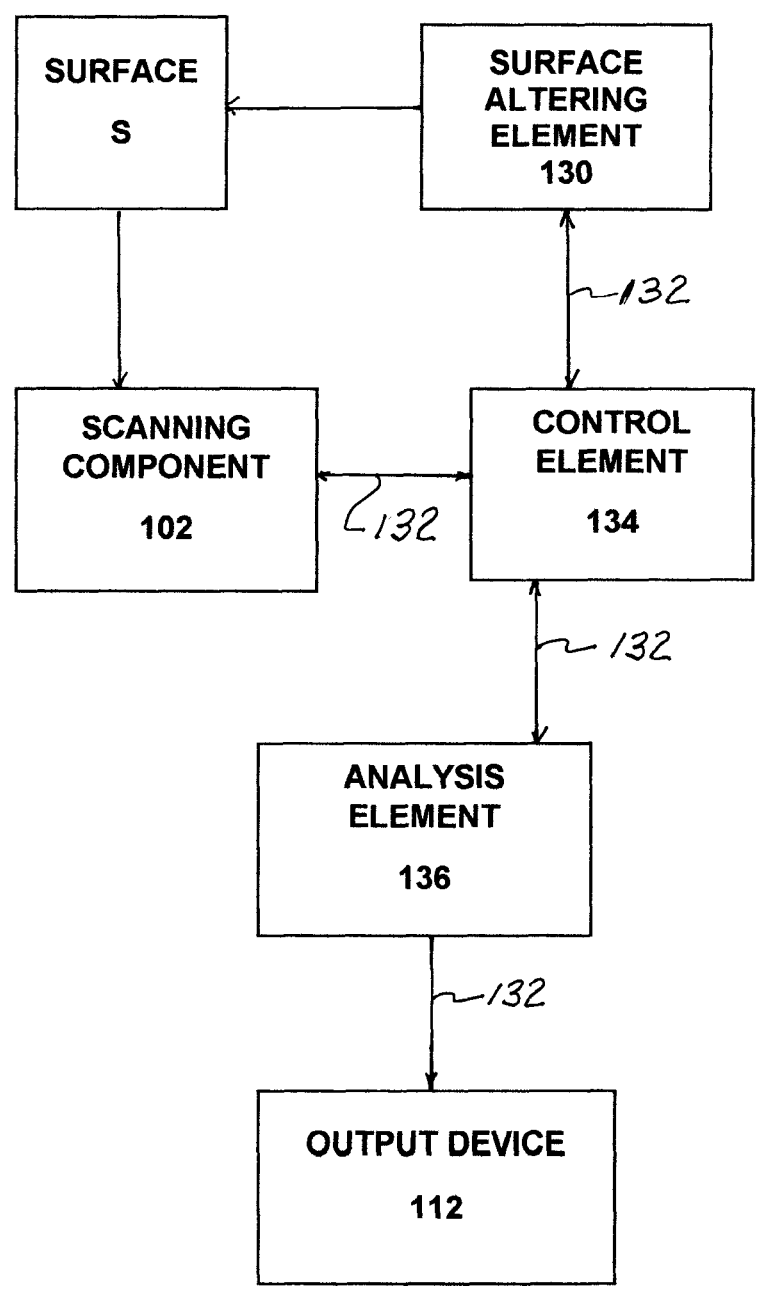
Figure 30:
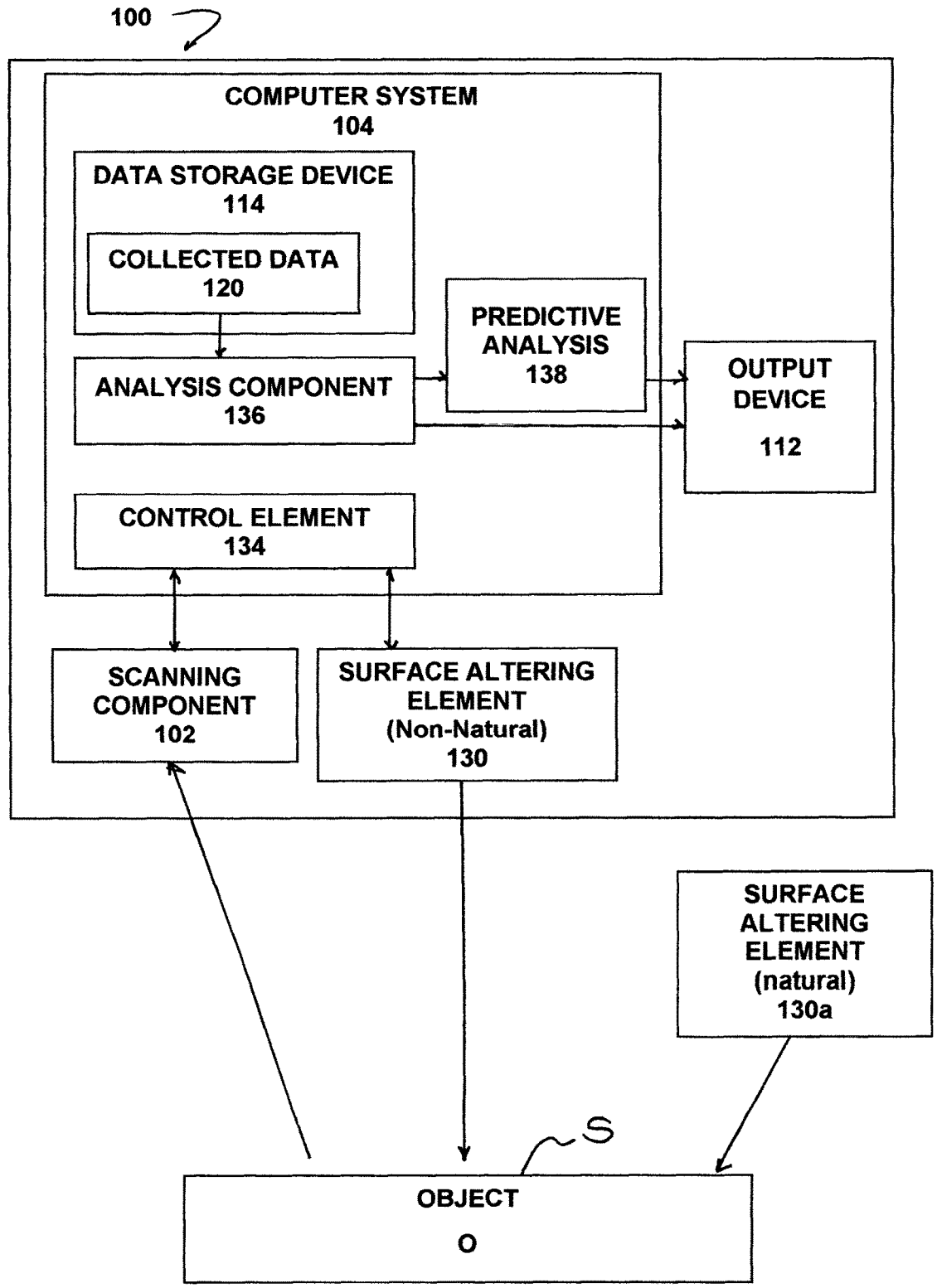
FIG. 30 is a schematic illustration of another embodiment of the apparatus of the subject invention.

Table 2 provides a schematic representation of the invention elements.

and/or after the collection of surface data 120. In a preferred embodiment, as illustrated in FIGS. 29 and 30, the surface altering element 130 is in communication with the computer system 104 by electrical connecting elements 132. Collected data 120 obtained is directed to an analysis component 136, which can be included in the data analysis software module 202 or a separate data analysis system as shown. Collected data 120 and other pertinent information is then directed from the analysis component 136 to an output device 112 for display.

As used herein, the surface S may comprise any surface, boundary, demarcation, or edge, whether that surface is physical or non-physical in nature, such as real surface and/or an imaginary and/or a theoretical and/or a virtual surface, boundary, demarcation, or edge. Surface S may comprise one or more surfaces, in any combination of real physical and/or non-physical surfaces. Surface S may be comprised of any of the known states of matter (solid, liquid, gas, plasma or any combination of these states) or it may be comprised of non-physical entities, such as a virtual surface as might be generated in a computer or a surface as might be generated mathematically. Surface S may comprise any combination of a physical and a non-physical or virtual surface.

Scanning component 102 comprises one or more or any combination of the standard and known devices or technologies (referred to as "sensors") that have the capability to detect and/or measure and/or assess the properties of a surface, regardless as to whether that surface is native or unaltered or altered. For example, the scanning component 102 can be in the form of, but not limited to, a visible light camera or visible light detector, sensor, or measurer; a thermal camera or thermal detector, sensor, or measurer; a

TABLE 2

| Modalities Applied | Modality Applied By: Direct Physical Contact | Non-Contact |
|---|---|---|
| Mechanical Force: | | |
| Positive Pressure* | Piston, clamp, plunger | Positive air/gas/fluid pressure |
| Negative Pressure* | Suction cup/device | Negative air/gas/fluid pressure |
| Adhesion/cohesion* | Gluestick | |
| Applied Energy | | |
| Sonic/sound waves | Sound/vibrating transducer | Non-contact sound transmission |
| Electrical | Electric wire/contact | Electric field |
| Magnetic | Contact magnet | Magnetic field |
| Thermal/Infrared | Heated/chilled probe | Heated/chilled environment |
| Other electromagnetic | UV, radio, microwave probe | UV, radio, microwave field |
| Ionizing radiation | X-ray, alpha, beta, gamma probe | X-ray, alpha, beta, gamma robe |
| Applied Chemical**' | | |
| Solid, liquid, gas, plasma | Applied to/into surface/body | Present in environment |
| Natural** | | |
| Gravity | Source touches surface/body | Present in environment |
| Atmospheric | Atmosphere touches surface/body | |
| Hydrological | Water/liquid touches surface/body | |
| Geological | Rock/strata touches surface/body | |
| Energy (natural) | Source touches surface/body | Energy fiel f |

*Not comprehensive. All modalities can act on/through the surface or on/through the body upon which surface resides
**Chemical modalities may comprise medications or treeatments applied on the surface or given into the body.
***Here, the surface altering element comprises one or more natural forces/conditions acting upon the surface or the body upon which the surface resides.

Surface data (collected data) 120 from a surface S are collected by the surface data acquisition, storage, and assessment system 100 (or another scanning/visualizing element). Surface S may or may not be altered by or acted upon by a surface altering element 130, either before and/or during pyrometer; a magnetometer; a galvanometer; an ohmmeter; an electric field meter; an ultraviolet light camera or ultraviolet light detector, sensor or measurer; an X-ray detector, sensor, or measurer; a radio wave detector, sensor, or measurer; a microwave detector, sensor, or measurer; a sound-detecting device, sensor, or measurer; a gravitometer; a glossmeter or reflectometer; a particle detector, sensor, or measurer; a vibration detector, sensor, or measurer; a chemical detector, sensor, or measurer; a strain gauge; a device capable of detecting and/or measuring mechanical or surface rebound; a surface displacement detector and measurer; a device comprising the ability to detect and/or measure two-dimensional (2D) and/or three-dimensional (3D) parameters, such as lengths, widths, depths, areas, volumes, circumferences, and/or contours and/or shapes, such as a simple probe or a ruler and/or a 3D scanner or a photogrammetric camera array; an ultrasound or infrasound detector, sensor, or measurer; a computerized tomographic X-ray device; a magnetic resonance device; a colorimeter or a camera, sensor, or device comprising the ability to detect and/or measure color; a barometer or manometer; a hygrometer; and/or a Geiger counter, dosimeter, or other device comprising the ability to detect and/or measure radioactivity.

As used herein, surface altering element 130 comprises any device and/or method and/or any technology and/or any combination of devices and/or methods and/or technologies having the capability to alter or to change the surface of an object. Thus, surface altering element 130 (non-natural) and 130a (natural) comprises devices and/or methods and/or conditions that may directly and/or physically contact the surface to alter it, as well as methods and/or devices that may alter the surface without any direct or physical contact. Likewise, surface altering element 130 may comprise any one or more devices and/or technologies and/or methods that have the capability of altering a surface via application of any one or more or a combination of the following modalities: application of mechanical pressure or mechanical motion or mechanical damping or mechanical rebound, whether that pressure or damping or rebound is positive or negative or regardless of whether or not the rebound or motion is compressive, elastic, or expansive; thermal application, comprising either heat, ambient, and/or cold temperatures; application of electrical, magnetic, and/or electromagnetic forces, currents, or fields, regardless of whether that current is anodal or cathodal and regardless of the polarity of the magnetic force or field; application or suppression of any or all parts of the electromagnetic spectrum, from x-ray through ultraviolet, to visible, to infrared and microwave, to radio waves; application of mechanical vibration and/or sound waves, whether ultrasound, infrasound, or any other frequency of the sound, and regardless of whether or not that sound is reflected off of the surface, applied to the surface, or transmitted through the surface; application of particles, whether macroscopic, microscopic, or atomic or subatomic, to or through the surface; application or diminution of gravity to the surface; and finally the application of a surface plating, lamination, coating, including but not limited to a cream, ointment, gel, solid, liquid, or gas comprising the capability to adhere to the surface and/or to chemically and/or physically alter the surface and/or to cover some or all of the surface and/or to be adsorbed or absorbed by the surface and/or comprising the ability to alter some other property of the surface, such as electrical, magnetic, electromagnetic, thermal, or sound or mechanical conductivity and/or comprising the ability to remove something from the surface. Table 2 summarizes some, but not all, of the various methods and modalities that comprise the surface-altering capabilities of surface altering element 130, 130a.

A control element 134 as used herein can be incorporated into the computer system 104, as shown, or it can be a separate system comprising any of the known methods and/or apparatus and/or devices and/or instructions or codes or directions having the capability of directing other devices and/or methods and/or codes or directions that could control or direct the scanning component 102 and/or the surface alteration element 130 and/or the data analysis component 136 and/or the output device 112. It should be understood that the control element 134 may control any one or more of these other components and devices, either alone or in combination. Thus, the control element 134 may comprise any of the known devices capable of controlling other methods or devices, such as a computer, computer code, typed instructions for an operator, and/or it may comprise a mechanical control mechanism, such as may contain gears, timing devices, levers, buttons, magnetic or electric or electronic or hydraulic or pneumatic or thermal or other mechanical means as may be found in various mechanical or electrical or electronic devices. Control element 134 may also comprise devices and/or methods having the capability of containing preset internal instructions or code or it may comprise devices and/or methods having the capability of receiving instructions from an operator or from another device. Preferable, the control element 134, as well as the other components and devices, are connected to each other by electrical connecting elements 132 which may comprise any of the known methods and/or devices commonly used to connect various devices or methods together, such as electrical wires, optical fibers, waveguides, coded instructions, radio or other electromagnetic waves, sound waves, Bluetooth transmission, or mechanical means of communication, such as levers, gears, and the like.

Preferably, the analysis component 136 comprises any method and/or device having the capability to contain instructions that allow the output(s) of the scanning component 102 and/or the surface altering element 130 and/or the control element 134 to be analyzed and/or evaluated in any form. It should be understood that the analysis component can be a separate component, as shown, or can be incorporated into the data analysis software module 202. Analysis component 136 preferably operates and utilizes algorithms, such as logic, registry algorithms, or other mathematical means, such as described above, to compare images and measurements and derive the differences and/or similarities in the images or the measurements. In another preferred embodiment, the analysis component 136 operates and utilizes mathematical algorithms to compare some surface characteristic (SC) or some surface property (SP) before alteration by surface altering element 130 to that same SC or SP after alteration. Analysis component 136 may also operate to utilize mathematical algorithms to compare some SC or SP before alteration to a different SC or SP after alteration. When comparing the differences, if any, between the SC or SP before alteration to the SC or SP after alteration, the analysis component 136 operates to use only with the initial and the final states of the SC or the SP, or it could operate and utilize algorithms to analyze SC or SP changes during alteration, even in real time as the alteration is being enacted by surface altering element 130. The analysis component 136 may also operate and utilize algorithms to compare the SC or the SP, either before, during, or after alteration, to the quality, the quantity, and/or the magnitude of the altering force or altering method. In a preferred embodiment the analysis component 136 operates to utilize algorithms to compare SC or SP (changes due to an altering force while that altering force is itself changing. Further, the analysis component 136 may operate to utilize algorithms or mathematics to perform any of the above analyses, or any combination of the above analyses with respect to time, such as the time interval(s) before, during, or after which the altering factor or the altering force was applied. The analysis component 136 may also operate to utilize algorithms that are solely or primarily interested in the altering force. For example, in one preferred embodiment, the surface of interest is scanned at some time t=0 by the scanning component 102, in this case comprising a 3D scanner, such as a laser or a structured light scanner. Then, mechanical pressure is applied to the surface (e.g., by blowing air onto the surface) by surface altering element 130, and the resulting pressure deforms the surface, perhaps causing a depression in the surface. Then, at a later time t=1, the surface is 3D scanned again. Here, analysis component 136 may operate and utilize a simple arithmetic formula:

Total change in surface contour $_{from\ t=0\ to\ t=1}$=Surface contour $_{t=0}$-Surface contour $_{t=1}$. In another preferred embodiment, the surface temperature is measured at some time t=0, then a thermal stimulus is applied via surface altering element 130, after which, at some time t=1, the surface temperature is remeasured. Once again, the Total change in surface temperature $_{from\ t=0\ to\ t=1}$=Surface temperature $_{t=0}$-Surface temperature $_{t=1}$.

(In these trivial examples, only the initial and the final states of the surface are of interest). One skilled in the art can easily see that similar examples could be constructed for any detectable or any measurable changes in SCs or SPs. Thus, in general, a change in a SC or SP will be related to some ability of the altering force (AF) or altering modality. In the case wherein the change in the SP or the SC is proportional to the altering force, it can be written:

$\Delta$(SC) is proportional to the ability of the AF to affect the SC, where $\Delta$ means "change in".

If the ability of the AF to change the SC is essentially linear, then it can be written:

$\Delta$(SC)=k(AF's ability to affect the SC) where k is a constant of proportionality related to some characteristic of the surface or to some characteristic of the altering force. For example, k may comprise an elastic modulus related to the material comprising the surface. Alternatively, k may comprise a thermal modulus or a heat capacity. Further, k could comprise a measure of electrical conductivity or electrical resistance, a hygroscopic property, reflectivity, and so on.

As mentioned above, the analysis component 136 may operate to utilize a variety of other algorithms or mathematical functions. For example, one may be concerned about the rate at which the AF affects the SC. If the relationship between the SC and time is differentiable, then this rate is simply the slope of the line, curve, or other function that relates SC to the time. For instance, one can imagine a flat metal plate that is scanned for contour or shape, then acted upon by gravity, which pulls the metal plate towards the center of the gravitational force, deforming the surface. In this example, the SC would be the surface points or the surface contour or curve, and if one assumes that other forces, such as air resistance, are negligible, and if one is performing these observations on Earth (which means that the acceleration due to gravity (g) is about −32 feet/second), then analysis component 136 may operate to utilize the following equation:

$SC(t)=(\frac{1}{2})gt^2+(SC)'(t)+SC_{t=0}$, where (SC)' equals the first derivative, or the velocity by which the SC is changing under the given AF. Since g=−32 feet/second, and since at t=0 there would be no change or motion in the surface (and hence at t=0 (SC)' would therefore=0), and if one further assumes a starting point for the surface at a level we designate as zero deformation, then analysis component 136 would determine that $SC(t)=16t^2$ giving us the change in the SC during the time t.

The analysis component 136 may be incorporated into computer system 104, as shown, or may utilize a separate computing system. The Analysis component 136 preferably also comprises the means for acceptance of instructions or input using an input device 110, such as a keyboard or microphone, or it may comprise preset instructions. After analysis or evaluation is completed by the analysis component 136, the results of the analysis are displayed on an output device 112 or other output devices, such as any of the known and available means and/or devices and/or methods for displaying data or other information, such as a computer screen, television screen, and the like.

It should be understood that the present invention comprises the apparatuses and/or the methods wherein a surface is scanned and/or measured via any of the means mentioned above to obtain reference data (first set of collected data), then the surface is altered or affected using a surface altering element that operates using surface altering technology, then is scanned and/or measured again, either concurrently while the motion of the surface or alteration of the surface is actually occurring or after the surface altering element has completed its alteration of the surface to obtain collected data (second set of scanned data). In another preferred embodiment, the surface may not be scanned and/or measured prior to application of the surface altering element, but after the surface altering element is employed, after which the surface is scanned. In another preferred embodiment, one surface is scanned to obtain reference data (first set of collected data) then a different, perhaps similar surface, is altered via the application of the surface altering element, after which this second surface is scanned and/or measured ro obtain collected data (second set of collected data) and then these data are compared (and/or registered) or analyzed relative to the first, unscanned and/or unmeasured surface. In another preferred embodiment, the alteration method and/or technology that is used may comprise methods and or technologies and/or surface altering elements that may only affect the surface itself, or which may only affect the deeper or subsurface parts of the body, object or item whose surface is of interest, or which may affect both the surface as well as the deeper parts of the object, body or item of interest. Again, it should be understood by one skilled in the art that the aforementioned "body" or "object" or "item" may comprise either a real physical entity or a virtual, theoretical, mathematical, or imaginary body or object or item or said body, object or item may comprise both non-real as well as real physical parts.

Examples of Preferred Embodiments of the Invention

One skilled in the art can readily appreciate that there are a vast array of potential uses and applications spanning many areas for the methods and/or the apparatuses comprising the present invention. For the sake of illustration, some of these fields of application and their respective uses are detailed below. It should be understood that this is certainly not an exhaustive list.

Medical Applications

The present invention provides for a number of medical/veterinary applications and the following is a non-limiting illustration and is not a complete list.

In one application, the present invention is applied to wounds and ulcers. Here, the surface S comprises a wound itself with or without the nearby intact tissue. In one preferred embodiment, surface altering element comprises any device or method whereby mechanical forces can be applied to the wound and/or to its margins and/or to the nearby intact tissue. These mechanical forces may be applied directly to the surface and thus actually contact or touch the surface, such as with a plunger or piston-like object that pushes on the tissue, either the tissue in the wound crater itself and/or the tissue on the wound margin and/or on the intact tissue. For a non-limiting example, a mechanical probe, comprising a plastic plunger, can be pushed against the bottom of the wound crater or against the sides or the margins of the wound to see if the wound tissue would give way, exposing undermining. If the plunger comprised a piston-like device, then the pressure necessary to expose the undermining might be determined and thus form a measurement of relative tissue integrity (or tissue strength or tissue resistance to tearing). Or, the mechanical forces may be applied via direct contact involving a hook, a sticky probe, or a suction cup or via some other means of applying a negative pressure, pull, or suction to the surface. Herein, such a device might pull on the tissue, again as a means of exposing undermining and determining tissue integrity. For instance, a probe comprising a small suction port at its end may be placed in contact with the tissue in the wound margins. Upon application of suction through the probe, the wound margins may be pulled upwards, thus exposing the undermining, as schematically displayed in FIG. 27. Measurement of the amount of suction necessary to lift the tissue may also constitute a measure of tissue integrity. In another preferred embodiment (FIG. 28), the mechanical forces are applied to the surface via noncontact means, such as one might create by air, gas, or liquid blown onto the wound itself and/or onto the wound margins and/or onto the intact tissue. In these instances, the airflow, gas flow, or the fluid flow would create a positive pressure on the surface. This positive pressure could then be used in analogy to the direct force probes mentioned above to expose undermining and to measure tissue integrity. In another embodiment, the airflow creates a negative pressure, or suction, on the surface. Again, this negative pressure could be applied to the wound itself, or to the wound margins, or to the intact tissue or onto any combination of these. The airflow, whether positive or negative (or both simultaneously), could be directed or aimed perpendicularly to the surface or at any angle to the surface. One might, aim the positive airflow at a very acute angle relative to the plane of the surface in order to lift up the wound edges, thus again exposing undermining. It should be clear to one skilled in the art that these same contact or non-contact devices and methods, whether the force applied is positive or negative in nature, could be applied to the subsurface or the deeper parts of the tissue in order to determine the characteristics of the surface. For example, the mechanical force could push on the deep tissue in the opposite side of the limb or on the nearby intact tissue to determine the effect on the surface tissues in the wound itself. In the case wherein a pocket or abscess existed under the wound, such force application to the deeper tissues may not raise the surface contour of the wound itself, thus clueing the examiner or operator to the underlying pocket. It should be clear to one skilled in the art that any such forces could be applied to the entirety of the relevant surface or to any particular part of the relevant surface. It may be useful, for example, to create a negative pressure or suction that encompasses the entire wound as well as the wound margins, thus pulling up all the wound margins and revealing any underminings around the wound edges as well as simultaneously showing at what "clock positions" each undermining lies.

In another preferred embodiment, surface alteration element comprises any device that can produce sound waves, either audible to the human ear or at any other frequency or group of frequencies, and that has the ability to exert mechanical forces against the surface, either via direct contact (as with a sound speaker or waveguide placed directly against the tissue) or via indirect means, such as with a speaker or amplifier whose output was directed towards the tissue. Again, as above, these sound waves could be perpendicular to the surface or they could be directed at any angle to the surface. In one preferred embodiment, the sound waves are pushed against the surface itself; in another preferred embodiment, the sound waves are pushed against the deeper or intact tissues or are transmitted through the tissue. Again, the entire surface may be impinged upon by the sound waves, or only a part of the surface may be exposed to the sound waves. In another preferred embodiment, the sound waves produce a vibration in the surface or in the deep tissues, and this is what is detected by the scanning component.

In each of the foregoing mechanical or sonic modalities, the present invention comprises any of the methods and devices encompassed in FIG. 27 as well as in the text above. For example, in one embodiment, scanning component is first used to scan a wound, measuring its surface contour, as with a 3D scanning device, such as a laser or a structured light scanner to obtain collected data (reference data or first set of collected data). Then the surface of the wound and its margins are exposed to a perpendicular blast of air aimed directly at the center of the wound crater. This airflow would come from an air pump comprising surface alteration element. In one preferred embodiment, the blast of air is brief and the scanning component takes a short 3D video or still image of the lifting of the wound edges by the force of the air blast, thus exposing and measuring the underminings to obtain collected data (second set of collected data). In another preferred embodiment, the air flow is continuous and the scanning component takes a still 3D image and/or measurement of the wound with its margins elevated and held up by the force of the air. Then, these collected data from before (reference data or first set of collected data) and from after the air blast (collected data or second set of collected data) are relayed to analysis component, which then uses algorithms such as 3D registry, logic, or other mathematical means to compare the before and after contours and images (such as by registration of the images to produce an image showing differences between a first image created using reference data or first set of collected data and a second image created using collected data or second set of collected data) and to then derive the differences, which are then displayed on output device such as by a chart or by showing an image created by registration of the first image and the second image to create an image showing differences between the first image and the second image. It should be apparent to one skilled in the art that surface alteration element may comprise both a sucking or negative pressure force and a simultaneous blowing or positive pressure force. For example, a sucking pressure may be applied to the edges of the wound while simultaneously blowing air into the center of the wound, thus exposing any undermining to the greatest extent possible.

In all of the foregoing examples, the operator of the invention may have one or more reasons for using the apparatus and the methods of the present invention. As mentioned, the operator may want to look for undermining or tunneling and measure its extent; the operator may want to test and measure tissue integrity or tissue strength, either in the wound, or the wound margins, or in the intact tissue. Or, the operator may use the present invention to detect and to measure tissue mechanical rebound. Such rebound, or the tissue's ability to attempt to return to its initial, or pre-alteration state, can be useful in checking and measuring tissue quality/strain tolerance or resistance to tearing or stretch or puncture; it can be useful in edematous states, in which there is abnormal fluid beneath the tissue surface. Here, the application of force to the tissue surface will result initially in a tissue indentation; after the force is removed, the subsurface fluid returns to the area, causing the tissue to re-expand towards its initial state and surface contour. The rate of this rebound, and the extent to which the rebound returns the tissue to its initial state, contains information that can be useful for a clinician. For example, if the edema is due to excess lymphatic fluid (as one might see with cancer or an infection), then the rate of rebound is much slower than that which occurs if the edema is due to venous congestion (as one might see in congestive heart failure). In a preferred embodiment, the present invention operates to measure the rate of this rebound, thus helping to distinguish between lymphatic and venous edema. Similarly, mechanical or sonic pressure would displace blood from the blood vessels beneath the relevant surface, forcing this blood away from the surface tissue, and release of this pressure would allow the return of the blood to the area of the relevant surface. Pressure on the tissue causes the tissue to whiten or blanch, while the return of the blood causes the tissue to become more reddish or bluish. Thus, in another preferred embodiment, the scanning component of the present invention comprises a colorimeter or other color measuring device or method. Here, the operator would measure the tissue's color both before and after the application of the pressure (or the operator might measure one tissue without ever applying pressure and a similar tissue during or after the release of the pressure), and then use algorithms utilized by the analysis component (such as an RGB or HSV scale or color space) to determine any changes in tissue color as well as the rate of return of the color to the relevant tissue after the pressure was released. This can be very important in conditions like peripheral vascular disease, in which the blood flow to the extremities is poor or otherwise compromised. For instance, one could measure the color of the fingernail bed both before and after the application of sufficient force to cause the nail bed to blanch. If the red color returns to the nail bed within about two to three seconds after the release of the pressure, then the capillary circulation to that digit is liable to be normal; longer times would indicate peripheral vascular disease.

In another preferred embodiment, the operator applies a thermal stimulus, such as heat or cold, to the tissue. Again, this stimulus could be applied directly, as with a thermal probe, or in a non-contact fashion, such as with radiant heat from a source not in direct contact with the surface. Here, surface altering element comprises a source of thermal energy, such as a flame, a heat gun, or an electrical resistance device. Surface altering element may also comprise a source of cold, such as an ice-filled probe that touches the skin or some manner of refrigerant coils, such as from a cooler or a refrigeration device, with a fan to blow the cold air on the tissue. In this embodiment, scanning component comprises a thermometer, pyrometer, or some other device that has the ability to measure temperature. As above, the method of the present invention would then allow the operator to measure the temperature both before and after the thermal stimulus, comparing the temperature of the tissue both before and after the stimulus. One application of this embodiment would be in the determination of nerve function in the extremities. For example, if the thermal change in the tissue was not detectable by the subject, then it would indicate a loss of thermoreceptors in the skin or perhaps a severing or weakening of the nerve transmission of the thermal signal to the brain, as might occur in the peripheral nerve disease of diabetes. Similarly, if the thermal change was of sufficient magnitude to produce the sensation of pain, but the subject did not perceive any pain, the subject may once again have lost the pain receptors in the skin or the ability to transmit such pain signals to the central nervous system. (Such a situation would also apply to the mechanical pressure embodiments mentioned above. If the pressure applied, or the change in the applied pressure, did not produce the expected sensation of pressure or pain, then the subject may have lost the light touch or heavy pressure sensors in the skin or the subject may have nerve damage that prevents the transmission of this signal to the brain).

In another preferred medical embodiment, an electrical stimulus is applied to the tissue. Again, as above, this stimulus could be applied by the surface altering element directly, as with an electrical wire or wires or it could be applied in a non-contact fashion, as via placing the tissue in an electrically conductive fluid or field. Here, the surface altering element comprises a device that has the ability to generate an electrical voltage or an electrical current. Scanning component comprises any device or method with the ability to detect and measure electrical voltage, current, resistance, or field strength, such as a voltmeter, a galvanometer, an ammeter, or an ohmmeter. Again, the operator would measure, say, the electrical conductivity of the surface, both before and after using surface altering element to pass a current or an electrical field into, over, under, or through the relevant surface and/or under the relevant surface. Using the apparatus and the method of the present invention to measure the changes in the electrical properties of the surface can carry important information for the clinician. For example, extra fluid in or near the surface would likely increase the conductivity of the surface, whereas dry nor fatty tissue would tend to decrease the conductivity. Thus, poor conductivity would likely indicate dry tissue, as one might expect in poor circulation or in cases of loss of autonomic function, such as loss of insensible sweating as in diabetes or as in cystic fibrosis.

In another preferred embodiment, the operator may use the surface altering element to apply visible or other wavelengths of light (or other parts of the electromagnetic spectrum) to the surface, which is then, as above, scanned and/or measured before and after the surface alteration. Again, this light could be applied directly, as with a lamp, a light, or an optically conducting fiber, or the light could be applied in a non-contact fashion, as with radiant light from a lamp positioned at some distance from the relevant tissue. Here, scanning component would comprise any method or device capable of detecting the incident frequency of light. For example, for visible light, this could be a film camera, or it could be some manner of CCD-containing or other similar device. Then, as before, the scanning component operates to take measurements from before and from after the surface alteration would be compared as via the methods and apparatus of the present invention. The motivation for the operator in these circumstances would be to compare the surface changes that might be due to the incident light. For example, one might be interested in the clearing of various rashes such as acne or psoriasis or even the clearance of a skin cancer after application of light-sensitizing medications and then the incident light (in these cases, likely ultraviolet light). Here, the likely measurement would be surface contour, color, and/or lesional area changes.

In another preferred embodiment of the invention, the surface altering element comprises a chemical alteration of the surface. Here, surface altering element comprises the application of a substance to the surface, through the surface or the subsurface or the deeper areas under the surface, or to the organism as a whole (for example, via an intravenous infusion) that then either remains on the surface and/or alters the surface. Again, this substance could be applied directly to the surface, as with a cream, gel, or ointment, or the surface could be exposed to the substance in a somewhat non-contact fashion, as via coating the surface or altering the surface via exposure of the surface to fumes, vapors, and the like. For example, the scanning component operates to measure and/or scan the tissue before and after applying a capsaicin, menthol, or a camphor cream to the surface. The temperature change (or the lack thereof) of the surface could then be detected by scanning component which would herein comprise a temperature sensing device or method, such as a thermometer or pyrometer or an infrared-sensing camera. As above, a lack of a temperature response could indicate a failure of autonomic function in the nerves, for example, as one might have in diabetes or in a sympathetic nervous system dysfunction. Such a lack of a temperature response may also indicate poor regional arterial blood flow.

In another preferred embodiment, the surface is simply moved, perhaps as a whole, by the organism. This motion then, in the context of the present invention, comprises the surface altering element. Here, for example, the surface is measured and/or scanned in one position and then in another position (perhaps produced as a joint or a limb or the whole organism is moved), and the spatial differences are then measured by the scanning component, which as described above may comprise any 3D scanner, 2D camera, or a 2D or a 3D video device, laser, or the like. The differences in spatial position are then compared via the algorithms (such as 3D registry) comprised within analysis component. This comparison would then yield the surface's change in spatial position, and hence would reveal the static angle and/or the range-of-motion of the surface, the limb, or the whole organism.

In another preferred embodiment, surface altering element comprises drugs, medications, chemicals, physical modalities (such as sound waves, thermal energy, electromagnetic energy, etc.) or any of the other surface-altering methods as previously presented above as in Table 2 that have the property or ability to passively enter into or to be actively placed into the body substance or body cavity of the subject whose surface is of interest. (One skilled in the art can appreciate that the term "body", as used here, may comprise living organisms, dead organisms, living or non-living tissues, or may even comprise a nonliving structure.) Once taken into the body cavity and/or body substance of the subject, surface altering element herein possesses the ability to alter body processes which then may have the potential to alter one or more characteristics of surface. These surface alterations are then detected and/or quantified by the scanning component. In one such example, a pharmaceutical company wishes to test a new medication that it has just invented. In this example, the medication may comprise any typical or customary forms of medication, such as a pill, tablet, caplet, infusion, or injection, or the medication may comprise some topical treatment, such as a gel, cream, ointment, powder, or the like. In this embodiment, the pharmaceutical company tests its medication by initially scanning to measure the surface of its patients or test subjects before any of the patients or test subjects are given either the active drug or the placebo to obtain reference data (first set of collected data). Then, some of the patients or test subjects are given the new, active medication while other patients or test subjects receive an inactive medication or a placebo. After the patients or test subjects are given the medication (orally, rectally, parenterally, topically, or otherwise) or the placebo, the drug or the placebo enters into or interacts with the body substance, and these interactions may cause changes or alterations in the surface of the subject. Then, the surfaces of the patients or test subjects are scanned again to obtain collected data (second set of collected data), with any surface changes then being detected and/or quantified by the scanning component, and then analyzed by analysis component with the results then displayed by output device. It should be understood that the display may be a graph or chart or as described above a first image may be created using the reference data (first set of collected data) and a second image using collected data (second set of collected data) and the two images are registered and a third image showing differences between the first image and the second image may be displayed. During this process, the pharmaceutical company or its researchers may take numerous other measurements, such as blood tests, urine tests, X-rays, MRIs, CTs, ultrasounds, biopsies, or the like.

For example, many arthritis medication studies comprise three main sources of data: a patient questionnaire (such as a health assessment questionnaire [HAQ]), a physical examination (PE) of the patient or subject by a health professional (such as a nurse or a physician), and X-rays, ultrasounds, MRIs, Doppler blood flow studies or other means of detecting subsurface features or anatomy. Generally, the PE consists primarily of the physician examining the patients' or the test subjects' joints by visual and tactile examination; that is, the physician looks at the patients' or the test subjects' joints to detect signs of inflammation, such as swelling, redness, and range of motion, and the physician touches or squeezes ("palpates") the joints to detect swelling, tenderness, or warmth. In current practice, the pharmaceutical companies gather these three sources of data both before any test medication or placebo is given to the patients or the test subjects, and at various times after the patients or test subjects are given the test medication or the placebo. In this preferred embodiment of the present invention, the patients or test subjects are given the questionnaire and X-rays both prior to and after receiving the test medication or the placebo. Likewise, the patients or test subjects may still undergo the PE both before and after receiving the test medication or the placebo, but this invention comprises the method of eliminating, supplementing, or supplanting the pre- and the post-medication PE by using or substituting surface scanning, measuring, or imaging both before the patients or test subjects receive the test medication or the placebo as well as after the patients or test subjects receive the test medication, and then noting any post-treatment surface alterations in swelling, color, temperature, range-of-motion, or other detectable surface changes that may be due to the test medication or the placebo. Thus, this invention comprises a method to change the testing paradigm or the testing regimen of arthritis and other treatment studies from pre- and post-medication questionnaire, PE, and X-ray or other subsurface anatomical studies to one of pre- and post-medication questionnaire, surface scanning/imaging/measurement, and X-ray or other subsurface anatomical studies (with the PE being optional or in fact absent altogether). It should be apparent to one skilled in the art that this same method could be used where non-medication treatments were applied or tested, such as physical therapy, occupational therapy, radiation therapy, surgery, and the like. It should also be understood that if no or a minimum about surface changes are detected in a patient after receiving a medication or treatment (collectively "medical therapy"), a new medical therapy can be administered to the patient. Since the scanning component can detect changes in the surface of a patient sooner and more reliably than a medical profession can using just their eyes and fingers, a patient that is not responding to a medical therapy can be quickly identified and a new therapy can be administered to a patient.

In another preferred embodiment, the present invention is used in the field of athletics. Here, several of the above scenarios may be present. An athlete's tissue might be scanned before and after application of mechanical pressure (as with a massage or as with stretching), thermal stimuli (as with heat or as with ice packs), or chemical agents, such as various sports creams, lotions, and ointments. Each scenario here would be treated just as in the foregoing examples.

As mentioned, this list of medical applications for the present invention is not exhaustive and one skilled in the art could certainly recognize other applications in the medical/veterinary field.

Non-Medical Applications

There are a wide variety of non-medical applications for the method and the apparatus of the present invention. The following examples should not be considered to encompass all of the applications of the current invention, but are merely mentioned for illustration purposes.

Agriculture:

Aside from the obvious veterinary uses (which are the same as the medical uses mentioned heretofore), there are many agricultural applications for the present invention. In one preferred embodiment, physical forces are applied to produce, such as fruits and vegetables. Again, these forces could be directly applied by a surface altering element, such as a mechanical plunger or piston, or they could be applied by a surface altering element in some non-contact fashion, such as with a jet of air, gas, or a liquid. This contact pressure, jet or flow could be applied continuously or in an intermittent or short burst. Here, the scanning component would be used to obtain 3D scans and/or measurements of the relevant produce to obtain reference data (first set of collected data). Then, the surface altering element, in the form of one or more various mechanical force-applying methods and devices as mentioned above, would apply either positive or negative pressure to the surface of the produce, fruit, or vegetable. Scanning component would then take its subsequent scans and/or measurements during or after the application of the mechanical force to obtain collected data (second set of collected data). The response of the produce, fruit, or vegetable, either in terms of permanent deformation from the force or via surface rebound, would then be analyzed by analysis component, as before. Since the process of both ripening and rotting involves changes in the ability of produce, fruit, or vegetables to resist mechanical force or to rebound from such force, the operator would have the ability to assess and measure the produce's 3D surface characteristics during and after the force was applied, and thus make deductions as to the produce's relative ripening, stable, or rotting state. It should be understood that the present invention could be applied to note changes in produce color or contour produced by the other surface altering elements mentioned above, such as application of thermal forces, electromagnetic forces, and so on, also indicating to the operator the various conditions present in the produce.

In another preferred agricultural embodiment, the produce is exposed to the application of various substances, again as above. These substances may be applied directly to the produce, such as wax that is applied to apples, or it may be applied in a somewhat non-contact fashion, such as acetylene gas exposure for fruit ripening. In either circumstance, the produce would be scanned and/or measured both before (to obtain reference data (first set of collected data)) and after the application of the substance (to obtain collected data (second set of collected data)), and then the algorithms comprised within analysis component would be used to assess and measure the relevant surfaces changes and display the surface changes by use of a chart, graph or an image as described above. For example, one may wish to assess the color changes in an apple before and after its exposure to acetylene gas in order to ascertain the best "ripened" color. Here, the scanning component would comprise a color scanning and measuring device, such as a color camera or a colorimeter, and the surface altering element would comprise the acetylene gas dispenser. The analysis algorithms would comprise any of the known and available methods or devices capable of measuring color.

Metals/Material Science

The surfaces of materials, such as wood, plastics, and metals, obviously can be acted upon by mechanical, thermal, electrical/magnetic, electromagnetic, atomic, sonic, gravitational, and chemical forces and agents. All of these various forces and agents can be assessed and analyzed for their effects on the surfaces of these materials using the methods and the apparatuses of the present invention. For example, metals corrode when exposed to heat and various chemical substances. Scanning and/or measuring these metals before to obtain reference data (first set of collected data) and after application of these agents to obtain collected data (second set of collected data) can be used to determine the presence of as well as to quantify the amount of the corrosion and cracking, exfoliation, spalling, and/or pitting that may have resulted as the consequence of the exposure to the agent. One skilled in the art can easily envision the uses of the present invention as regards these agents and their effects on such materials. Similarly, the protection of the surfaces of these materials by substances such as paint, lacquer, or other chemicals can be assessed via the methods and the apparatuses of the present invention. Here, the surface altering element would comprise the protective coating on the surface, and scanning, photographing, or measuring would be done before to obtain reference data (first set of collected data) and after coating with the protective agent to obtain collected data (second set of collected data), as well as before and after the corrosive or cracking agent. One likely scenario would involve two separate surfaces, perhaps one surface coated with the protective substance and the other surface remaining uncoated, then each scanned and/or measured both before and after exposure to the corrosive or the cracking agent. In another preferred embodiment of the invention a metallic surface of a part can be scanned and surface data and information are stored to obtain reference data (first set of collected data). After a period of time the same surface can be scanned to obtain scanned data (second set of collected data) and the data are stored. The analysis component can them operate to compare the reference data (first set of collected data) with the new surface collected data (second set of collected data) and changes can be displayed in the form of a graph, chart or as an image, using registration as previously described. Such comparison can then be used to evaluate the part. For example, if the surface shows a change in surface contour and/or changes in temperature, such changes could indicate that a crack has formed within the surface of the metallic surface. Such a crack may be visible to an observer or may be below the top visible surface of the metallic part. Further, additional scans taken at later times may be used to determine crack growth over time and a predictive analysis can be made.

Art/Preservation of Artwork

One skilled in the art can easily see that the same issues occur in the preservation of paintings and other visual artworks that occur with the metals and materials mentioned above, and thus the same application of the present invention could be applied here as well. For example, paintings are frequently coated with layers meant to ensure their preservation, just as metals are often coated with anti-corrosive agents. Again, it must be stressed that the foregoing do not comprise the full range of uses or applications for the present invention.

As shown in the examples above, a preferred embodiment of the invention the analysis component, as illustrated in FIG. 30, includes a data storage device 114 for storing collected data 120. Collected data 120 of the surface S of an object O is obtained by the scanning component 102 and stored in the data storage device 114. In a preferred embodiment, collected data are taken at various times and is stored in the data storage device 114 as reference data (first set of collected data). Over a period of time or after a surface altering element 130 is utilized additional scans of the surface are made and the additional collected data 120 (second set of collected data) is also stored in the data storage device 114. The analysis component 136 then operates to compare the reference data (first collected data) with the additional collected data (second set of collected data). In a preferred embodiment, the second set of collected data can include collected data from a scan at a particular point of time or can include data taken at different points of time. The data can then be compared and displayed on the output device in the form of a graph or chart. In another preferred embodiment, the system operates such as described above such that an image can be created using reference data or data from one scan taken at a point of time with an image created by a scan taken at a different point of time and the images are registered such that a point-to-point comparison between the images can be made such as by creating a comparative image such as described above, that allows a user to easily identify surface changes between the scanned collected data taken at different times. After the data has been compared the analysis component further functions to perform a predictive analysis 138. For example, using the changes in the surface data, a predictive analysis could be made to anticipate when changes will be sufficient to create a critical state, such as a part failure. In another preferred embodiment the analysis component 136 utilizes collected data from various scans of objects and additional collected data of scans of objects to make a predictive analysis. For a non-limiting example, patients can be scanned, such as various parts of a body that may in time suffer from arthritis. Over time the same parts of the body may be scanned and compared to previous scans (comparing the data). As various types of arthritis begin to develop in the patients, the scans (scanned data) can be analyzed by the analysis component 136 and the progression of the disease can be tracked. Over time and after a sufficient number of patients have been scanned repeatedly, a predictive analysis of the disease progression can be made of a patient first experiencing the disease. For example, if the scanning component obtains data for a number of patients over time and such data can be used in identifying inflammation, such as caused by arthritis, by comparing the various scans to track the progression of the disease. Thus, in one example a patient that is scanned by the scanning element and the data obtained indicates inflammation in a particular joint, a predictive analysis can be made of the progression of the disease. In another example, using the data collected for a number of patients having arthritis, a predictive analysis can be made based on for an example, where (what joint) the arthritis first appears. For example, arthritis first appearing in the hand may have a different progression than arthritis first appearing in the elbow. It should be understood that various other factors may impact the predictive analysis, such as other physical conditions of the patient, the patient's age, sex, ancestor background, etc., and once a sufficient amount of data and information is obtained, various panels can be created for use in making the predictive analysis.

The surface data acquisition, storage, and assessment system of the subject invention provides a structured methodology and design utilized by the system software and is not limited solely to the specific design of the software. Although the foregoing invention has been described in some detail for purposes of clarity of understandings, it will be apparent that certain changes and modifications may be practiced within the scope of the appended claims. It should now be apparent that the various embodiments presented can be easily modified while keeping within the scope and spirit of the subject invention. Accordingly, it should be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

The invention claimed is:

1. A surface data acquisition, storage, and assessment system comprising: one or more scanning components that operates to scan a surface of an object and obtains a first set of collected data, wherein said first set of collected data includes one or more measurements of one or more features; a surface altering element that operates to alter or change the surface of the object wherein said one or more scanning components then operates to scan the surface of the object and obtains a second set of collected data, wherein said second set of collected data includes one or more measurements of said one or more features; an analysis component that operates to compare said first set of collected data with said second set of collected data by using said first set of collected data to form a first image of at least a portion of the surface and using said second set of collected data to form a second image of the at least a portion of the surface and aligns said first image with said second i mage and wherein said analysis component produces an image showing differences between said first image and said second image.

2. The surface data acquisition, storage, and assessment system of claim 1 wherein said comparison is a point to point comparison between said first set of collected data and said second set of collected data.

3. The surface data acquisition, storage, and assessment system of claim 1 wherein the surface is a wound or ulcer and wherein said altering element operates to expose undermining of the wound.

4. The surface data acquisition, storage, and assessment system of claim 1 wherein said altering element operates to apply a force to a tissue to cause indentation of the surface.

5. The surface data acquisition, storage, and assessment system of claim 1 wherein said altering element operates to change the temperature of the surface.

6. The surface data acquisition, storage, and assessment system of claim 1 wherein said altering element operates to provide an electrical voltage or electric current to the surface.

7. The surface data acquisition, storage, and assessment system of claim 1 wherein said altering element operates to expose the surface to light.

8. The surface data acquisition, storage, and assessment system of claim 1 wherein said altering element operates to apply a chemical substance to the surface to the surface.

9. The surface data acquisition, storage, and assessment system of claim 1 wherein said object is a body and said altering element comprises drugs, medications, or chemicals that enter the body or placed on the surface of the body.

10. The surface data acquisition, storage, and assessment system of claim 1 wherein the object is a body and said altering element operates to provide a physical force to the body.

11. The surface data acquisition, storage, and assessment system of claim 1 wherein said altering element operates to provide a coating to the surface and further operates to apply a mechanical force or an electrical voltage or current or a chemical to the coated surface.

12. The surface data acquisition, storage, and assessment system of claim 1 wherein said data analysis component operates to make a predictive analysis.

13. The surface data acquisition, storage, and assessment system of claim 1 wherein the surface altering element operates to produce a force that operates to alter or change the surface of the object and wherein the amount or level of the forced is used by said analysis component to make a predictive analysis.

14. A surface data acquisition, storage, and assessment system comprising:
one or more scanning components that operates to scan a surface of an object and obtains a first set of collected data, wherein said first set of collected data includes one or more measurements of one or more features;
a surface altering element that operates to alter or change the surface of the object wherein said one or more scanning components then operates to scan the surface of the object and obtains a second set of collected data, wherein said second set of collected data includes one or more measurements of said one or more features;
an analysis component that operates to compare said first set of collected data with said second set of collected data;
wherein said analysis component further operates to use said first set of collected data to form a three-dimensional first image of at least a portion of the surface and operates to use said second set of collected data to form a second three-dimensional image of the at least a portion of the surface and further operates to align said first three-dimensional image with said second three-dimensional image and wherein said analysis component further operates to produce a three-dimensional image showing differences between said first three-dimensional image and said second three-dimensional image.

15. The surface data acquisition, storage, and assessment system of claim 14 wherein said object is a body and said altering element comprises drugs, medications, or chemicals that enter the body or placed on the surface of the body.

16. The surface data acquisition, storage, and assessment system of claim 14 wherein said altering element operates to provide a coating to the surface and further operates to apply a mechanical force or an electrical voltage or current or a chemical to the coated surface.

17. The surface data acquisition, storage, and assessment system of claim 14 wherein said data analysis component operates to make a predictive analysis.

18. The surface data acquisition, storage, and assessment system of claim 14 wherein the surface altering element operates to produce a force that operates to alter or change the surface of the object and wherein the amount or level of the forced is used by said analysis component to make a predictive analysis.

* * * * *